US012761872B2

(12) United States Patent
Goryavskiy et al.

(10) Patent No.: US 12,761,872 B2
(45) Date of Patent: Oct. 13, 2026

(54) ADVANCED DIGITAL SORTING AND SEARCH

(71) Applicants: Yuly Goryavskiy, Antibes (FR); Svetlana Goryavskiy, Antibes (FR)

(72) Inventors: Yuly Goryavskiy, Antibes (FR); Svetlana Goryavskiy, Antibes (FR)

( * ) Notice: Subject to any disclaimer, the term of this patent is extended or adjusted under 35 U.S.C. 154(b) by 140 days.

(21) Appl. No.: 18/222,486

(22) Filed: Jul. 17, 2023

(65) Prior Publication Data

US 2024/0143276 A1 May 2, 2024

Related U.S. Application Data

(60) Provisional application No. 63/389,915, filed on Jul. 17, 2022.

(51) Int. Cl.
*G06F 16/22* (2019.01)
*G06F 7/08* (2006.01)

(52) U.S. Cl.
CPC ............ *G06F 7/08* (2013.01); *G06F 16/2272* (2019.01)

(58) Field of Classification Search
None
See application file for complete search history.

(56) References Cited

U.S. PATENT DOCUMENTS 5,680,607 A * 10/1997 Brueckheimer .... G06F 16/2272
7,096,341 B1 * 8/2006 DeTar, Jr. ............... G06F 3/061 707/E17.055
7,130,983 B1 * 10/2006 DeTar, Jr. ............. G06F 3/0676 711/210
8,131,612 B1 * 3/2012 Payne .................... G06Q 40/06 705/37
10,031,934 B2 * 7/2018 Dietterich ........... G06F 16/2308
11,138,055 B1 * 10/2021 Chalfant ............. G06F 11/1048
2005/0097072 A1 * 5/2005 Brown ................... G06N 5/048
2006/0011849 A1 * 1/2006 Tseng ...................... G01T 1/172 250/367
2007/0217676 A1 * 9/2007 Grauman ............. G06V 10/764 382/190
2010/0049700 A1 * 2/2010 Dimitropoulos ...... H04L 41/142 707/E17.014
2011/0270820 A1 * 11/2011 Agarwal ................ G06F 16/31 707/E17.108
2014/0109386 A1 * 4/2014 Matthews ............... B23P 13/00 29/592
2015/0127599 A1 * 5/2015 Schiebeler ........ G06F 16/24552 707/602
2020/0034350 A1 * 1/2020 Moran ...................... G06F 7/08
2020/0334010 A1 * 10/2020 Choi ......................... G06F 7/08
(Continued)

*Primary Examiner* — Eliyah S. Harper

(57) ABSTRACT

The device, software, and method of information processing are a further development of the ideas underlying radix, bucket, and interval sorting, and corresponding digital search. In particular, the device executes new or improved methods for sorting based on representing a key as a number or a string, new methods for constructing or transforming tables of counters or index tables in sorting and corresponding searching processes, new methods for determining the optimal bit depth for sorting, new methods and improvements based on normalization and reinterpretation, new methods for estimating the amount of work and for choosing an optimal strategy in sorting or corresponding searching, and other advanced methods.

32 Claims, 5 Drawing Sheets

(56) References Cited

U.S. PATENT DOCUMENTS

| | | | | |
|---|---|---|---|---|
| 2020/0334254 | A1* | 10/2020 | Arye | G06F 16/2393 |
| 2022/0398312 | A1* | 12/2022 | Sutherland | G06F 21/125 |
| 2024/0380580 | A1* | 11/2024 | Wang | G06N 10/60 |

* cited by examiner

ADVANCED DIGITAL SORTING AND SEARCH

COPYRIGHT NOTICE

A portion of the disclosure of this patent document contains material which is subject to copyright and trademark protection. The copyright owner has no objection to the facsimile reproduction by anyone of the patent document or the patent disclosure as it appears in the U.S. Patent and Trademark Office patent file or records, but otherwise reserves all copyright and trademark rights whatsoever.

CROSS-REFERENCE TO RELATED APPLICATIONS

The present invention claims the benefit of U.S. provisional patent application Ser. No. 63/389,915, entitled "Advanced digital sorting and search", and filed on Jul. 17, 2022, disclosure of which is included herein at least by reference.

FIELD OF INVENTION

The invention relates to the field of improved methods and techniques for digital sorting and search, such as radix sort, bucket, and interval sort, and describes the completely new classes of logarithmic and normalizing sorting and search.

BACKGROUND OF INVENTION

Many implementations of radix, bucket, or interval sorting algorithms construct auxiliary counter tables or index tables during their operation.

In typical implementations of such radix sorting algorithms, the value of each element in the counter table corresponds to the number of records that contain a specific digit or symbol value at a particular position within the key—in the position that is analyzed at the given stage of the sorting algorithm.

If the total number of records being analyzed by the sorting algorithm at a given step is known, it can be considered that the counter table constructed at this step also reflects the frequencies at which each possible digit or symbol value appears at a specific position within the key values of the records being sorted at that step.

In other implementations, index tables are used instead of or in addition to counter tables. In a typical implementation of this type, each element of the index table points to the beginning of a list of records that contain a specific digit or symbol value at a particular position within the key value (at the position being analyzed by the sorting algorithm at that stage). Alternatively, the elements of such an index table themselves serve as headers for such lists of records.

There are also implementations where the index table is a more complex data structure that allows for fast retrieval (enumeration) of records corresponding to a specific digit or symbol value at a particular position within the key.

In existing implementations of radix, bucket, or interval sorting algorithms, the radix (or information capacity) of the current analyzed digit (or symbol), and therefore the maximum sizes of auxiliary tables, including the counter table or index table, are fixed values (either overall or for a given step of the algorithm).

The radix (information capacity) of the digit or symbol is either preselected for all steps of the sorting algorithm or chosen for each specific step. However, once chosen, this radix remains unchanged and determines the sizes of the tables.

For example, if the sorting algorithm analyzes digits or symbols consisting of eight elementary binary digits (bits) and if this algorithm does not have prior information about the guaranteed absence (e.g., the inadmissibility) of certain values of such 8-bit digits or symbols, then the existing algorithm, program, or device will use counter tables or index tables containing 256 elements.

Typically, the elements of such counter tables are used to count the number of records that have a specific value of an 8-bit digit or symbol at a particular position within the key values of the subset of records currently being sorted.

Another similar sorting algorithm may use index tables with a length of 256 elements, where the elements serve as headers for lists or refer to lists of records that contain a specific value of an 8-bit digit or symbol at a particular position within the key values.

However, if a decision is made, for example, that the entire algorithm or a specific stage of its operation will analyze 4-bit digits or symbols, then the counter tables or index tables will contain sixteen elements (rather than 256 elements as in the case of 8-bit digits or symbols).

In any case, the sizes of these tables will be predetermined, and they will not change at least until the completion of the current step.

The most advanced radix, bucket, or interval sorting algorithms automatically select the radix (information capacity) of the digit or symbol for each specific step, rather than for the entire sorting process. For example, they dynamically choose the radix to be used at the current step, where a subset of records is being processed, based on factors such as the number of records in that subset, the minimum and maximum key values in the records, or other criteria reflecting the current progress or state of the sorting process.

Such algorithms can, for example, dynamically switch between using 4-bit or 8-bit digits, meaning they can switch between using auxiliary tables with 16 or 256 elements. They may even freely choose the radix within a specified range, such as from 1 to 16 bits.

However, once such an algorithm has selected the radix and constructed the counter tables or index tables, the chosen radix (information capacity) of the digit or symbol, and therefore the sizes of the counter tables or index tables, will no longer change.

At the very least, this radix does not change without a complete reconstruction of the counter tables or index tables from scratch, which would involve iterating again over the subset of records being sorted and extracting their keys (and extracting digits or symbols from those keys).

This invention removes all these limitations by allowing for dynamic reduction of the radix, and consequently, the effective or actual sizes of the tables, during the sorting algorithm's operation. Importantly, this dynamic reduction of the radix is performed without reiterating over the subset of records being sorted during the reconstruction of the counter tables or index tables. As a result, there is no need to extract the keys and digits or symbols from keys of those records again.

The solutions described in this patent application enable reducing the radix by dynamically reconstructing the counter tables or index tables using data extracted from these tables themselves, without accessing the original records.

Moreover, the solutions described in this patent application allow for the reconstruction of tables by modifying the values of the elements in these tables or updating the data structures that implement these tables. It goes beyond simply reducing the workload by truncating sparse tables from the top or bottom or employing other tricks aimed solely at avoiding access to unused elements in these tables.

Moreover, after reducing the radix of the digits or symbols, it becomes possible to utilize the original counter tables or index tables constructed for higher radix digits or symbols in the subsequent steps of the sorting, searching, or other data processing process. This aspect is thoroughly discussed in the section titled "Reuse of Tables After Reducing the Radix".

In this patent application, solutions are also described for determining the optimal radix (optimal information capacity) of the processed digits or symbols using the analysis of the elements in the counter tables or index tables.

Currently, adaptive radix sorting algorithms exist that attempt to find a balance between the radix (information capacity) of the analyzed digit or symbol at a given step and the cache memory load of the computing system, which increases with the growth of this radix (information capacity).

The cache memory load increases not only due to the growth of the auxiliary table sizes but also due to the increase in the number of bins (buckets) involved in the redistribution of records during sorting.

Existing adaptive algorithms gather general information during the analysis of the input records in the form of a set of scalar values, and then they use these generalized scalar characteristics of the sorted subset of records to determine the optimal radix.

These characteristics can include the number of records in the currently sorted subset, the minimum and maximum values of the key or digit in a specific position of the key, the actual radix (digit capacity) of the keys in the sorted subset of records excluding the common prefix length, as well as derived characteristics (e.g., the actual radix or digit capacity of the difference between the minimum and maximum key values) and other similar scalar characteristics of the sorted subset of records.

Using these characteristics, existing algorithms attempt to calculate the optimal radix for the current stage in the sorting algorithm's operation.

However, all the characteristics examined by existing algorithms are values that are fundamentally scalar with respect to the subset of records being sorted at the given moment. They are computed within an iteration or series of iterations over this subset of records by updating the values of one or more scalar variables (possibly with some additional calculations after the iteration over this subset of records is completed).

Such analysis of scalar characteristics does not account for the non-uniformity of the statistical distribution of digit or symbol values in the keys of actual records, nor does it adapt to the asymmetry of record distribution across bins (buckets).

For example, it fails to consider that the density of record distribution across the entire set of possible values for a digit or symbol in a specific position within the key can be highly non-uniform, such that this non-uniformity cannot be adequately described by one or several scalar values.

Without considering the non-uniformity of key value distributions (the complex nature of the statistical distribution of key values), previous algorithms cannot accurately estimate the cache memory load that will arise at this or subsequent stages of the sorting algorithm's operation.

By operating on fundamentally scalar characteristics of the entire subset of records currently being sorted, existing solutions poorly account for the fact that many bins are used infrequently (or not at all), while others (possibly neighboring bins) are heavily utilized. This disproportion in the sizes or frequency of bin usage significantly reduces the cache memory load imposed by some bins, transferring the entire burden to other bins.

In other words, the disproportion in sizes or frequency of bin usage leads to a reduction in the overall number of bins competing with each other for placing their working elements in the cache memory of the computing device. It also reduces the competition for cache memory between elements of the sorted set of records belonging to different bins, compared to the scenario where all bins have equal sizes.

The non-uniform distribution of digit or symbol values in the keys of records can be more accurately described by vector (or matrix, multidimensional) characteristics rather than scalar characteristics.

Therefore, in this patent application, we describe novel solutions that involve the analysis of vector or matrix characteristics, which are either directly represented by the elements of counter tables and/or index tables, or obtained through transformation or processing of elements of such tables, or derived from second-order scalar characteristics computed not directly using iteration over the source records of the subset analyzed at the current stage, but through processing of elements of counter tables and/or index tables.

In other words, this patent application describes solutions that utilize the values of elements of counter tables or index tables, or characteristics derived from these elements, to determine the optimal digit or symbol capacity (optimal radix) or to determine or refine the optimal sizes of tables used in the sorting process. Importantly, in solving this problem, the proposed solutions access the elements of counter tables or index tables instead of accessing the keys of the source records, thereby avoiding the need for additional iterations over the source records or adding complex computations within the main record processing loop(s).

These solutions provide more accurate prediction of the workload during sorting and/or more precise determination of the optimal digit or symbol capacity (radix, information capacity) to be used at the current or subsequent stages of the sorting process.

Furthermore, these solutions enable avoiding direct access to the keys of the source records by replacing the work with source records with access to counter tables or index tables, which are typically significantly more compact (especially when sorting very large arrays or data structures) and/or located in faster memory, and/or do not require complex computations or information transformations (which would otherwise be needed when working with the keys of the source records).

Thus, these solutions enhance the performance of the sorting process.

The proposed solutions allow transitioning from analyzing basic scalar characteristics of the entire subset of records (which analyzed at the current stage) to analyzing vector or matrix characteristics of this subset of records, better accounting for the uneven filling of bins during the sorting process. Additionally, the proposed solutions enable deriving new second-order scalar characteristics computed through the processing of primary vector (or matrix) characteristics—through the analysis of counter tables or index tables, rather than through processing the source records or their keys directly.

In addition, there are numerous sorting or searching methods that work well when the keys in the array being sorted or the data structure being searched are uniformly or normally distributed, but they lose performance or other advantages when the key values are unevenly distributed.

In this patent application, we describe a new solution that addresses this drawback.

Also, radix sorting has a known drawback associated with the inability to quickly reach the significant part of the key if the keys of the sorted records have long common prefixes (when sorting in Most Significant Digit (MSD) order, i.e., from the most significant digit or symbol to the least significant one or suffixes (when sorting in Least Significant Digit (LSD) order, i.e., from the least significant digit or symbol to the most significant one).

This drawback significantly slows down radix sorting, especially when the lengths (or number of digits or characters, information capacity, digital capacity, bit depth or radix) of the keys is relatively large numbers, but their actual values are relatively small (when sorting in MSD order) or, conversely, very large (when processing in LSD order).

In such cases, the classical radix sorting performs many inefficient passes over the data, where there is actually no significant movement of records between the areas occupied by bins or buckets. This is also characteristic of virtually all variations of bucket sort or interval sort known to the authors of this patent application.

An intermediate solution to address this problem involves the utilization of adaptive algorithms such as spread sort, which are capable of eliminating common prefixes. However, these approaches, while effective in reducing the common prefix or suffix, prove unsuccessful if even a small subset of keys within certain records contains non-zero values of digits or symbols different from the prevalent leading prefix or suffix. This presence of non-zero or uncharacteristic values prevents the elimination of the dominant common prefix or suffix, which is prevalent among the vast majority of other records.

In this patent application, we describe a new solution that addresses this drawback.

Another improvement described in this patent application relates to working with symbols or digits of variable length.

Usually, when we refer to a counter table or an index table in existing implementations of radix and similar sorting algorithms, we assume that such a table is built for digits or symbols with a fixed radix.

In this case, we face the challenge of selecting the optimal radix (or information capacity) for the digits or symbols. If it is very small, we will have compact auxiliary tables, but each pass through the data will divide the records into a very small number of buckets. Progressing through the digits of the key value will be very slow. On the other hand, if we choose a larger radix for the digits or symbols, we will have very large auxiliary tables that may not fit in the primary cache memory of the computing system, which will also reduce performance. Additionally, we will have a large number of buckets, and moving records between them will lead to significant competition for the main cache memory of the computing system, which will also greatly reduce performance.

We can find a balance, including through the methods described in this patent application. However, for some key distributions encountered in practice, any balance expressed as a fixed number (even just for this sorting step) will be a compromise—many keys will have repeated prefixes that differ beyond the chosen "optimal" radix (beyond the chosen digit capacity or information capacity).

By selecting a radix (or digit capacity, information capacity), we make the number of buckets acceptable, but they will have significant disparities in length. Effectively, we will observe a scenario where records with frequently repeating but distinct long prefixes fall into the same bucket, and their data goes into the same cell (element) of the counter table or index table. This is because the length of their common prefix is greater than or equal to the chosen fixed radix (or digit capacity, information capacity) of digits or symbols.

In such cases, during the main phase of record movement in given pass, we will be unable to separate records within the corresponding long buckets. Instead, we will spend computational resources grouping such records within the boundaries assigned to these long buckets. Then, we will need at least one more pass through the data to separate the records located within these long buckets.

To address this problem, we propose using variable-length digits or symbols and associating them with elements of the main or auxiliary counter table or index table.

Some sorting methods that utilize binary search or determination of the index of a pivot element, as well as the binary search method itself, or, more generally, all search methods in a sorted set based on its bisection or partitioning into intervals (including binary search, Fibonacci search, interpolation search) suffer from highly uneven distributions of key values in real data.

These methods work well in identifying the pivot element and/or quickly locating the desired element when the data is uniformly or normally distributed. However, in cases of strong non-uniformity or asymmetry in the distribution of record key values, these methods either divide the array or processed subset of records into disproportionate parts (in the case of sorting), or they perform a large number of steps that do not significantly narrow down the search boundary before reaching the boundaries of the narrow interval in the sorted array or set of records where the desired record lies (in the case of searching).

In this patent application, we describe a new solution that addresses this drawback.

Another problem that can be addressed using the methods described in this patent application is the excessive comparison of common prefixes among strings that belong to the same bin (bucket).

For instance, if at a certain stage of sorting the remaining records belong to the same bucket and there are few records in that bucket, existing advanced radix sorting algorithms can switch to using a different sorting method. For example, they can sort the remaining records using quicksort. However, in such cases, the classical (unmodified) quicksort procedure would perform many unnecessary comparisons every time it compares keys of records with each other, because during the process of comparing them, the characters that make up the initial prefixes of these strings will also be compared with each other, despite the fact that these characters are known to be identical among all records being sorted at this stage (since they are common to all strings belonging to the same bucket). Such redundant comparison of matching initial prefixes among strings can significantly slow down the sorting process.

In this patent application, we describe a solution that avoids these unnecessary comparisons.

We also describe an optimization for checking whether records belong to a specific bin (bucket).

In the implementation of radix sort and similar sorting algorithms, it is often necessary to check whether a record belongs to the current or target bucket. In these cases, certain steps of the algorithm can be skipped or, conversely, must be performed.

Typically, such a check is done by extracting a specific digit or symbol from the numerical value of the record's key and comparing it with the value corresponding to a particular (e.g., current or target) bucket. However, for certain types or representations of data, such as numerical keys represented by basic data types, extracting the digit or symbol from the key, and then comparing it may be slower than directly comparing the key's value with the boundary values specific to the bucket.

In this patent application, we describe a solution that allows verification that a record belongs to a bin (bucket) without extracting the digit or symbol from the numerical value of the key.

Existing implementations of radix sorting often perform many additional operations to check whether records belong (or not) to the current or target bin (bucket) during their redistribution within the sorted data structure. Sometimes, the efficiency of such algorithms can be improved by pre-grouping the records that correspond to (or do not correspond to) a specific bin (bucket). This can be achieved through pre-processing a set (or subset) of records, as described in this patent application.

Currently, hybrid sorting algorithms are widely known and utilized, which switch between different strategies depending on the conditions encountered during sorting, such as the sizes of bins (buckets) or subarrays being processed. These adaptive algorithms analyze scalar characteristics describing the current state of the sorting process, but they do not explicitly analyze the distribution pattern of the data. Such indirect analysis of data patterns, based solely on the analysis of the current state of the sorting process, but without testing hypotheses about the nature of the statistical distribution of values in the processed set of keys, may be insufficient for selecting an optimal strategy.

Therefore, we describe a novel method that utilizes the analysis results of keys of records to test one or more hypotheses about their statistical distribution characteristics and/or to verify their compliance with a certain pattern or set of patterns. The analysis results may include the analysis of counter table or index table, and/or the analysis (evaluation) of information quantity (entropy) in the values of keys of records or in certain parts of such values. These results are used to choose the strategy for further actions (e.g., selecting an algorithm or method in the sorting or searching process) and/or to compute control parameter(s) that influence the sorting or searching process.

The choice of the best search or sorting algorithm (or the best parameters of such algorithm) can be such a nontrivial task that it cannot be solved using classical methods of statistical analysis and individual heuristic checks. Therefore, in another section of this patent application, we also describe the use of models, classifiers, machine learning networks, perceptrons, and neural networks to optimize search and sorting processes.

We also describe optimized sorting methods designed to extract special groups of records (e.g., "n" records with the largest key values, "n" records located around the median of the ordered set, or all records whose keys constitute a certain quantile or percentile).

Corresponding tasks are already widely known in computer science, and they can be solved using set sorting. We describe a series of new methods that utilize special and highly efficient modifications of radix, bucket, or interval sorting methods to solve these tasks. For some tasks and input datasets, the proposed methods can achieve significantly higher performance than other known solutions that use full or even partial sorting of a different type, or sorting implemented without the optimizations proposed by us.

In some sections of this patent application, we describe the use of entropy estimation or, in other words, the estimation of the amount of information contained in record keys or in other data.

There are many methods for estimating entropy (information quantity), but most of them either compute this estimation as a byproduct during resource-intensive data transformations (e.g., data compression), or they are tied to specific data semantics. Such methods are not suitable for use in general-purpose sorting processes because while entropy estimation can be useful, for example, in selecting the optimal sorting method or estimating the values of parameters such as the initial digit capacity or information capacity for building a counter table or index table, the computational cost of calculating entropy itself can outweigh the positive effect of its use.

Therefore, in this patent application, we describe two novel entropy estimation methods. They do not claim to provide accurate estimates but have two advantages: they are not tied to the semantics of the numerical or string values for which the entropy estimation is computed, and they allow for efficient implementation on modern computing devices.

Most implementations of radix, bucket, or interval sort with MSD (Most Significant Digit) order of movement by key, and possibly other sorting methods, contain some form of operation step in which the records of the subset being sorted at that stage (during that pass, round, or full sorting step) are redistributed.

During this step, the redistribution or relocation of records is performed in such a way that they are relocated according to the arrangement of buckets defined for them by the sorting algorithm. For example, according to the bucket arrangement specified in the counter table, converted into cumulative form in the radix sort with MSD (Most Significant Digit) order of movement by key.

While radix sort itself and similar sorting methods allow highly efficient parallel implementation, the step of record redistribution in these sorts is typically implemented (executed) sequentially. Existing implementations of radix sort, known to us at the moment, cannot perform this task in a parallel manner, even on a multiprocessor or multi-core system.

The challenge for a parallel implementation of the phase of record redistribution lies in the necessity of accessing at least two elements of the counter table or index table to transfer one record from the source bucket location (where the record is not in its correct position) to the target bucket location prescribed for it by the sorting algorithm. Different executive devices may concurrently process different records, but they will constantly compete with each other for access to the elements of the shared counter table or index table.

In this patent application, we describe a new solution that addresses this drawback.

BRIEF DESCRIPTION OF INVENTION

For greater clarity throughout the text of this patent application, we describe the organization and implementation of sorting, searching, and other data processing methods. However, we protect not only the methods but primarily the apparatus that implements and executes (uses in its operation) these methods. Since the apparatus is a highly complex entity and comprises numerous components that fall beyond the scope of this patent application, we find it more convenient to describe only the key differentiators of this apparatus, mainly related to the improved or novel methods it embodies. Nevertheless, in the claims of this patent application, we reserve the right to protect the device that executes these methods. This is also supported by the figures accompanying both this patent application and previous provisional patent application, which illustrate the apparatus performing the methods, rather than the methods in their pure form.

In this patent application we describe a new method (algorithm, program, software, system, scheme, circuit, logic block or device that uses said method) that is characterized by performing a transformation or rebuilding of an old, or construction of a new counter table (particularly a table that contains information about the number of records whose keys contain a certain digit or symbol value, or information about the frequency at which digits or symbols occur in the subset of records being sorted, or information about the statistical characteristics of their distribution, or properties of the distribution of the key values themselves); or is characterized by performing the transformation or rebuilding of an old, or construction of a new index table (particularly a table with references to lists of records or other data structures enumerating records); whereby said transformation or rebuilding of an old, or construction of the new counter table or index table is performed during the sorting process and utilizes the information contained in the values of the original counter table or index table elements, or information derived using these values taken from the original tables.

This new method allows for a specific implementation that is characterized by not performing new accesses to the set or subset of records used to construct an original counter table or index table during a transformation or rebuilding of an old, or creation of a new counter table or index table, because said transformation or rebuilding of an old, or creation of the new counter table or index table is performed using the information already present in the previously constructed original counter table or index table (which may correspond to digits or symbols of higher information capacity or digit capacity), even if the transformed, rebuilt, or new counter table or index table corresponds to digits or symbols of lower information capacity or digit capacity; additionally, at the discretion of an engineer skilled in the art, this implementation also permits the use of additional information (in addition to the information contained in the transformed table), if necessary.

In particular, this transformation of the counter table or index table enables the transition to using digits or symbols of lower information capacity or precision at a certain step or steps in the sorting process. This is achieved by utilizing the transformed counter table or index table with digits or symbols of lower information capacity or digit capacity at that step or steps. Furthermore, during the transformation, restructuring, or construction of the counter table or index table, there may be no access to the keys of the set or subset of records being sorted at the corresponding step or steps.

This new method can be implemented in a way that does not require performing a new iteration over the original set of records being sorted or reading their keys. It avoids additional repeated accesses to the original set or subset of records or its keys, meaning there is no need to extract or compute the values of their keys again during the transformation or rebuilding of the old, or construction of the new counter table or index table.

However, at the discretion of the engineer skilled in the art, hybrid implementations (combining with other methods) can be created, which include both the restructuring of old or construction of new tables as described above (using information taken from the elements of the original tables) along with accessing the original subset of records being sorted at the corresponding step or steps.

Dynamic reduction of digit capacity or symbol width (information capacity, radix) also allows for reducing the effective (and if necessary, actual) sizes of auxiliary tables and/or other auxiliary data structures that will be used at this or subsequent step(s) of the sorting algorithm.

Moreover, after reducing the radix of the digits r symbols, it becomes possible to utilize the original counter tables or index tables constructed for higher radix digits or symbols in the subsequent steps of the sorting, searching, or other data processing process. This aspect is thoroughly discussed in the section titled "Reuse of Tables After Reducing the Radix".

Such reuse of information contained in these tables allows avoiding multiple operations of constructing new counter tables or index tables in subsequent stages (steps, rounds, or passes) of sorting, searching, or other data processing, thereby enhancing the performance of these processes.

In the section "Determining Optimal Information Capacity and Termination Criterion for Downsampling Algorithm", we describe a new method (algorithm, program, software, system, scheme, circuit, logic block or device that uses said method) for determining the optimal information capacity, digit capacity, bit depth, or radix of digits or symbols that is characterized by computing or determining the optimal information capacity, digit capacity, bit depth, or radix of digits or symbols using information extracted from the elements of the counter table or index table.

Also, in the aforementioned section we describe a more general method (algorithm, program, software, system, scheme, circuit, logic block or device that uses said method) intended for evaluating a certain optimization criterion (particularly for estimating the workload or cache memory load of a computing system) or for evaluating a certain characteristic of the processed set of records by using information extracted from the elements of the counter table or index table to compute the estimate of the optimization criterion or the characteristic of the processed set of records.

Such estimation (evaluation) can be used for optimization based on various criteria, including criteria other than determining the optimal information capacity (including digit capacity, bit depth or radix) of digits or symbols. For example, such estimation (evaluation) can be used for selecting the optimal algorithm or strategy in sorting, searching, or other data processing algorithms or methods during the operation of a specific implementation.

The decision to switch to another sorting or processing algorithm or to choose a different strategy for sorting, searching, or other data processing can be implemented by analyzing multiple factors. However, including estimates of workload or cache memory load (which can be estimated using the methods described in this patent application) as primary or additional factors allows to improve the quality of the decisions made.

Furthermore, one of the characteristics of the processed set of records or one of the estimates of the optimization criterion can be the estimation of the optimal digit capacity (including bit depth or radix) or information capacity of digits or symbols, which can be subsequently used at some step or steps during the sorting, searching, or other data processing.

We emphasize that while reducing the cache memory load is one of the optimization criteria in our proposed methods (algorithms) and their specific implementations, the methods (algorithms) described in this patent application can be used for optimization based on any other criteria, and not only during sorting. In particular, for a specific sorting implementation, reducing table size or lowering the information capacity (including digit capacity, bit depth or radix) of digits or symbols may have intrinsic value, even beyond the criterion of reducing workload or cache memory load.

In this patent application, we describe novel solutions that involve the analysis of vector or matrix characteristics, which are either directly represented by the elements of counter tables and/or index tables, or obtained through transformation or processing of elements of such tables, or derived from second-order scalar characteristics computed not directly using iteration over the source records of the subset analyzed at the current stage, but through processing of elements of counter tables and/or index tables.

In other words, this patent application describes solutions that utilize the values of elements of counter tables or index tables, or characteristics derived from these elements, to determine the optimal digit or symbol capacity (optimal radix) or to determine or refine the optimal sizes of tables used in the sorting process. Importantly, in solving this problem, the proposed solutions access the elements of counter tables or index tables instead of accessing the keys of the source records, thereby avoiding the need for additional iterations over the source records or adding complex computations within the main record processing loop(s).

These solutions provide more accurate prediction of the workload during sorting and/or more precise determination of the optimal digit or symbol capacity (radix, information capacity) to be used at the current or subsequent stages of the sorting process.

Furthermore, these solutions enable avoiding direct access to the keys of the source records by replacing the work with source records with access to counter tables or index tables, which are typically significantly more compact (especially when sorting very large arrays or data structures) and/or located in faster memory, and/or do not require complex computations or information transformations (which would otherwise be needed when working with the keys of the source records).

Thus, these solutions enhance the performance of the sorting process.

The proposed solutions allow transitioning from analyzing basic scalar characteristics of the entire subset of records (which analyzed at the current stage) to analyzing vector or matrix characteristics of this subset of records, better accounting for the uneven filling of bins during the sorting process. Additionally, the proposed solutions enable deriving new second-order scalar characteristics computed through the processing of primary vector (or matrix) characteristics—through the analysis of counter tables or index tables, rather than through processing the source records or their keys directly.

Improving the estimation of cache memory load or the anticipated workload during sorting allows for a more accurate determination of the optimal digit or symbol radix (information capacity) for using this radix (information capacity) at this or subsequent step(s) in the sorting process. A more precise estimation of the optimal digit or symbol radix helps reduce the amount of work performed during sorting and/or increase performance by reducing the cache memory load of the computer system.

In this patent application, we also describe a new method (algorithm, program, software, system, scheme, circuit, logic block or device that uses said method) for determining an optimal information capacity, digit capacity, bit depth, or radix of digits or symbols that is characterized by utilizing an analysis or transformation of a counter table or an index table to determine the optimal information capacity, digit capacity, or bit-depth of digits or symbols, achieved through a function that incorporates information obtained from said analysis or transformation, or based on the fact that the sequence of iterations in said analysis or transformation is terminated. In particular, this resulting optimal information capacity, digit capacity, bit depth, or radix of digits or symbols can be used at some step or steps during sorting, searching, or other data processing.

We also describe a new method (algorithm, program, software, system, scheme, circuit, logic block or device that uses said method) that is characterized by utilizing information extracted from a counter table or an index table to determine the termination criterion of an iterative algorithm for transforming the counter table or the index table, enabling the subsequent use of a different information capacity, digit capacity, bit depth, or radix for digits or symbols at a certain step or steps in the process of sorting, searching, or other data processing.

There are numerous sorting or searching methods that work well when the keys in the array being sorted or the data structure being searched are uniformly or normally distributed, but they lose performance or other advantages when the key values are unevenly distributed.

To overcome this and similar limitations, we propose normalizing the key values before using them in the sorting or searching algorithm by applying a mathematical function or data processing function to the original key values. This normalization process aims to make the key values more evenly distributed or better suited in some other sense for the efficient operation of the sorting or searching algorithm (for superior performance of the sorting or searching algorithm).

Also, as mentioned in the "Background of Invention", existing radix, bucket, or interval sorting methods often suffer from the inability to reach distant digits or symbols in the key in a single pass. In this patent application, we describe a new class of logarithmic sorting algorithms (methods) based on applying a logarithmic function to the record keys. Such logarithmic sorting allows overcoming these drawbacks, as it can reach the very last (or first) digits of a key in a single pass, even in the presence of a subset of elements in the sorted set with differing prefixes (with MSD sorting order) or suffixes (with LSD sorting order).

Another improvement described in this patent application relates to working with symbols or digits of variable length.

To address this problem, we propose using variable-length digits or symbols and associating them with elements of the main or auxiliary counter table or index table.

Even in cases where we have a large number of records with long matching prefixes (or suffixes in the case of LSD sorting order), where the differences start beyond the optimal radix (or digit capacity, information capacity) selected for a fixed length of the digit or symbol, this method allows us to distribute such records into different buckets within a single pass. It also allows for shifting in each of them by a larger magnitude than the radix (or digit capacity, information capacity) of a digit or symbol that would be selected using a fixed length of the digits or symbols.

We also describe a method that allows us to maintain the sizes of tables for variable-length digits or symbols at a level where the number of active buckets remains acceptable in terms of the workload during record movement (relocation between buckets) and/or in terms of the competition for the cache memory of the computing system.

As mentioned in the "Background of Invention", some sorting methods that utilize binary search or determination of the index of a pivot element, as well as the binary search method itself, or, more generally, all search methods in a sorted set based on its bisection or partitioning into intervals (including binary search, Fibonacci search, interpolation search) suffer from highly uneven distributions of key values in real data.

In this patent application, we describe a new class of search or indexing algorithms (methods) called "logarithmic search and indexing" based on applying a logarithmic function to the record keys. In the presence of significant non-uniformity or asymmetry in the distribution of key values in real data, utilizing the logarithmic function of the key value and/or the logarithmic function of the boundary value (instead of directly using the original key value and/or the boundary value) significantly enhances the likelihood of dividing the array, working interval, or set into approximately equal parts during sorting or searching, and/or allows for faster narrowing of the boundaries of the examined interval during the search for the desired record.

In this patent application, we also describe methods for optimizing comparisons in radix, bucket, interval, and other similar sorting algorithms, some of which are also applicable to other sorting or data searching methods. One of these methods allows avoiding unnecessary comparison of the common prefixes of strings (e.g., strings that belong to the same bin or bucket), while another method allows comparing the keys themselves without extracting the digit or symbol from the numeric value of these keys during checking if the corresponding record belongs to a certain bin or bucket. These methods are discussed in detail in the sections "Optimization of String Comparison in Presence of Common Prefix" and "Optimization of Verification that a Record Belongs to a Bucket" in the detailed description of the invention.

Furthermore, in this patent application, we describe methods for preprocessing areas within arrays or other data structures, which allow grouping records that belong (or, conversely, do not belong) to a specific bin(s) or bucket(s). This can be useful for improving radix sorting methods and related sorting algorithms, as discussed in detail in the section "Preprocessing of Bucket Placement Areas Prior to Main Record Relocation" in the detailed description of the invention.

Next, in the section "Analysis of Data Distribution for Selecting Sorting or Searching Strategy" we describe a novel method that utilizes the analysis results of keys of records to test one or more hypotheses about their statistical distribution characteristics and/or to verify their compliance with a certain pattern or set of patterns. The analysis results may include the analysis of counter table or index table, and/or the analysis (evaluation) of information quantity (entropy) in the values of keys of records or in certain parts of such values. These results are used to choose the strategy for further actions (e.g., selecting an algorithm or method in the sorting or searching process) and/or to compute control parameter(s) that influence the sorting or searching process.

As a further development of these ideas in the section "Utilizing Machine Learning and Neural Networks for Sorting or Searching Strategy Selection" we also describe the use of machine learning models, classifiers, and neural networks, such as perceptrons, to determine parameters or select action strategies during the sorting or searching process.

We also describe optimized sorting methods designed to extract special groups of records (e.g., "n" records with the largest key values, "n" records located around the median of the ordered set, or all records whose keys constitute a certain quantile or percentile).

These optimized methods allow discarding bins (buckets) at the early stages of partial sorting that are known to not contain any records from the target subset, which can significantly reduce the overall workload, especially considering that this optimization can be applied in subsequent passes (steps, rounds, stages) of the sorting process. We also describe the use of a more efficient method for implementing the record relocation step between bins (buckets) during partial sorting.

In this patent application, we also describe two novel entropy estimation methods. They do not claim to provide accurate estimates but have two advantages: they are not tied to the semantics of the numerical or string values for which the entropy estimation is computed, and they allow for efficient implementation on modern computing devices.

One of these methods is based on the idea of estimating the uniformity of the distribution of values of individual digits in various positions of hash function values, where such a hash function applied to the elements of the dataset for which the entropy estimation is computed. The second method is used to estimate entropy in individual digits or symbols within keys through the analysis of the counter table or index table.

In the section "Parallel Implementation of Record Redistribution" we also describe parallel implementations of the record redistribution step, which is used in many radix sort and similar sorting algorithms.

While radix sort itself and similar sorting methods allow highly efficient parallel implementation, the step of record redistribution in these sorts is typically implemented (executed) sequentially.

In this patent application, we also describe a new method that replaces most accesses to the main counter table or index table with local accesses to a "shadow" counter table or index table, which is used only by the given executive device. This approach reduces substantially the frequency of conflicts between executive devices during the process of record redistribution.

All solutions described in this patent application can be applied individually, in combination, or composition with each other (where appropriate), as chosen by a person skilled in the art.

Figure 1:
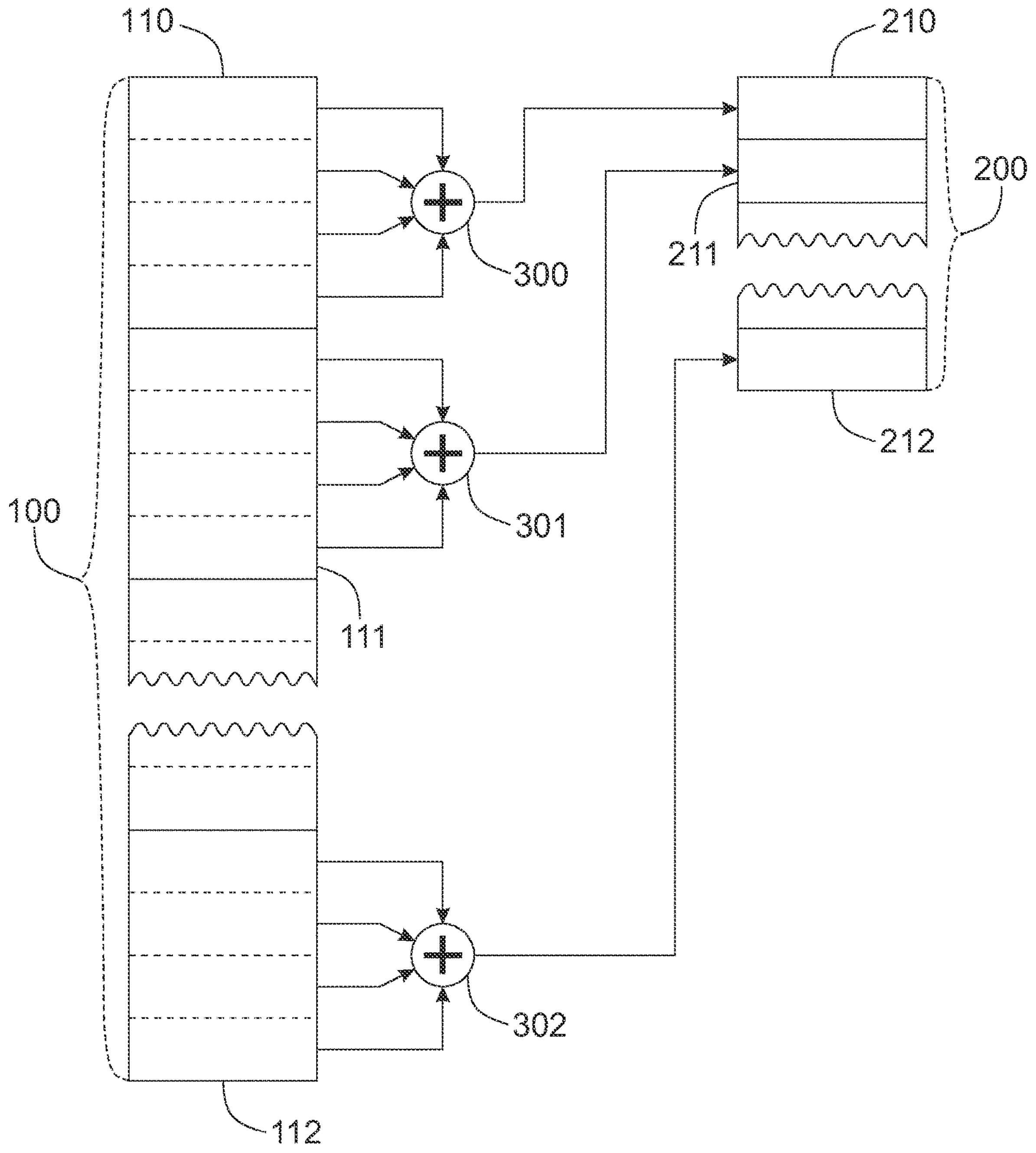
FIG. 1
Figure 2:
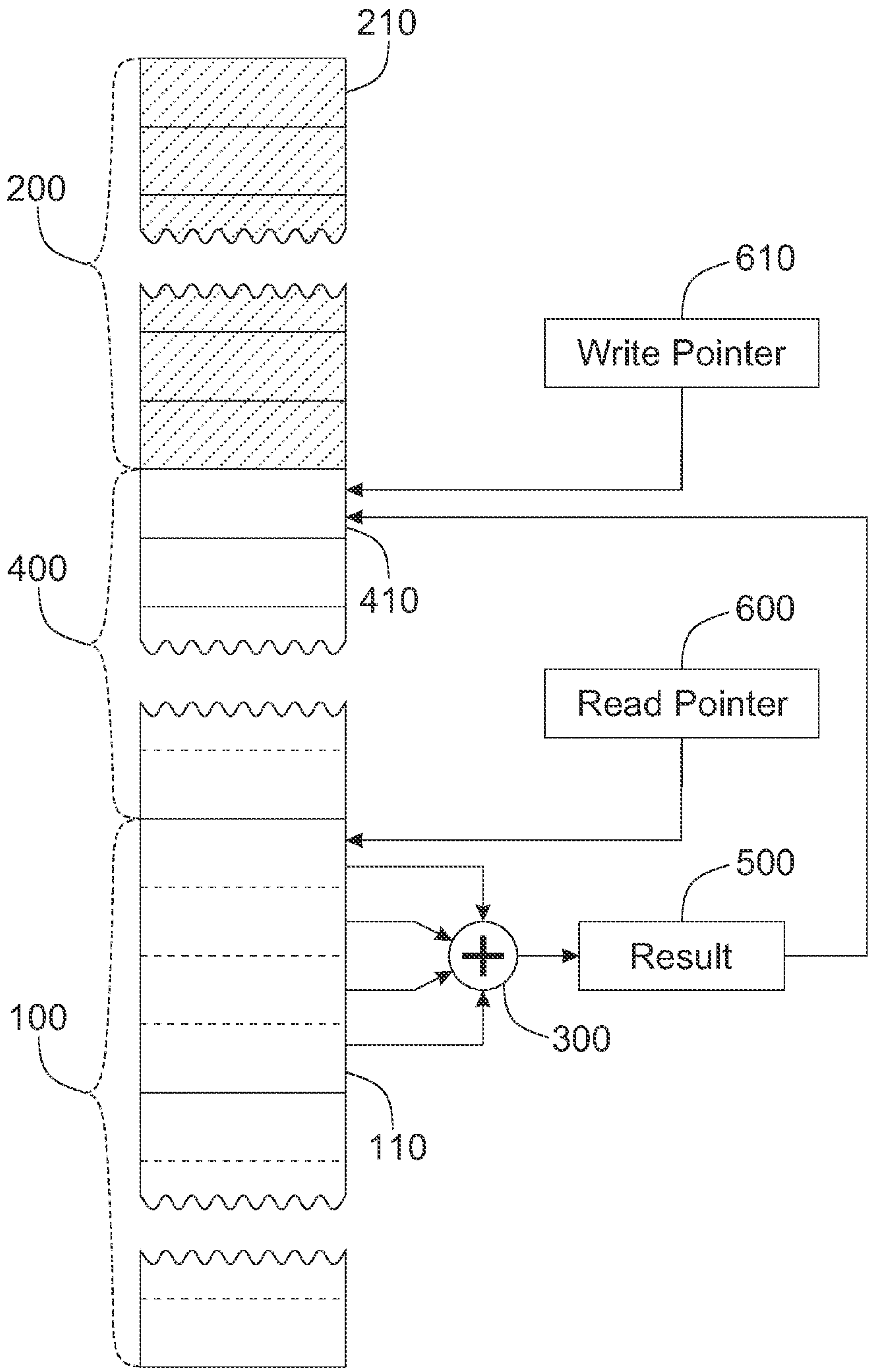

This figure illustrates the operation of software or a computational device scheme implementing a method of reducing resolution, i.e., converting a counter table with higher resolution to a counter table corresponding to lower resolution. In particular, this new table can be used in a standard or enhanced method, algorithm, or device for radix, bucket, or interval sorting, instead of the original counter table.

FIG. 2

This figure illustrates the operation of software or a computational device scheme implementing a method of reducing resolution, i.e., converting a counter table with higher resolution to a counter table corresponding to lower resolution. In particular, this new table can be used in a standard or enhanced method, algorithm, or device for radix, bucket, or interval sorting, instead of the original counter table. In this specific implementation, the transformed table is placed in the same memory area as the original table with higher resolution.

FIG. 3

This figure illustrates the operation of software or a computational device in which a method is implemented for the rapid evaluation of a specific optimization criterion (particularly for assessing workload or cache memory load in a computing system) or for computing a characteristic of the processed subset of records, as detailed in the section "Fast Evaluation of Optimization Criteria or Characteristics".

This figure also illustrates method (algorithm, program, software, system, scheme, circuit, logic block or device that uses said method) that is characterized by the use of computing the value of a certain function, hereinafter referred to as a "compression function" that maps the original set of possible values of a certain selected quantity characterizing the elements of an original set of objects into a more compact set of values, with the purpose of using such computed values of said compression function for indexing or addressing a certain auxiliary data structure, the elements of which are used for the accumulation of any information obtained or computed using arbitrary values that characterizing the elements of the original set of objects, or for counting the number of such elements of the original set of objects that correspond to certain computed value or values of said compression function, possibly in combination with other criteria.

FIG. 4

This figure illustrates the operation of software or a computational device in which a method is implemented for evaluating a certain optimization criterion (such as workload volume or cache memory load in a computational system) or for computing characteristics of a processed subset of records. This method can also be used for evaluating (determining) the optimal information capacity (e.g., optimal digit capacity, bit depth or radix) of digits or symbols.

The figure also demonstrates the use of a termination criterion for early stopping the computation of this evaluation (including the use of a criterion for the early termination of the downsampling algorithm).

These methods are discussed in more detail in the sections "Determining Optimal Information Capacity and Termination Criterion for Downsampling Algorithm" and "Fast Evaluation of Optimization Criteria or Characteristics".

FIG. 5

This figure illustrates a key aspect of the operation of software, a scheme, or a computational device implementing the logarithmic sorting method, which is detailed in the section "Logarithmic Sorting". It also demonstrates a key aspect in constructing an index for one of the fast information retrieval methods described in the section "Logarithmic Search and Indexing". Additionally, if the logarithmic function (denoted as 330 in the figure) replaced with another normalizing function, the figure can be interpreted as illustrating the method of preparing a counter table for sorting or searching using key normalization, as described in the section "Normalization of Data in Sorting or Search".

DETAILED DESCRIPTION OF INVENTION

Relationship Between Device and Method

For greater clarity throughout the text of this patent application, we describe the organization and implementation of sorting, searching, and other data processing methods. However, we protect not only the methods but primarily the apparatus that implements and executes (uses in its operation) these methods. Since the apparatus is a highly complex entity and comprises numerous components that fall beyond the scope of this patent application, we find it more convenient to describe only the key differentiators of this apparatus, mainly related to the improved or novel methods it embodies. Nevertheless, in the claims of this patent application, we reserve the right to protect the device that executes these methods. This is also supported by the figures accompanying both this patent application and previous provisional patent application, which illustrate the apparatus performing the methods, rather than the methods in their pure form.

Definitions of Terms

This section defines the interpretation of complex terms used in the text of this patent application and its claims. The definitions provided here are intended to apply throughout, including in the claims, except in cases where the specific paragraph or claim text explicitly indicates or unambiguously implies a different interpretation, or when an alternative interpretation is explicitly stated in a particular section of this patent application.

This section should also be considered as part of the Detailed Description of Invention. Some solutions described below (directly in this section of the patent application) not only explain the meanings of terms and demonstrate the use of entities corresponding to these terms in specific implementations but can also themselves be considered as part of the innovations that constitute the essence of the inventions described in this patent application.

In particular, this section mentions, describes, or lists certain approaches (methods, solutions) that can be used by a person skilled in the art to implement the inventions described in this patent application in specific embodiments (particularly in the implementation of radix, bucket or interval sorting, in the implementation of digital search methods, and in other embodiments). Some of the approaches described here contain innovative elements themselves and therefore may be considered as part of the inventions described in this patent application.

We note that in case of any discrepancies between the content in this section and the main part with detailed description of the inventions, preference will always be given to the material that allows for a broader interpretation of the invention.

For some terms below, their synonyms are sometimes given in parentheses.

Symbol value (or "value of the symbol")—the term "Symbol value" refers to a number, code, or ordinal assigned to a particular symbol in an alphabet, character or string encoding standard, code table/character set, or in the specific standard or implementation of a programming language. It can also represent the weight associated with a symbol for sorting or comparing individual characters, strings, and/or more complex objects (including sequences) defined using the concept of symbols. Alternatively, it can denote any other numerical value associated with the symbol. It can also refer to the original value of the symbol itself, its index, associated key, selector, or identifier as defined in a programming language or in some encoding, if such value, index, associated key, selector, or identifier can be used (directly or after some transformations) as a number or as an identifier of an element, index, selector, or key for accessing elements in an array, set, indexed or associative data structure, for addressing or accessing memory cells.

Bucket number (or "bin number")—the term "Bucket number" (or "bin number") refers to the ordinal number, numeric value, code, index, weight, identifier, associated key, selector, or symbol value (as defined above) assigned to a specific bucket (or bin) or used to identify (select) one of the buckets (or bins) in an algorithm, method, scheme, or specific implementation of bucket sorting, either in any other algorithm, method, scheme, or specific implementation that uses the concept of buckets or bins.

Interval number (or "number of the interval")—the term "Interval number" (or "number of the interval") refers to the ordinal number, numeric value, code, index, weight, identifier, associated key, selector, or symbol value (as defined above) assigned (associated) to a specific interval or used to identify (select) one of the intervals in an algorithm, method, scheme, or specific implementation of interval sorting. It also can represent the initial, final, or other value associated with the interval or assigned to it.

Radix sort—the term "Radix sort" refers to any algorithm, program, software, method, system, scheme, logic block, or device designed for sorting, where the key by which the records are sorted represents or can be interpreted as:

a) An object for set of which a lexicographic order or another order relation, partially or entirely defined through the order of symbols, is defined. For example, it can be a sorting algorithm that exploits the fact that the sorting key is a string composed of symbols, and the succession (order) of such strings is determined by the order relation defined for the set of symbols from which these strings are composed.

b) And/or as a number (numeric value) or other mathematical object that can be represented or written as a sequence of digits, where the values and positions of such the digits allows to determine the order relation between the numbers or objects represented or written by such a sequence. For example, it can be a sorting algorithm that exploits the fact that the sorting key can be represented as a number written in a positional numeral system, and the order of the sorted records corresponds to the order of the values of such numerically written keys if we imaginatively place them on the number line.

We emphasize that this definition includes not only radix sort and all its variations but also bucket sort and all its variations. This is because the selection of a bucket at each step of bucket sort can be interpreted as computing the value of the next digit of a real or synthetic (imaginary) key, if the key is interpreted as a number, or as determining the value of the next character in a string, if the key is interpreted as a string.

In this patent application, interval sort is also considered a variation of radix sort, as the selection of an interval that contains the key value at each step of interval sort can also be interpreted as computing the value of the some digit of a real or synthetic (imaginary) key, if the key is considered as a number, or the next character in such a key, if the key is considered as a string.

Furthermore, any complex algorithm, program, software, method, system, scheme, logic block, or device designed for sorting can be considered a radix sort if it exploits the aforementioned interpretation of the key as a number (numeric value), string, or similar object, at least at some steps in its operation, thus combining (or composing) radix, bucket, or interval sort with other methods.

We emphasize that in the definition of radix sort, we intentionally do not specify whether the ordering relations defined for the set of keys, digits, and/or characters are complete or partial ordering. This is because all the solutions described in this patent application can be used not only for fully ordering a set of objects (resulting from sorting) but also for partially ordering, where complete ordering is not initially required by the problem conditions (it means that the specific task or problem being addressed does not necessitate a fully sorted outcome), or when complete ordering is achieved using additional algorithms or methods, or when it is achieved in the future (through additional steps), or when complete ordering is not required because the sorting algorithm or method is part of a more complex solution that combines (or composes) radix or bucket sort with other approaches.

In short and simplified summary, radix sort refers to any algorithm, program, software, method, system, scheme, logic block, or device that utilize the structure or interpretation of the sorting key, either as a string of symbols with an established order relation or as a numerical representation with a defined order relation based on digit values and positions. Additionally, it can be any other algorithm, method, scheme, logic block, or their implementation designed for ordering objects, utilizing the interpretation of a key as a string of characters or a numerical value, as stated above.

Bucket sort—any sorting based on determining the placement of a record's key into one of several buckets, which are used to distribute the sorted records. As mentioned above, in this patent application, we consider bucket sort and its based methods as variations of radix sort, as the differences between these methods do not hinder the implementation of the innovations described in this patent application.

Interval sort—any sorting based on determining the placement of a record's key into one of the intervals or ranges into which the set of possible key values can be divided. As mentioned above, in this patent application, we consider interval sort and its based methods as variations of radix sort, as the differences between these methods do not hinder the implementation of the innovations described in this patent application.

Engineer skilled in the art (or "person skilled in the art")—an engineer (person) with expertise in the relevant field, who intends to utilize (apply, implement) at least one of the solutions (inventions) described in this patent application in their algorithm, program, software, method, system, scheme, logic block, or device. In the process of working on a specific implementation, an engineer skilled in art may adapt the algorithms, methods, schemes, or other solutions described by us to their specific implementation. However, as long as the adaptation they make includes the original elements that constitute the innovations from this patent application, their specific implementation as a whole should be considered an implementation of the inventions from this patent application.

Specific implementation (or simply "implementation")—any implementation of an algorithm, method, program, software, system, scheme, logic block, or device described in this patent application, as well as any implementation of a solution or approach that constitutes the essence of any of the inventions described in this patent application. In particular, at the choice of an engineer skilled in the art, a specific implementation can be in the form of an algorithm, program (including a function, procedure, or subroutine), software (including program code), a method of actions (such as a sequence of steps), a system (e.g., a computing system), a scheme, logic block, or a device (e.g., a computing device); or it can be a part, combination or composition thereof (for example, it may include both software and hardware components). At the discretion of an engineer skilled in the art, a specific implementation can also be included (combined, composed, embedded) in a more complex solution (in particular, can be implemented as part of it) and may include (combine, compose) additional parts in the form of additional solutions and functionalities (the implementation of which is beyond the scope of this patent application).

Sorting implementation—a specific implementation of a sorting algorithm, method, or scheme; in particular, it can be a program, software, system, scheme, logic block, or device that implements a specific sorting algorithm, method, or their corresponding scheme. For example, it can be a specific implementation of the algorithm, method, or corresponding sorting scheme described in this patent application.

Sorting Process—the process of executing a sorting algorithm or the process of performing actions according to a specific sorting method or scheme, i.e., the process of operating an algorithm, program, software, system, scheme, and/or device that performs sorting (e.g., in accordance with the algorithm, method, or scheme described in this patent application).

Computing device (or simply "the device")—any device capable of performing operations and/or processing data according to a certain algorithm, method, or scheme. In particular, this can be a computer, a mobile device containing a processor, a computing system as a whole, or a real, virtual, emulated, or simulated processor: Central Processing Unit (CPU), Graphics Processing Unit (GPU), Floating Point Processing Unit (FPU), Digital Signal Processor (DSP), specialized processor or coprocessor, as well as a logically delineated part of a more complex processor, such as a processor core. In addition to a universal or specialized computer, computing system, or processor, a computing device can also be considered a mobile device with a processor, a controller, a microcontroller, or a system containing them, a computer running a virtual or abstract machine, a virtual, emulated, or simulated computing device, as well as a real, virtual, emulated, or simulated specialized ASIC or programmable logic array (PLA, FPGA), operating according to a certain algorithm, method, or scheme. We emphasize that this definition, in addition to classical computers, computing systems, general-purpose processors, mobile devices containing processors, virtual machines, and emulator's, also includes specialized devices as well as real, virtual, abstract, emulated, and simulated devices, designed for data processing, both programmable using imperative instructions and operating on other principles (such as functional programming, data flow control, etc.), including those operating according to a predefined scheme (such as programmable logic arrays PLA/FPGA or specialized microchips such as ASIC, etc.).

Function (or "arbitrary function", or "some function", or "certain function")—any additional algorithm, method, or scheme designed to process data provided to it as input and produce a certain result and/or change in the state of a computing device or system. For example, this can be any mathematical or algorithmic function, a part of a program, or a sequence of actions according to a certain method, any scheme or logic block, designed to process input data in order to obtain a result (explicitly or implicitly, through changing the state of a computing device or system).

In the context of specific implementations, when referring to the implementation of a computing device or part of it, these terms refer to the realization of a certain algorithm, method, or scheme for computation and/or data processing for that device, regardless of the specific form chosen for that implementation (including whether this implementation is done at the hardware and or software level, such as through microcode). In particular, such a hardware implementation of an algorithm, method, or scheme can be a circuit or part of a circuit of the device, or it can be in the form of microcode executed by the device, or a combination (or composition) thereof.

If referring to a program or software, these terms refer to an arbitrary operator, operation, instruction, command, or sequence thereof, a program fragment or its code, a function or procedure that implements a certain algorithm, method, or scheme for computation and/or data processing. Such an operator, operation, instruction, command, or sequence thereof, a program fragment or its code, a function or procedure may also utilize specific hardware capabilities offered by the particular computing device.

These terms also encompass any hybrid software-hardware implementation of a certain algorithm, method, or scheme for computation and/or data processing.

It should be noted that, at the discretion of an engineer skilled in the art, a specific implementation of a function may use arbitrary additional information and/or additional data structures, may modify the contents of the memory of the computing device, and may return additional results in addition to those directly discussed in the description of this invention.

Symbol (or "character")—the term "symbol" (or "character") in this patent application corresponds to the standard understanding in the field of computer science. It can be defined as a unit of information or a single element from the set that composes strings. In the context of this patent application, the terms "symbol" and "character" are used interchangeably and are synonymous.

Record in the context of sorting, it refers to an object or a set of objects that must be fully or partially ordered as a result or during the sorting process. In particular, a record can be an element of an array, subarray, list, set, or subset of objects subject to sorting. It can also refer to an element of any other data structure whose elements need to be fully or partially sorted (arranged in a specific order) using an algorithm, method, program, software, system, scheme, logic block, or device in the description of which the term "record" is used.

In the context of information retrieval tasks, a record is an element of a set of objects among which a search is conducted.

A record may directly contain information that constitutes an object (a set of which is to be ordered or searched), or (in specific implementations) it may refer to such information, for example, located in a separate (different) memory area. In particular, the record can be a reference to the object itself.

The method of implementing records, that is, the method of representing objects subject to sorting or searching, is chosen by an engineer skilled in the art who will use the solutions from this patent application in their work. The solutions described in this patent application are independent of specific software and hardware methods of data storage implementation (and thus to the way records are implemented) and can be easily adapted by an engineer skilled in the art to a specific implementation.

In simplest tasks such as sorting an array or a list, the term "record" is equivalent to the concept of an "array element" or a "list element", However, in general, in specific implementations of the solutions described in this patent application, a "record" may represent a complex data structure itself or be an element of a complex data structure.

A record may consist of multiple parts (not necessarily located sequentially in memory); in particular, but not necessarily, a record may be divided into several fields (containing parts of information that together constitute the object represented by that record.

Field—a part of a record that directly contains or refers to a portion of information constituting the object represented by that record, particularly its key. A field can be explicitly implemented as a part of the record data structure, or it can be virtual (imaginary)—not explicitly represented in the record structure but computable or obtained through processing the information comprising (or composing) the record. The concept of a field is used in some but not all implementations of sorting algorithms or methods. Even if fields are not explicitly defined in a specific implementation, it can be considered that the entire record or its key represents a field.

Set of records (or "subset of records")—a collection (set) of records that need to be analyzed and/or processed eventually (e.g., fully or partially ordered during sorting) or at a specific step or stage of operation, using the discussed algorithm, program, software, method, system, scheme, logic block, or device.

When this term is used in this patent application, it typically (unless stated otherwise) refers to a specific subset of records taken from the general set of records, on the analysis or processing of which the algorithm, program, software, method, system, scheme, logic block, or device are focused at the point in its operation that is described in the portion of this patent application where this term is used.

This set or subset of records (e.g., a subset of records being analyzed or sorted at a specific stage of the sorting process) does not necessarily coincide with the entire general set of records that are subject to processing (e.g., sorting or ordering) eventually (considering all steps or stages of operation of the algorithm, program, software, method, system, scheme, logic block, or device implementing discussed invention).

For example, the sorting process may be organized in such a way that only a certain portion (a subset) of records taken from the entire general set of records to be sorted or ordered is analyzed or sorted at each specific step or stage of operation.

Element (of an array, list, or other data structure)—we sometimes use this term as a synonym for the term "record", for example, in the description of a sorting or searching method. Conversely, "record" is sometime used as a synonym for "element" when referring to accessing the element of a data structure representing that record.

Such substitutions are permissible because the set of records to be sorted or searched among, in specific implementations of the inventions described in this patent application, will often be implemented as an array, list, or other data structure, or as part of an array, list, or other data structure, for which there is a commonly accepted concept of an "element" (an element of an array, list, or other data structure) in this field.

In this context, an element of an array, list, or other data structure (implementing a "set of records" or a "subset of records" as described in this patent application) may either directly contain the data representing one of the records or refer to such data or to the memory location(s) where they are stored, at the discretion of an engineer skilled in the art.

In most of specific implementations, during the sorting or searching process, accessing the data constituting the records involves accessing the elements of some data structure (in particular, a list or array) or multiple data structures, where these elements either directly store the data constituting the records or reference this data. Therefore, in a sense and in the context of describing sorting and searching methods, it can be considered that in such implementations, each element corresponds to one of the records, as it either directly contains or represents that record, or allows access to its constituent data (taking into account the specifics of the particular implementation, for example, in some cases, considering the need to follow a reference or references stored in the element to obtain the actual data constituting the record).

Considering the above, and in order not to complicate the text of this patent application and not to hinder its analysis by the patent office or its understanding by an engineer skilled in the art, we specify in this preamble (describing the meanings of terms) that the terms "record" and "element'" (of an array, list, or other data structure) can be used interchangeably without affecting the essence of the methods described by us.

However, from a technical or programming perspective, such substitution naturally requires taking into account the specifics of the particular implementation of arrays, lists, or other data structures and considering the representation of data chosen by an engineer skilled in the art.

Record key (or "sorting key")—refers to certain information that determines the position of a given record in a sorted (fully or partially ordered) set of records (in the context of sorting tasks) or allows distinguishing the desired record(s) from other records (in search tasks).

In some specific implementations, a sorting key can be compound (composite), meaning it can be composed (comprised) of multiple individual sorting keys that together determine the position of a given record in the ordered set. Similarly, a compound (composite) key can also be used in search tasks.

Often (but not necessarily), the record key is a field or a set of fields that constitute the record.

In simpler specific implementations (such as sorting an array with elements of a basic type), the record key represents all the information constituting the object represented by the record—one can consider the record as a single field that serves as its key. For example, a sorting key could represent the value of an element of an array of integers to be sorted or the value pointed to by an element of such an array. Or, alternatively, it could be a value(s) contained within an element of a list to be sorted or value(s) pointed to by such an element.

In other specific implementations where the solutions described in this patent application can be directly utilized, the record key (sorting key) can be virtual computed or obtained as a resultant of processing the information constituting the record but not explicitly stored as part of the record.

The specific method of representing and implementing the record key is chosen by an engineer skilled in the art.

Numeric value of the key (or "numerical value of the key", "numeric key value", "numerical key value")—refers to the value of a key interpreted as a number or another object that can be represented (written) as a number or a sequence of digits or numbers (e.g., as a number or a set of numbers written in a positional numeral system); or refers to the value of a key interpreted as a string or a sequence of characters, for which a lexicographical order or another ordering relationship is defined, partially or completely, based on the order of the characters; or refers to a sequence of such objects consisting of numbers or strings, for which a partial or complete order relationship is defined.

We emphasize that we apply the concept of "numeric value of the key" not only directly to numbers but also to strings, and to numerical, character and string sequences, and similar objects if they car be interpreted as sequences of digits, numbers (e.g., written in a positional numeral system), and/or characters, for which some ordering relationship is defined based on the properties of numbers, on the lexicographical order, or on the any other order relationship based on the ordering of digits, numbers, and/or characters (the definition of a digit is considered below).

It should be noted that if the key represents a string, usually the values of the characters in this string can be interpreted as digits of a number written in a positional numeral system. If the key represents a sequence of numbers, strings, and/or characters, the elements of this sequence can also be considered as digits of a number written in a positional numeral system (possibly with a mixed and/or variable base). Therefore, in this patent application, the term "numeric value of the key" is also applied to strings and sequences of strings and numbers numeric values), not just to integers or real numbers similar mathematical objects).

The numeric value of the key determines the position of the record containing the given key or corresponding to the given key in a sorted (partially or fully ordered) set of records.

In general, apart from the key value or the information used to compute the key value, a record may contain additional information. However, for the sorting, searching, or information processing tasks discussed in this patent application, it is important that at least a portion of the information contained in the record can be interpreted as a number (or as a similar mathematical object) or as a sequence thereof. Alternatively, at least a portion of such information can be utilized to derive or calculate a number (or a similar object) or a sequence thereof. It can also be interpreted as a string or used to obtain a string or a sequence of characters. Or it can be interpreted or used to derive a sequence consisting of multiple such objects.

This information, which can be interpreted as a number, string, sequence of numbers, strings, and/or characters, or as a similar object, is generally referred to as the "numeric value of the key" in this patent application. It represents the record in a sorting task (in ordering a set of records) in the sense that it enables the correct placement of the record among other records in a partially or fully sorted (ordered) set. It also represents the record in search tasks by distinguishing the desired record(s) from other records, and possibly also indicating (permits selecting) the direction of further search.

When discussing the use of the numeric value of the key in this patent application, the specific method of obtaining this value is not specified, as the method of obtaining it in a particular implementation is determined by an engineer skilled in the art. All the solutions described in this patent application can be used regardless of the specific method chosen for obtaining the numeric value of the key.

In simple implementations, the "numeric value of the key" and the "key value" are synonyms and represent the value of a certain field in the record. In the simplest implementations, the numeric value of the key represents the entire content of the record, as the entire content of the record serves as the key. For example, when discussing the sorting of an array of numbers or strings, each element of the array is directly representing a record containing a key, and the value of such an array element represents or can be interpreted as the numeric value of the key.

However, if the elements of this array are data structures, then one of the fields of this data structure can serve as the sorting key, and the value of this field can be interpreted as the numeric value of the key. The key can also be composed of values from multiple fields, especially in the case of a compound (composite) key, and in such cases, the value of the compound (composite) key can be interpreted as the numeric value of the key.

In more complex specific implementations, the information that constitutes or allows obtaining the numeric value of the key does not necessarily have to be directly and explicitly included in the record (or in the element representing it in a data structure).

In particular, the numeric value of the key can be obtained or computed using a function (through certain transformations) during the operation of a specific implementation, using the content of the record or the data it refers to. Even if the numeric value of the key is directly stored in the record, its representation in storage may differ from the working representation used in the sorting or searching process, according to the decision of the engineer skilled in the art implementing the specific solution.

It should also be noted that all the solutions described in this patent application can be used for sorting by multiple keys (by composite or compound key), not just for sorting by a single key.

In this case, the numerical values of individual keys (parts of the composite or compound key) can be mathematically transformed or combined into a single unified numerical value of the composite (compound) key. These individual keys can either be interpreted as if they collectively form a single unified key, or the value of such a unified composite (compound) key can be explicitly computed or obtained by some transformation (some function) using the values of the individual keys. Alternatively, they can be interpreted as characters in a string representing the composite (compound) key or as digits in some numeral system (possibly with a mixed and/or variable base).

When working with composite (compound) keys, the solutions described in this patent application are applicable to both unified numerical values of composite keys and values of individual keys that are part of such a composite key, at the discretion of an engineer skilled in the art using the solutions from this patent application in their specific implementation. In particular, sorting by a composite key can be organized in a single stage (pass), where the entire composite key is treated as a single numerical key value, or in multiple stages (passes) by individual keys that constitute the composite (compound) key, or can be organized as a combination of these approaches, at the discretion of an engineer skilled in the art.

In the case of bucket sort implementation, the bucket (bin) numbers that calculated or determined (selected) at various stages of the sorting process for the same record can be interpreted as digits or sequences of digits, collectively forming the numerical value of the "virtual" (imaginary) key for that record. Alternatively, they can be interpreted as characters of a string, collectively forming the numerical value of the key. By utilizing such interpretations, all the solutions from this patent application can also be used in bucket sort implementations, in specific implementations of similar sorting methods, as well as in the complex solutions involving such methods.

In other words, when referring to bucket sort implementation (rather than classic radix sort), the sequence of bucket (bin) numbers in which a particular record falls can be interpreted as the numerical value of the key for that record. For example, this sequence of bucket (bin) numbers can be interpreted as a set of digits representing a number (numerical value of the key) in a positional numeral system (possibly with a mixed and/or variable base).

Similarly, in interval sort implementation, the interval numbers calculated or determined (selected) at various stages of the sorting process can also be interpreted as digits or sequences of digits, collectively forming the numerical value of the key for that record. Alternatively, they can be interpreted as characters in a string, collectively forming the numerical value of the key. By utilizing such interpretations, all the solutions from this patent application can also be used in interval sort implementations (or similar sorting methods), as well as complex solutions involving such methods.

We also emphasize that all the methods described in this patent application can be applied at all steps (or stages) of the sorting process or only at specific steps (stages) or combinations of steps (stages) in the sorting process. The numerical value of the key at different steps (stages) in the sorting process can be obtained or computed individually, particularly using individual parameters or constants specific to that particular step (or stage), or set of steps (stages), or even using completely different methods at different steps or stages.

Compound key value (or "composite key value")—a specific case of the numeric value of the key—a value that combines the numeric values of multiple keys that constitute a compound key. Such a value can be used for sorting a set of records by the compound (composite) key, for example, for sorting by multiple fields.

Due to the characteristics of radix, bucket, or interval sorting algorithms, a compound (composite) key can always be interpreted as a number written in a positional numeral system, where the "digits" are the values of individual keys that form the compound (composite) key. Alternatively, it can be interpreted as a string, where the "characters" are the values of individual keys.

These interpretations can be used by an engineer skilled in the art to apply all the solutions described in this patent application to sorting tasks using a compound (composite) key, particularly for sorting by multiple fields.

Numeric value of the symbol (or "numeric symbol value")—the value of a symbol when considered as a specific case of the more general concept of a 'digit value,' which will be defined below.

This term is sometimes used when sorting strings or searching for a string, or when the sorting or search key is interpreted as a string or a similar string-like object for which a lexicographic or other order relationship is defined using the concept of symbols.

Digit (or "numerical digit", or "digit value")—a numeric value (number) located at a specific position (or positions) in the notation, or in the digital or mathematical representation of the numeric value of the key (including a number composed of multiple individual digits forming such a notation or representation). Alternatively, it refers to the value of a symbol or multiple symbols located at a specific position (or positions) within a string that represents or is part of the numeric value of the key.

We emphasize that if the numeric value of the key is written or represented as a set of digits and/or as a string as a sequence of symbols (characters)) or as a combination (or sequence) thereof, then in a specific implementation of any of the solutions described in this patent application, the digit can be not only an primitive individual numerical digit or an individual character in such a notation or representation of the key, but also multiple primitive numerical digits and/or characters (symbols), usually in adjacent positions, taken from such a notation or representation—at the discretion of an engineer skilled in the art.

In particular, this is possible because such composed (combined) digits or symbols (composed of multiple original digits and/or symbols) can be considered as new digits and/or symbols (characters), or they can be interpreted as new digits and/or symbols in a certain new notation. Specifically, it can be considered that the original numeric value of the key was converted or rewritten in a new numeral system with a larger base than the original numeral system, whereby adjacent digits in the old representation have been merged (combined) into new digits in the new notation, where one new digit corresponds to multiple old digits. Or we can assume that the old numeric value of the key is simply converted to a new numeral system with a different base. Similarly, the combination of symbols can be seen as a transition to a new alphabet. Furthermore, symbols can generally be converted into digits (into codes, ordinal numbers, weights, or weight-like values, corresponding to the original symbols, and so on, see the definition of the term "symbol value" in this list of terms). Conversely, through reverse reinterpretation, numbers can be interpreted as symbols. These properties allow for the combination of digits and/or symbols into new digits and/or symbols with greater information capacity.

At the discretion of an engineer skilled in the art who working on a specific implementation, in cases where the numerical value of the key can be represented or interpreted as a number, the term "digit" mentioned in this patent application may refer to the value of an individual digit or a set of digits taken from the numerical value of the key recorded (written) in a certain positional numeral system (possibly with a variable and/or mixed base). In cases where the numerical value of the key can be represented or interpreted as a string of symbols (characters), the term "digit" may refer to the value of an individual symbol (character) or a set of symbols (characters) located at specific positions in the string representing the numerical value of the key. A digit can also be considered as the bucket number determined (computed) at some step of bucket sort since such a bucket number can be regarded as a digit in the representation of the numerical value of a virtual key. Alternatively, it can be the interval number determined (computed) at some step of interval sort, which can also be considered as a digit in the representation of the numerical value of a virtual (imaginary) key. A digit can also be the value of a number, a set of numbers, a symbol, or a set of symbols, or combinations thereof, forming part of the sequence representing the numerical value of the key.

In most of specific implementations of the solutions described in this patent application, a digit represents a value in a specific position in the notation or presentation of the number that is represents the sorting key (representing the respective record in the sorting task); or it represents the value of a symbol at a specific position in a string that constitutes the key or is part of the key; or it represents the bucket number determined (computed) at some step of bucket sort; or it represents the interval number determined (computed) at some step of interval sort; or it represents a number, symbol, or a set thereof, forming part of the sequence comprising (composing) the numerical value of the key.

However, this patent application implies that, in a more general sense, an arbitrary value composed of numbers and/or symbols extracted from the analyzed record or obtained through some function applied to the information constituting or derived from the record (e.g., obtained through some function applied to the value of the field or fields within the record) and/or to the corresponding object(s) to which the record refers can be used as a digit. In other words, it can be a value computed or obtained based on the information contained in the record or based on the information it refers to—as determined by an engineer skilled in the art.

In particular, such a value can be the numerical value of a certain field within the record. Alternatively, an individual numerical digit, digits, symbol, or symbols taken from the complete numerical value of the field or from part of it, or any other numerical value computed using any information constituting the record (directly or indirectly, if the record refers to some information) may be interpreted as a digit at a certain step or stage in the sorting process.

The specific value to be interpreted as a digit and how this value is extracted from the record or computed based on it is determined by an engineer skilled in the art.

We emphasize that in this patent application, we do not consider the digit capacity (effective radix, bitness) or information capacity of a digit (or symbol) to be necessarily fixed (although, of course, all the described solutions are applicable even in such simplest implementations where this value is fixed). In general cases (in complex specific implementations), the digit capacity (effective radix, bitness) or information capacity of digits or symbols can be a variable, including being different for different digits or symbols, and/or it can vary at different (various) steps (stages) in the sorting or searching process, and/or it can change during operation, even within a single step or stage in the sorting or searching process.

According to the decision of an engineer skilled in the art, radix, bucket, or interval sorting, information retrieval and processing methods using the solutions from this patent application can be implemented in such a way that they dynamically change the digit capacity (effective radix, bitness, information capacity) of the digit or symbol with which this specific implementation is currently working or will work in the subsequent step or steps (in the subsequent stage) of the sorting or searching process.

Radix, bucket, or interval sorting, information retrieval, and processing methods using the solutions from this patent application can also be implemented in such a way that different digit capacity (effective radix, bitness) or different information capacity is used for different key values, and/or in such a way that different digits or symbols (forming together the numerical value of the key) have different digit capacity (effective radix, bitness) or different information capacity.

Both in the case of using a numerical representation of the key and in the case of using a string representation of the key, different digits or symbols in such representation can have different digit capacity (effective radix, bitness) or different information capacity, and all the solutions described in this patent application are applicable to such implementations as well.

The solutions described in this patent application also imply that the information capacity of digits or symbols can be different for digits or symbols located in various positions in the key representation (or even in the same position of different records if the key is interpreted as a number written in a certain positional numeral system).

We also allow without contradiction to the described solutions that some specific implementations may use an approach where at some step of the operation, the entire set or the entire range of possible key values is divided into a certain number of subranges or subsets (including the possibility of an infinite number of subranges or subsets).

Such decomposition of the general set of keys (or key values), dividing them into subranges or subsets, can be considered as an implicit extraction of digits or symbols from key values, for example, for associating these digits or symbols with counter table elements or index table elements (see below).

In this case, the elements of the counter table can be used, for example, as counters for records whose keys fall into a certain subrange. And the elements of the index table, in such an approach, can, for example, serve as headers for lists of records whose keys fall into a specified subrange.

We emphasize that the solutions from this patent application are equally applicable, including to such specific implementations that divide the entire set of keys (or key values) into subsets or subranges, even if the terms "digit" or "symbol" are not explicitly used in the description of these specific implementations. Because in the case when there is no more suitable interpretation, the actual number or index of the table element can be interpreted as the value of the digit or symbol from which (in combination) the numerical value of the key (of a certain record) is composed. By interpreting the numbers or indices of the table elements in this way, an engineer skilled in the art can apply all the relevant solutions from this patent application to their specific implementation, even if they do not interpret the original record keys as numbers or strings (but found a way to associate the elements of the counter table or index table with these keys).

We also note that sometimes in the description of other digital search or sorting algorithms, the term "digit value" is used instead of the "digit" term which in this case should be considered a particular case of our term "digit". We also usually use "digit" and "digit value" as synonyms unless the context suggests otherwise.

Furthermore, we especially emphasize that since most practical specific implementations are likely to be developed for binary computers or computational devices and are likely to operate with binary data, the term "digit" can simply refer to (denote) a group of adjacent bits (or a single bit in the limiting case), a single hexadecimal digit, an octet, a byte, or a group thereof. Additionally, instead of the general concept of a "digit taken from the numerical value of the key", other specific terms may be used, such as "bits taken from the key", or "hexadecimal digits taken from the key", "octets taken from the key", "bytes taken from the key", and so on. AH these concepts are specific cases of our more general concept of a "digit", which we use in this patent application (so as not to list all particular cases and numerous synonyms every time).

Information capacity—in the context of this patent application, this term refers to the measure of the amount of information contained either in the numerical value of the key as a whole, or in some part of it, or in the digits or symbols that make up the numerical value of a key. It is often measured in bits, digits (including hexadecimal or decimal digits), or in bytes. However, in specific implementations, it can be measured in other units as well. Includes narrower concepts such as digit capacity, bit depth, and even radix.

Digit capacity—is a specific case of the broader concept of "information capacity" used in this patent application. It refers also to the measurement of information and commonly used when referring to numbers represented in a numeral system, where the notation is divided into digits, such as binary digits (bits), decimal or hexadecimal digits, octets or bytes, symbols that can be represented by numbers or form some ordered set of values, and so on. In such cases, the amount of information can be expressed, for example, as the number of such digits and/or as the number of possible values of such a digit. In addition, when the numerical values of the keys consist or include sequences of numbers and/or symbols, then each element within such a sequence, can also be considered a digit, as determined by the engineer skilled in the art, extending the term's applicability to sequences as well. Includes narrower concepts such as bit depth, and even radix.

Information capacity of a digit or symbol—It is the measure of the amount of information contained in an individual digit or symbol used in a specific implementation, algorithm, method, or scheme designed for sorting, searching, or processing information at a specific step (stage or phase) discussed in the relevant portion of this patent application where this term is used.

In most specific implementations, the information capacity of a digit or symbol also determines the maximum number of buckets (bins) onto which records can potentially be distributed at a given step or stage in the sorting process or during the preparation for the search. Thus, the information capacity of a digit or symbol often determines the maximum number of elements in counter tables or index tables (i.e., the number of buckets or bins that may potentially be required at a given step in the sorting process, if we are talking about the sorting process). This holds true for specific implementations that utilize fixed information capacity (radix, digit capacity, bit width) for digits or symbols.

Therefore, in certain specific implementations, the information capacity of a digit or symbol at a particular step or stage in the sorting process can be expressed both as the number of buckets or bins onto which records are distributed at that step or stage and numerically coincide with the size of counter tables or index tables.

However, other implementations may measure information capacity in different units, such as binary digits or bits, in which case the information capacity becomes synonymous with the binary digit width of the digits or symbols. Yet, other implementations may measure the information capacity of digits or symbols in other digit widths, such as hexadecimal or decimal digits, bytes, or other units, as determined by an engineer skilled in the art—If expressing the information capacity of digits or symbols explicitly is necessary in their specific implementation.

Specific implementations of the solutions described in this patent application may also use any other appropriate units to measure the information capacity of digits or symbols, switching between them as needed.

Furthermore, at different (various) steps or stages in the sorting, searching, or other information processing processes, or in other words, in different parts and/or at different steps or stages of specific implementations of the solutions described in this patent application, an engineer skilled in the art may use digits or symbols with different information capacities (different digit widths or capacities). This means, among other things, that different numbers of buckets or bins and different sizes of counter tables or index tables may be used at different steps or stages in the sorting process.

In the context of the classical implementation of radix sort and its extensions, the information capacity of digits or symbols, expressed in terms of the number of possible digit or symbol values, as well as the maximum number of buckets or bins, will coincide with the base of the numeral system, also known as the "radix", which is often used when discussing sorting algorithms (at the stage of their operation under discussion). However, we do not use the term "radix" in all cases because, in general, the information capacity of digits or symbols can be expressed in other units or defined through other quantities, rather than solely based on the maximum number of digit or symbol values or the maximum number of buckets or bins. For example, it can be expressed as the number of bits in a digit or symbol, as the number of decimal digits in them, and so on. Additionally, the solutions from this patent application are applicable to a wide class of sorting algorithms, searching algorithms, and so on, not just to the classical radix sort algorithm—therefore we do not want to confine ourselves to the narrower concept of radix. Furthermore, when discussing tasks such as finding the optimal radix value or transforming tables to transition to a different radix value, it is more convenient for us to use a term independent of the word "radix". However, we especially note that in many specific implementations, the information capacity of digits or symbols and the "radix" may be synonymous in practice.

We also emphasize that all the methods described in this patent application can be used in specific implementations that employ different information capacities, particularly different digit or symbol sizes (widths, depths or capacities) for different digits or symbols in the numerical value of the keys, even within a single step of the sorting, searching, or processing of information.

For example, all the methods described in this patent application can be used even in cases where a variable-length coding scheme is employed in a particular sorting process. Some of these specific implementations may use counter tables or index tables organized with variable granularity in partitioning the set of values corresponding to such codes. Alternatively, they may employ tables implemented using complex data structures other than the simple linear arrays or vectors.

Furthermore, we emphasize that the solutions described in this patent application are applicable even when the sorting, searching, or processing of information is implemented for a computing device with a certain base of the numeral system at the foundation of such a device, but the information capacity of the digits or symbols in the specific implementation for such a device is not expressed (and not even multiples of) the fundamental units) of bit width or digit capacity of that device. In particular, numeric key values may, for example, be interpreted as decimal numbers, and thus the information capacity of the digits or symbols can be expressed as the number of decimal digits (with the maximum number of buckets or bins being a power of ten) despite this specific implementation being designed for a binary computing device. Conversely, a decimal computing device can operate with numeric values of keys expressed as binary numbers.

A specific implementation may also handle digits or symbols of larger or smaller size than the fundamental radix (digit capacity) of the computing device for which that implementation is designed.

For example, a program for a decimal computer may implement radix sorting, where at the algorithmic or method level of the sorting, it operates on digits or symbols consisting of two decimal digits, distributing records across 100 buckets or bins. Alternatively, a radix sorting implementation for a binary computer may operate on 8-bit digits or symbols, distributing records across 256 different buckets or bins. Alternatively, it may operate on numbers composed of decimal digits at the logic level of the algorithm, while the specific implementation of the decimal radix sorting at a lower level operates on binary or hexadecimal digits (instead of "real" decimal digits), as it is designed for a binary computing device.

If a specific implementation employs binary representation or logic to represent or interpret the keys, the information capacity of a digit or symbol can be interpreted as the number of bits used in the notation or representation of an individual digit or symbol used in that specific implementation.

If the specific implementation uses a non-binary numeral system with a base other than two, the information capacity of a digit or symbol in such an implementation can be measured in terms of the number of digits in that non-binary numeral system used in the notation or representation of a single digit or symbol taken from the numerical value of the key.

In such cases, when the information capacity is expressed in terms of the number of digits or bits, the term is equivalent to the notion of digit or symbol size (width or depth of a digit or symbol).

The choice of units in which the information capacity of a digit or symbol is measured, including whether it is equivalent to the concept of binary width or the radix of a digit or symbol, is determined by the engineer skilled in the art.

From a practical standpoint, for modern real-world computers and computing devices, it is most convenient to express the information capacity of digits or symbols as the binary width, as the radix used in the algorithm, or as the number of buckets or bins used for record distribution. In binary implementations, the number of buckets is a power of two corresponding to the binary digit size of individual digits or symbols used in the sorting algorithm.

In specific implementations of algorithms, schemes, and methods described in this patent application, an engineer skilled in the art may indirectly determine the information capacity by related quantities, such as the maximum number of buckets or bins, or maximum number of elements in the counter table or index table, or even by the mask used for extracting digits or symbols. Or do not express it in any explicit form at all.

As mentioned above, in the case of bucket (rather than radix) sorting, the sequence of bucket numbers into which a given record falls can be interpreted as the numerical value of the key for that record. Therefore, for bucket sorting, the term "information capacity of a digit or symbol" refers to the information capacity of the bucket numbers. Similarly, for interval sorting, the information capacity of digits or symbols refers to the information capacity of the interval numbers.

Step (or "stage", "round", "pass"—as synonyms used depending on the context)—a conceptual (mathematical or algorithmic) or practically implemented step, iteration, round, pass, or stage of data processing in an algorithm, method, scheme, or specific implementation; and/or during the operation of a specific implementation of one of the solutions described in this patent application.

Specifically, it can refer to a step (round, pass, stage) in radix sorting, bucket sorting, or interval sorting, a step (round, pass, stage) in a search algorithm, a step (round, pass, stage) in another data processing algorithm or method, or a step (round, pass, stage) in the operation of a specific implementation.

In the context of hardware solutions (specific implementations), a step may not only be a logically related part of actions in the sorting, searching, or other data processing process, but it may also (in certain specific implementations) be physically implemented as part of a circuit, a cascade of logic elements, or as a separate device or part of device or system (for example as a component or subsystem).

This term can be used regardless of the chosen form of specific implementation—in any case, the workflow can be divided into logical steps or stages, rounds, passes, into individual tasks or iterations, and in the case of certain hardware implementations—even into separate parts of circuits or cascades, separate devices, components, or parts of a system (subsystems) that perform individual logical steps or stages.

Irrespective of the specific implementation approach, the logical steps or stages of the sorting, searching, or other data processing process, as well as their corresponding hardware components, are referred to as "steps" or "stages" in this patent application, to simplify the understanding of the described methods (without specifying all possible implementation techniques for these steps at each instance where the term is used).

Specific implementations of steps using the solutions described in this patent application can be implemented in the form of software, hardware (as a device, circuit, logic block, etc.), or a combination thereof (e.g., a system or subsystem, which combining software and hardware components).

Additionally, different (various) steps or stages of the overall process can be implemented in different ways. In particular, specific implementations can employ different software and/or hardware solutions at different logical steps (stages) of the process.

In particular, radix sorting of records with numerical key values consisting of multiple digits or symbols can be conceptually implemented using a sequence of steps corresponding to traversing the key in different directions from the most significant digit to the least significant (MSD), from the least significant digit to the most significant (LSD), as well as with a change in direction during the sorting process, at the discretion of the engineer skilled in the art. Additionally, at the discretion of the engineer skilled in the art, some of these conceptual steps corresponding to the processing of individual digit or symbol can be executed in parallel with each other, partially or completely (for example since certain actions on conceptually subsequent steps may begin before the preceding step is fully finished, either because the algorithm of specific implementation can involve separate actions for merging sorting results at different steps, or because certain actions, such as constructing count tables, can sometimes be parallelized for different steps). The solutions described in this patent application are applicable to any chosen direction of traversal along the key and allow for parallel execution of steps in specific implementations.

A specific implementation may utilize loops, recursion, subroutine or co-routine calls, threads, fibers, processes, parallel or sequential evaluation of predicates or functions, vectorized or SIMD instructions, separate parts of circuits or cascades, and so on (in hardware implementations), operating both sequentially and/or in parallel with each other. And in certain cases, such as implementing single-pass sorting, when loop unrolling is employed, or when multiple cascades are implemented within a single hardware design, the implementation can technically be considered single-step.

However, regardless of the technical form of implementation, in any implementation of radix sorting, bucket sorting, or interval sorting, in implementations of search methods, or in implementations of other information processing methods corresponding to the solutions described in this patent application, one can identify conceptual (logical) steps (at least one step) associated with the processing of one or multiple digits or symbols taken from the numerical value of the key. Usually, it can also be stated that the steps can be associated with processing specific positions within the digital values of the keys.

Such conceptual steps or parts of workflow of the sorting, searching, or other data processing process are referred to as "steps" (or occasionally "stages", "rounds", "passes") in this patent application without specifying all possible methods and forms of their implementation at each of reference. This is because listing all these forms and implementation methods at every instance where such a term is used would make the text of this patent application overly complex to read and analyze.

It is emphasized that all the solutions described in this patent application can be implemented by an engineer skilled in the art, either applied to all or only to some conceptual data processing steps in a specific implementation.

It is also highlighted that different steps (stages) can use different solutions taken from this patent application, and some steps can be performed without employing any solutions described in this patent application.

We also emphasize that the term "step" (or "stage", "round", "pass") can refer not only to the complete set of actions implementing a particular pass over a set of records in the algorithm, method, or process of sorting, searching, or other data processing but also to a partial part of such a complete set of actions. For example, it can refer to a separate iteration over the records in the implementation of one complete pass if the full execution of such pass requires multiple iterations over the processed set or subset of records.

We also emphasize that the integration of some of the solutions described in this patent application does not require a complete change to all data processing processes in the entire conceptual step (pass) of an existing radix, bucket, or interval sorting algorithm, method, or specific implementation (i.e. in the entire conceptual step that corresponding to the complete processing of a some digit or symbol, including the completed stage of rearranging the records according to the values of that digit or symbol taken from the keys of the records). In such cases the proposed solution can only affect a portion of the work performed in such a full step (pass). In this case, our term "step" (and its synonyms) corresponds to this specific part of the work on a particular step (stage, pass, round, iteration), according to the described modification or optimization. The same disclaimer also applies to search processes or other data processing processes where some of the solutions we proposed can be partially incorporated (when they are integrated without a complete overhaul of the entire original algorithm or solution into which they are incorporated).

A step can involve one or several iterations over the full set of records or over the entire subset of records, which a specific implementation processes at a certain stage. For example, a step can consist f one or several iterations over the entire set of records during a sorting process or over the subset of records that needs to be processed at a particular stage in the sorting process, where the solution from this patent application is used.

A step can also consist or include one or several iterations over auxiliary (working) tables (such as counter or index tables), or over other data structures that can be processed by the solutions from this patent application, which used at a specific stage of a specific implementation's operation or at a certain stage of the discussed method or algorithm's operation.

Repetitive mention of all these facts throughout the text of the patent application would make the reading of the text overly complicated, and the application itself would become challenging to analyze the novelty of the proposed solutions. Therefore, this definitions section has been created to underline that the term "step" does not necessarily imply the entire work constituting a fully completed conceptual stage (or pass, round) in the operation of an algorithm, method, or scheme or a fully completed stage (or pass) in the operation of a specific implementation (e.g., implying the complete processing of a specific digit or symbol in the original (or modified) radix sort algorithm and/or the full completion of some pass involving the rearrangement of records according to the values of that digit or symbol taken from the keys).

In the context of this patent application, the term "step" may also refer to only a portion of the work performed at a particular complete conceptual step (stage, round or pass) of an algorithm, method, or scheme, or a portion of the work performed during the operation of a specific implementation (e.g., in the process of sorting, searching, or other data processing)—specifically, that portion of work that is described in the solution where the term is used.

We emphasize that different steps or stages can be performed either sequentially or in parallel to each other (if it does not contradict causal relationships in logic, not contradict data dependencies, as well as not contradict the constraints of specific implementation). The specific method of executing steps is chosen by an engineer skilled in the art. Additionally, it should be noted that the implementation of steps also allows for internal parallelism, where different operations that need to be performed in a step are executed fully or partially in parallel with each other.

Furthermore, we emphasized that some of the solutions described in this patent application describe methods, algorithms, schemes, or specific implementations designed for information retrieval or other data processing. In such cases, the term "step" refers to the step of the corresponding method or algorithm or the step in the operation of a specific implementation intended for information retrieval or other data processing.

In the context of scheme implementations, the term "step" can refer to either a part of a scheme or a cascade that is responsible for a particular stage of data processing, or it can refer to a specific step or stage in the operation of the scheme.

We also emphasized that all the solutions described in this patent application do not necessarily have to be implemented as separate data processing steps or stages. In some specific implementations, at the discretion of an engineer skilled in the art, they can be combined with other actions related to the same conceptual step, stage, round, or pass, as well as with actions related to other steps, stages, rounds or passes in data processing.

Furthermore, in certain specific implementations, the actions that constitute a "step" in the terms of this patent application can be included as part of or obtained as a byproduct of a more complex process or operations. However, as long as these actions, when considered separately from the rest, correspond to the actions described in this patent application, they should be considered as a specific implementation of the invention described here.

Data structure—the term "data structure" can refer to an array, vector, matrix, hash table, table, tree, trio (digital or prefix tree), histogram, set (collection), associative data set, set of key-value pairs, set of variables, set of fields, tuple or set of tuples, or any other organization of data, memory area, or structure in the memory of a computing device, as well as on the external storage device, that allows storing information and accessing it. The term "data structure" also includes any combination of the entities listed above (e.g., a set of multiple vectors or arrays or an array together with a hash table) if they are used together or are related by some common semantics. For example, if they are used to store different fields or characteristics of something, collectively forming a semantically unified structure, or if they are used to organize separate ways of accessing the same data, or to different data connected by some common semantics, and so on. An engineer skilled in the art makes the selection of a specific type and organization of data structure and methods of its implementation.

Statistical information (or "statistical characteristics")—refer to any information describing the statistical, probabilistic, or frequency-related properties or characteristics (such as parameters or other distributional features) of a certain set of objects (such as the set of keys encountered in real data) or of an individual object taken from a set of objects (for example, statistical, probabilistic, or frequency-related properties or characteristics associated with an individual bucket taken from the set or subset of all buckets).

Counter table—is a data structure that contains (represents) information about the number of records whose keys correspond to a specific value, range, interval, or set of values of a digit or symbol located at a specific part of the key (in a specific position or positions in the representation or numerical values of the keys). It can also be a data structure that contains information allowing the estimation (including from the perspective of probability theory and statistics) of the distribution of values of digits or symbols located at a specific part of the key (in the specific position(s) in the representation or numerical values of the keys). Additionally, it can serve as a data structure used for counting or estimating the number of records whose keys fall into a specific set of ranges, intervals, or subsets of key values.

In simple specific implementations of the solutions described in this patent application, each element of the counter table corresponds to a specific value of a digit or symbol, and the value of that element indicates the number of processed records that have the corresponding digit or symbol value at a specific position positions) in their key values.

However, we emphasized that the solutions described in this patent application are applicable even when the elements of the counter table correspond to ranges, intervals, sets, or subsets (collections) of key values, digits, or symbols, rather than individual scalar values of digits or symbols.

In particular, the proposed solutions can be used in specific implementations of radix, bucket, or interval sorting adapted to work with real or rational numbers or complex mathematical objects whose set can be divided into ranges, intervals, or subsets. In such cases, each element of the counter table may correspond to a specific range, interval, or subset of key values. The value of an element in the counter table can represent, for example, the number of records whose keys fall into the corresponding range, interval, or subset.

The data structure corresponding to the counter table does not necessarily have to be uniform with respect to the set of possible digit or symbol values. In particular, the solutions described in this patent application are applicable to adaptive algorithms that use different granularity (different digit capacity or information capacity, different number of digits) for different ranges, intervals, or subsets of key values.

We emphasized that the solutions described in this patent application are also applicable to counter tables, whose elements correspond to ranges, intervals, sets, or subsets of digit, symbol, or key values, rather than just individual (scalar) digit or symbol values.

The solutions described in this patent application are also applicable to specific implementations where the counter table elements represent only a portion of all possible digit or symbol values, rather than all of them. For example, they are applicable to sorting algorithms that partially order the set of records (hence, the counter table elements correspond to not all possible digit or symbol values).

In more complex implementations, the values of the counter table elements may contain not only information about the number of records corresponding to a specific value, range, interval, or set of digit or symbol values but also other data that allows for an evaluation (including from the perspective of probability theory and statistics) of the distribution of digit or symbol values located in a specific part of the key. For example, it could be the frequency at which a particular individual value, or interval, range, or set of the digit or symbol values, occur(s) in the certain position(s) in the numeric values of the keys of the processed records. Such information can both complement conventional counter values or can be used instead of them at the choice of the engineer skilled in the art.

In particular, the counter table may contain explicitly calculated frequencies at which certain digit or symbol values occur in the keys of the records being sorted, or other statistical information about the distribution of key values.

This could also be other information reflecting the nature of the distribution of key values. For instance, it could be a histogram approximating frequencies or showing the distribution of digit or symbol values in a real dataset being processed during sorting (with a certain accuracy corresponding to the resolution capability of that histogram).

The data structure containing such a histogram can be interpreted as a counter table, and the solutions described in this patent application can be applied to it. If the histogram contains counters for records or other elements of a certain set or subset, then in the context of this patent application, it can be interpreted as a counter table, and vice versa.

The counter table can, in particular, store only statistical information without values directly indicating the number of records. Specifically, information about the frequency at which certain digit or symbol values occur in real data or other statistical information reflecting the distribution of key values, which is stored in the structure of the counter table elements, can both complement and replace the actual counter values that directly indicate the number of records containing a specific digit or symbol value in a particular position or positions within the values of their keys (in a specific part of the values of their keys).

The engineer skilled in the art who implements the solutions from this patent application determines the specific implementation method and content of the counter table elements.

We especially emphasize that in specific implementations of the solutions described in this patent application, the counter table elements may contain additional information (e.g., additional fields) of arbitrary purpose, the retrieval and processing of which are entirely determined by the engineer skilled in the art and are beyond the scope of this patent application. When describing methods of constructing or transforming the counter table elements in this patent application, we only define the part of the work that pertains to the core information, the nature of which has been described above or in the relevant part of our patent application. The transformation of additional information can be implemented in a similar manner (as described in this patent application) or using some other (different) methods, at the discretion of the engineer skilled in the art who added this additional information to their implementation.

Cumulative form of the table—refers to a variation of the counter table or index table, where each subsequent element of the table (when moving through the table in a certain direction or following a certain order of its elements) includes information corresponding to the previous element.

In particular, if the counter table contains counter values indicating the number of records in the processed subset of records that have a specific digit or symbol value (at a specific position or positions in the numerical value of the key being processed at the corresponding step or stage in the sorting process), for example, if the counter table is used to count the number of records associated with specific buckets corresponding to its elements, then the elements of such a table can be cumulatively summed (summed with accumulation) and thus transformed into a "cumulative" form, where each element of the counter table contains the accumulated sum of all or a portion of the previous or subsequent elements (depending on the direction of movement through the table during the accumulation of sums).

When using conventional record counters, each element in such a cumulative representation of table specifies (determines) the location of the records related to the corresponding bucket (or set of buckets) in the output set of records (in the partially or fully sorted set of records, as it should become upon completion of the corresponding step or stage of the process).

It is also possible to convert the counter table constructed in cumulative form (with cumulative sum) back to the conventional form of a counter table that contains the counters of records corresponding to the individual buckets (e.g., that contains the bucket lengths if one element of the counter table corresponds to one bucket). This conversion can be implemented, for example, by subtracting the values of the table elements from each other in the correct order (in reverse order of traversal when subtracting compared to the order of summation).

If the counter table does not count records but contains some other information, for example, reflecting the frequency of occurrence of certain digits or symbols (digit or symbol values) in the subset of records to be sorted, it can also be transformed into a cumulative form, possibly using a different accumulation function (some function) other than direct summation.

If a counter table has been transformed into a cumulative form or if it was originally constructed in such a form, it can still be used in specific implementations of the methods (solutions, inventions) described in this patent application.

In particular, if a certain method requires determining the length (rather than the position) of the bucket (or set of buckets), then the bucket length (or length of set of buckets) can be calculated as the difference between two consecutive elements of the counter table with the cumulatively accumulated counts of records. In such calculations, it can be considered that a "virtual" zero element precedes (or follows) the first (or last) element of such a table. Alternatively, a real additional zero element can be placed at the beginning or end of the cumulative table. Or, alternatively, special processing can be provided for the first or last element, depending on the choice of the engineer skilled in the art.

If we are discussing a sorting task, and the underlying data structure being sorted by a specific implementation is an array, vector, or similar indexed data structure, then the values of the elements in the standard counter table in cumulative form will indicate the future positions of the buckets (groups of corresponding records) in this data structure (or in a corresponding output structure, such as an output array, vector, etc.)—the final positions of that buckets (that groups of corresponding records) that will be achieved upon completion of the corresponding full step (stage, pass, or round) in the sorting process. These positions of record groups (buckets) will be reached after the corresponding step of moving (redistributing) records between buckets at this full sorting step (or stage) is finished.

When converting the counter table into a cumulative form, the traversal of elements in the original table can be performed in any direction and order chosen by the engineer skilled in the art and better suited for the specific implementation (which, of course, should be done considering the chosen direction or order of traversal).

In particular, it is possible to sum the elements of the counter table from the initial element to the final element, as well as from the final element to the initial element. If the elements of the table are summed in reverse order, i.e., from the final element to the initial element, then the values in the resulting table can be interpreted as offsets counted from the end of the ordered set, and these offsets indicate the boundaries of the buckets (the positions that the buckets will have after the corresponding record redistribution or movement step). While in the forward order of summation, the values of the elements of counter table will correspond to the boundaries of the buckets counted from the beginning of the ordered set, which is usually more convenient.

The engineer skilled in the art can implement other forms of cumulative transformations for the counter table as well as for the index table (see below), which does not hinder the applicability of the solutions described in this patent application.

Index table—a data structure designed for [fast] search (retrieval, access or enumeration) of records corresponding to a specific value, range, interval, or set of digit or symbol values in a specific part of the key (in a specific position or positions in the representation or numeric value of the key); or a similar data structure whose elements correspond to specific ranges, intervals, or subsets of key values.

In particular, it can be a table, an array or another data structure that contains references to other data structures (e.g., to the first elements of lists) that allow for quick retrieval or enumeration of all records containing a specific digit or symbol value in a specific part of the key (in a specific position or positions in the representation or numeric value of the key).

It can also be a table, an array or another data structure that contains headers of other data structures (e.g., list headers) that, in turn, enable quick access (retrieval, enumeration) of the desired records.

Alternatively, it can be a table, an array or another data structure whose elements themselves are data structures of the next level (e.g., lists, trees, or sets) that directly enumerate or allow for quick retrieval (access) of all records containing a specific value, range, interval, or set of digit or symbol values in a specific part of the key (or in a specific position or positions in the representation or numeric value of the key).

As with the counter table (see above), the solutions described in this patent application are also applicable to index tables, whose elements correspond to ranges, intervals, sets, or subsets of digit, symbol, or key values, rather than just individual (scalar) digit or symbol values.

Furthermore, all the solutions described in this patent application are applicable to specific implementations where the elements of the index table correspond to only a portion of the possible digit or symbol values, as chosen by the engineer skilled in the art.

All the solutions described in this patent application are also applicable to specific implementations that simultaneously use both counter tables and index tables, as well as implementations that combine information represented by counter table(s) with information represented by index table(s), either by combining this information within the elements of a single shared table or another data structure, or without combining them into a unified structure.

In particular, the engineer skilled in the art can apply the solutions described in this patent application to the elements of the combined table or another data structure in such a way that, depending on the problem being solved, their specific implementation will operate with this combined table or data structure as either an index table or a counter table.

We especially emphasize that in specific implementations of the solutions described in this patent application, the index table elements may contain additional information (e.g., additional fields) of arbitrary purpose, the retrieval and processing of which are entirely determined by the engineer skilled in the art and are beyond the scope of this patent application. When describing methods of constructing or transforming the index table elements in this patent application, we only define the part of the work that pertains to the core information, the nature of which has been described above or in the relevant part of our patent application. The transformation of additional information can be implemented in a similar manner (as described in this patent application) or using some other (different) methods, at the discretion of the engineer skilled in the art who added this additional information to their implementation.

We emphasize that, at the choice of the engineer skilled in the art, the index table (as well as the counter table) can be transformed into a "cumulative" form where the buckets (in effect) include each other. Alternatively, it can be initially constructed in such a form. In this case, all the solutions described in this patent application can be used even with this form of organizing the index table (considering the specific characteristics of such representation, which are visible to the engineer skilled in the art).

Bucket (or "bin", "stack")—is a subset of elements selected from the set of records being sorted, based on a certain criterion (e.g., a subset of records corresponding to a specific digit or symbol value at a certain position or positions within the numerical value of the key in the radix sorting algorithm, a specific bucket (bin) in bucket sort, or a specific interval in interval sort).

We emphasized that in this patent application the concept of a bucket is also applicable to other algorithms, methods, schemes, and specific implementations, such as implementations of search or data processing algorithms, algorithms for processing counter tables or index tables. In this case, in the context of this patent application, it refers to a subset of records that meet a certain criterion, such as containing a specific value of a digit or symbol in a certain position (or positions) within the numerical value of the key. Alternatively, it can refer to a set of elements in a data structure that correspond to a certain criterion, dividing all the elements into groups, which can also be called "buckets".

In many specific implementations, algorithms, and methods of radix sorting (or related sorts), the buckets correspond to a specific value or set of values of a digit or symbol at a certain part of the key (at a certain position or positions within the representation or numerical value of the key) that is being processed at the moment; or the buckets (bins) as we understand them in this patent application are formed as subsets of records that fall into specific buckets at a certain step in the bucket sort, or into a specific interval at a certain step in the interval sort.

In simple implementations of radix sorting, each bucket (bin) corresponds to one value of a digit or symbol at a specific position (or positions) within the key value; or a bucket (bin) corresponds to a specific bucket (bin) chosen in bucket sort; or to a specific interval in interval sort. However, the solutions described in this patent application are applicable even when using any other mapping of the set of values of digits or symbols, buckets (or bin) numbers (in the bucket sort), or interval numbers to the set of buckets (as we understand them in this patent application).

Generally, each element of the counter table or index table corresponds to one bucket (bin). However, the solutions described in this patent application will still work even if multiple bins (buckets) are associated with one element of the counter table or index table, including cases where different elements of the counter table or index table correspond to different numbers of bins (buckets).

Conversely, more information than just an individual digit or symbol can be used to select a bucket (bin), according to the decision of the engineer skilled in the art.

As applied to sorting and searching, in this patent application, "buckets" ("bins") are a conceptual entity introduced to denote subsets of records associated with a specific value or set of digit or symbol values. The solutions proposed by us work with any partitioning of buckets. Therefore, the engineer skilled in the art can arbitrarily define the relationship between the sets of buckets, sets of digit or symbol values (and thus with a set of records), and sets of auxiliary table elements (if used, for example, sets of counter or index table elements), based on the specifics of the particular implementation.

When we mention a bucket (or bin) corresponding to an element of a specific table in this patent application, this phrase should also be understood in a generalized sense. We are referring to a subset of records that contain a certain digit or symbol value at a specific position or positions within the representation or numerical value of their keys, or that meet another specific criterion. This means (if applicable) that these records will be represented by the designated element of the counter table or index table at the specific step or stage in the sorting process being discussed.

As mentioned above, all the solutions described in this patent application can be used even when a bucket (bin) is represented by multiple elements in the counter table or index table.

For example, the solutions described in this patent application can be applied in a specific implementation that additionally distributes records corresponding to one digit or symbol value using multiple elements of the counter table or index table for further distribution within the subset. The described solutions are also applicable in specific implementations that divide buckets (or bins) into separate smaller segments (subranges) (which together form a single bucket or bin) and then use different elements of the counter table or index table for different segments. Of course, such specifics should be taken into account by the engineer skilled in the art in the specific implementation, but they do not contradict the applicability of the solutions described in this patent application.

When applying the solutions described in this patent application to such complex implementations, it is important to consider that when we refer to a bucket, we imply all its parts together (unless explicitly stated or the context does not imply otherwise), and accordingly, we imply the application of the described solutions to all elements of the tables that correspond to these divided parts of the bucket (taking into account the specifics of the chosen partitioning method that selected by the engineer skilled in the art).

And vice versa, it can be considered that specific implementations with divided buckets or bins (where multiple elements in the counter table or index table correspond to a single conceptual bucket or bin) simply utilize a larger set of buckets or bins (where individual buckets or bins, on average, contain smaller subsets of records).

Or in some cases, it can be considered that such specific implementations actually employ a larger, possibly variable, information capacity (digit capacity, number of digits or bits) for digits or symbols—each element of the counter table or index table in such an implementation corresponds to a new bucket or bin, and the entire new set of buckets or bins corresponds to a new set of digits or symbols with a higher information capacity (digit capacity, number of digits or bits). In other words, this can be considered as a transition to another radix in the sorting and/or search process.

These interpretations do not contradict the application of all the solutions described in this patent application, provided that the engineer skilled in the art takes into account the specific interpretation chosen (during the implementation of a specific solution).

Bucket length (or "bin length")—the number of elements in the sorted or processed set of records that belong to a particular bucket or bin. It should be noted that if one bucket (or bin) corresponds to one element of the counter table, then typically (but not necessarily), this element will be used to count and store the bucket (or bin) length. This is because such an element usually serves as a counter for the records containing a specific digit or symbol value at a specific position or positions within the numerical value of the key (and it is usually equal to the bucket length, as the subset of such records constitutes the bucket).

If one element of the index table corresponds to one bucket (or bin), then in many specific implementations, the length (number of elements) of the data structure (or the corresponding part of the data structure) corresponding to that element will also be the bucket (bin) length (although there may be implementations that do not follow this rule, depending on the data structure chosen to implement the index table by the engineer skilled in the art).

Bucket index (or "bin index")—is generally synonymous with "bucket number" (or "bin number") described above. When applied to simple sorting or search implementations an identifier, index, any other selector, or ordinal number of one of the buckets (or bins) in the radix, bucket, or interval sorting algorithm, method, scheme, or specific implementation, either in the algorithms, methods, schemes, and specific implementations of digital search methods. Usually, it represents the value of the digit or symbol corresponding to the bucket or bin. Typically, we are talking about the value of the digit or symbol at a specific position (or positions) in the numerical value of the key that is used as the bucket or bin index or number (for example, in radix sorting). Alternatively, it can be the bucket (or bin) number or interval number in bucket or interval sorting, respectively, since bucket and interval numbers can be considered as digits in the numerical value of the key, as mentioned earlier.

Usually, the same value (same identifier, index, selector, or ordinal number) is used as the number or index of an element in the counter table or index table. However, as mentioned before, in some specific implementations, multiple elements of the counter table or index table may correspond to one bucket, or vice versa.

Evaluation (or "estimation", or "assessment")—when referring to a specific quantity (variable, characteristic, or parameter), the terms "evaluation", "estimate", or "assessment" relate to the actual or estimated (evaluated) value of such quantity (variable, characteristic, or parameter). When we mention the evaluation (estimation, assessment) of some value, we mean both the computation of the exact value of that referenced quantity (variable, characteristic, or parameter) and ether the computation of an estimated (evaluated) value (for example, an approximated value) of such quantity, which may be calculated inexactly, may be with a certain margin of error or tolerance, or heuristically. When referring to some value, the term "evaluation" ("estimation", "assessment") can be understood in both senses (as an exact value and as an estimate), depending on the choice of the engineer skilled in the art.

Logarithmic function—in this patent application, a logarithmic function refers to any function (as defined earlier) that computes a logarithm with any base. It can also refer to a function that determines (computes) or extracts the biased or unbiased value of the exponent of a number (regardless of whether the number is represented in the corresponding form in the memory of a computing device, or its exponential representation (notation) is a mathematical abstraction or imaginary interpretation). Additionally, it can be a function that determines the position or location of the leading or trailing significant bit, digit, or symbol in the representation notation) of the argument value. It can also be a function for counting the number of significant bits, digits, or symbols in the numerical value representation or for determining the length of the argument's representation when it is represented as a number in a specific numeral system. Another possible interpretation is a function for counting the number of leading or trailing bits, digits, or symbols that are equal to a specific value or set of values (for example, in the case of a binary quantity, it can be a function for counting the number of leading or trailing bits equal to zero or one), possibly considering the sign of the value. It can also be a function that reinterprets, i.e., artificially (not adhering to the declared or actual data type), interprets a numerical value having a certain data type (e.g., an integer value) as a number represented or presented in exponential or similar notation, or vice versa. It also can be a function that returns the count of specific digits (including bits) or symbols in the representation of the argument value. It can also be a function that converts the argument value or a part of it into a specific exponential notation. It encompasses any other function that is similar and/or derived from at least one of the functions listed here.

In this definition, the exponent of a number refers to both the abstract mathematical value of its exponent when the number is written in some exponential notation and the exponent value in some machine representation of numbers (including specific forms of number representation such as IEEE floating-point numbers, universal numbers, and posits).

When necessary, the logarithmic function can interpret its argument as a number written in a certain numeral system (including variable and/or mixed-base numeral systems) or as a string represented using a particular alphabet (or character set).

It is emphasized that, at the discretion of the engineer skilled in the art, the logarithmic function can be applied to either the complete numerical value of its argument (e.g., to the complete numerical value of a key, table element or its field, or a counter) or only to a part of the argument's value (e.g., only to a specific part within the representation (notation) of the complete value, if interpreted as a number or a string, particularly to a specific digit or group of digits). This may be required, especially when the logarithmic function is used at various steps or stages in the sorting or searching process, not only at initial stage (including specific implementations that involve recursion).

In particular, but not exclusively, the logarithmic function can be applied to the prefix or suffix of the numerical value of its argument, to a part of such a value selected using a mask or otherwise.

When applied to signed numerical values of the argument, the logarithmic function can employ different logic for processing positive and negative numbers, and its resulting value can directly or indirectly reflect the sign of the number. Alternatively, the set of values of such a function may include separate subranges (subsets) of values for the input arguments with different signs. The specific logic for handling signed numbers (if required) is determined by the engineer skilled in the art.

We suppose (but do not insist) that in most applications (specific implementations of the solutions described in this patent application) that such a function will return an integer value as a result (which, in particular, can be the result of rounding in one direction or in another, including truncation, of a real value that is the exact result of the underlying mathematical function used in the specific implementation).

However, at the discretion of the engineer skilled in the art, it is also possible to use functions that return values of other types, not just integers. In particular, if a function returns a real value, it can be directly used as an index for certain data structures; or may be rounded before use. Therefore, a function with such a return value can also be used as a logarithmic function in the solutions described in this patent application (including possible implementations that use the values of such functions without rounding them to integers).

Normalization—refers to the linear or nonlinear transformation of values of a certain variable (quantity, characteristic, or parameter) with the purpose of bringing these values into a specific range (specific limits), or to specific set of values. It also encompasses transformations intended to change the characteristics of the statistical (probabilistic) distribution of values of such a variable, including, but not limited to, by using mathematical transformations such as standardization. Furthermore, normalization can involve changing the length or form of representation (notation), structure, nature, or pattern in distribution of digit or symbol values for a discussed variable (quantity, characteristic, or parameter), including, but not limited to, altering the length or form of binary representation (notation), binary structure, nature, or pattern in distribution of zeros and ones in the values of such a variable.

We also emphasized that the normalization function (some function that implementing normalization) may, at the discretion of the engineer skilled in the art, return a different data type or representation that differs from the data type or representation used in its argument (i.e., the original unnormalized value).

Resolution—when discussing of the length, radix, number of possible values or information capacity of digits or symbols, or when discussing their corresponding data structures, this term is synonymous with "information capacity", including its specific cases, such as digit capacity, bit depth, or even radix.

High-resolution tables (or "higher resolution tables", "tables of elevated resolution")—refer to tables, such as counter tables or index tables, constructed for digits or symbols with higher information capacity (including higher digit capacity, bit depth, or radix). These tables can then be converted or transformed into tables designed to handle digits or symbols with smaller information capacity (including smaller digit capacity, bit depth, or radix). In this patent application, this transformation process is referred to as "downsampling".

Building Tables with Enhanced Resolution (Oversampling)

In this section, we describe a new method (algorithm, program, software, system, scheme, circuit, logic block or device that uses said method) that is characterized by performing a transformation or rebuilding of an old, or construction of a new counter table (particularly a table that contains information about the number of records whose keys contain a certain digit or symbol value, or information about the frequency at which digits or symbols occur in the subset of records being sorted, or information about the statistical characteristics of their distribution, or properties of the distribution of the key values themselves); or is characterized by performing the transformation or rebuilding of an old, or construction of a new index table (particularly a table with references to lists of records or other data structures enumerating records); whereby said transformation or rebuilding of an old, or construction of the new counter table or index table is performed during the sorting process and utilizes the information contained in the values of the original counter table or index table elements, or information derived using these values taken from the original tables.

This new method allows for a specific implementation that is characterized by not performing new accesses to the set or subset of records used to construct an original counter table or index table during a transformation or rebuilding of an old, or creation of a new counter table or index table, because said transformation or rebuilding of an old, or creation of the new counter table or index table is performed using the information already present in the previously constructed original counter table or index table (which may correspond to digits or symbols of higher information capacity or digit capacity), even if the transformed, rebuilt, or new counter table or index table corresponds to digits or symbols of lower information capacity or digit capacity; additionally, at the discretion of an engineer skilled in the art, this implementation also permits the use of additional information (in addition to the information contained in the transformed table), if necessary.

In particular, this transformation of the counter table or index table enables the transition to using digits or symbols of lower information capacity or precision at a certain step or steps in the sorting process. This is achieved by utilizing the transformed counter table or index table with digits or symbols of lower information capacity or digit capacity at that step or steps. Furthermore, during the transformation, restructuring, or construction of the counter table or index table, there may be no access to the keys of the set or subset of records being sorted at the corresponding step or steps.

This new method can be implemented in a way that does not require performing a new iteration over the original set of records being sorted or reading their keys. It avoids additional repeated accesses to the original set or subset of records or its keys, meaning there is no need to extract or compute the values of their keys again during the transformation or rebuilding of the old, or construction of the new counter table or index table.

However, at the discretion of the engineer skilled in the art, hybrid implementations (combining with other methods) can be created, which include both the restructuring of old or construction of new tables as described above (using information taken from the elements of the original tables) along with accessing the original subset of records being sorted at the corresponding step or steps.

A specific implementation of the methods described above can be performed as follows (we emphasized that the phrase "in particular" in such contexts in this patent application means that we are describing just one of the many possible ways of implementation, but not enumerating or describing all possible ways of implementing the innovation described in this patent application):

If the sorting is implemented using a counter table, then the original table is divided into a certain number of groups of elements. Then, the content of the elements within each group is either arithmetically summed together, or the information contained in or obtained using the elements of that group is transformed (combined, merged) using a certain function (using a transformation that selected by the engineer skilled in the art, based on the nature of the data in the specific implementation of the counter table used). Subsequently, the resulting information obtained through summation or other form of combining the original information (or information derived from the original information) is written into an element of the resulting counter table (in a specific implementation, this can be either one of the elements in the same counter table or an element of a new table, according to the decision of the engineer skilled in the art). When all the information corresponding to all the groups of elements in the original table has been summed or combined in the appropriate manner, the resulting set of sums or otherwise combined (merged, transformed) elements forms a new counter table corresponding to digits or symbols of lower information capacity (digit capacity). According to the decision of the engineer skilled in the art, this new counter table can be placed or formed in the same location that was occupied by the original table prior to the conversion (transformation).

If the sorting is implemented using an index table, then the elements of the original index table can also be divided into groups. Then, the data structures corresponding to the elements belonging to a particular group need to be merged (combined, joined) together in such a way that the resulting merged (combined, joined) data structure enables the enumeration (access) of the same records as could be enumerated (accessed) using the original values of the original elements of the original index table. Then, a reference to each resulting merged data structure, or alternatively, the header or root element of such a structure, is placed in an element of the resulting index table corresponding to that group of elements from the original table. In a specific implementation, this can be either one of the elements in the same (original) index table or an element of a new table, depending on the decision of the engineer skilled in the art. When all the data structures corresponding to all the groups of elements in the original index table are merged (combined, joined) with other elements of the corresponding groups, the resulting set of merged elements forms a new index table corresponding to digits or symbols of lower information capacity (digit capacity). According to the decision of the engineer skilled in the art, this new index table can be placed or formed in the same location that was occupied by the original table prior to the conversion (transformation).

The essence of this invention lies in the idea of combining the existing information taken from or obtained (including but not limited to derived or calculated) using a group of elements from the original counter table or index table to obtain a new value (or set of values) that forms an element of the transformed counter table or index table (constructed in same location or at a new location).

In particular, when using the proposed methods to modify classical implementations of radix sort or bucket sort algorithms, the combining (transforming or merging, perhaps by a simple summation or something more complex) of information in a group of elements taken from the original counter table can be performed by arithmetically summing the values of the group of elements from the original counter table (in simpler specific implementations). Alternatively, in more complex specific implementations where the elements of the counter table cannot be simply arithmetically summed, they can be combined using a more complex transformation function. The combined (merged, transformed, summed) value or set of values obtained through summation or applying a more complex transformation function is then placed into the elements of the transformed counter table (located at the same place as the original table or at a new location, according to the decision of the engineer skilled in the art).

In the case of using index tables, a suitable procedure (certain function) can be employed for merging data structures corresponding to the elements of a group. Particularly, highly efficient procedures for concatenating lists, trees, and other data structures traditionally used for constructing index tables exist, and the engineer skilled in the art can utilize these procedures to implement the proposed method. By merging (combining, joining, concatenating) the data structures corresponding to the elements of a specific group, a merged (combined, joined, concatenated) data structure is obtained. The reference, header, or root element of this structure is then placed in an element of the resulting index table corresponding to that group of elements from the original table. Whether the resulting index table is located at the same place as the original table or at a new location is determined by the engineer skilled in the art.

Utilizing information taken from the existing counter table or index table to construct a new counter table or index table (in particular, information corresponding to digits or symbols of lower information capacity or digit capacity) allows to eliminate the need for additional accesses to the original records of the subset being sorted at the respective step or steps. This, in turn, significantly improves performance compared to existing approaches, where if a transition to lower information capacity or digit capacity of digits or symbols is required, then an additional iteration over the original records is performed to access their keys, which are used to construct the new counter table or index table from scratch.

This approach of transforming (rebuilding or constructing new) counter tables or index tables using their original contents instead of building new tables from scratch is not implemented in any known radix sort, bucket sort, or interval sort algorithms of which we are aware. It is precisely this idea of transformation based on the original contents of the counter table or index table that we protect as the essence of the innovation described in this section. In this patent application and this section, we also describe and protect other innovations, including various specific implementations of all these innovations.

In the case of implementing variations of classical radix sort, bucket sort, or interval sort algorithms, the groups of elements, from which the information is combined or transformed to obtain or compute the value of the resulting table element, represent consecutive elements in the original table. In simpler specific implementations, the number of groups of elements in the original table that will be transformed into elements of the resulting table exactly matches the number of elements in the resulting table. Both of these numbers, for classical implementations of radix sort, will be powers of two or powers of another number defining the base (radix) of the improved algorithm.

However, for example, if a specific implementation of radix sort, bucket sort, or interval sort uses a some special numbering of elements, or if the sorting order deviates from the usual order, or if the sorting algorithm is used only for partial ordering of values, the elements of the group, whose information needs to be combined (merged, joined, transformed, summed), may be arranged in the original table in a some non-sequential order, determined by the engineer skilled in the art. This does not contradict the applicability of the methods discussed in this patent application. Additionally, in some complex specific implementations, the number of groups in the original table may differ from the number of resulting elements (for example, in the case of partial transformation or detection of empty parts in the original table, or when using an algorithm that dynamically adjusts the granularity of partitioning into buckets).

At the discretion of the engineer skilled in the art, the methods we describe allow for adaptive implementations that accumulate information taken from a certain number of original table elements and dynamically create new resulting elements (for example, when a certain accumulated value exceeds a threshold). In a sense, this corresponds to variable group sizes or even to hypothetical or actual transfer of records between groups (which is particularly relevant in the case of transforming index tables).

The essence of our invention lies in the idea of combining or transforming the information obtained using the elements of the original table (e.g., taken from a group of original elements) using a certain function (a certain transformation) to obtain (including but not limited to compute) the value of the element (or fields of the element) in the transformed (reconstructed at the same place or new) table. We emphasize that the elements of the original groups do not necessarily have to be sequential elements in the original table, and their quantity does not necessarily have to be a power of two or another number (although these solutions are likely to be the most common in specific implementations of the proposed method). In general, the elements of the original and/or resulting tables can be arranged in any order, and the group sizes (if grouping is performed in a specific implementation) can be of any size (including non-powers of two or other numbers) and can vary. The engineer skilled in the art chooses the specific method of grouping elements, according to the characteristics of the specific implementation incorporating one of the solutions we described.

Since we also defend the general idea of transforming information taken from the original counter table or index table to obtain information for the new (transformed) counter table or index table based on it, there may be implementations where the division of elements into fixed or other groups is not introduced at all. In addition, the transformation can also convert, for example, an index table into a counter table.

Our methods can also be applicable to specific implementations where not all elements of the original table undergo the proposed transformation, but only a subset of them. This can be useful for an adaptive algorithm that adjusts the "resolution" of counter tables or index tables to accommodate the characteristics of real data.

Additionally, the method we propose can be used with specific implementations that utilize data structures adapted to store sparse tables (for example, not storing zero values of counters).

When processing each group of elements, the value or information obtained from summing or applying another transformation function to the group of elements from the original table is recorded (placed) in the corresponding elements) of the resulting table. Usually, each group corresponds to only one output element, or the number of output elements is smaller than the number of elements in the original group. Thus, the described methods allow obtaining a smaller-sized table where the information in the elements is obtained by combining (or merging, transforming) information taken from groups of elements in a larger-sized table.

This resulting smaller-sized table can be located in the same memory space of the computing system or device (particularly in the same variables) previously occupied by the original table. Alternatively, a separate area or areas of memory (particularly in separate variables) can be allocated for the resulting table, according to the decision of an engineer skilled in the art implementing this invention in a specific solution.

Typically, the original groups of elements consist of adjacent elements, as reducing the information capacity (including digit capacity, bit depth or radix) of digits or symbols is equivalent to transitioning to larger buckets, which can be interpreted as reducing the "level of details" compared to using smaller buckets corresponding to higher information capacity (including digit capacity, bit depth or radix) of digits or symbols.

However, as mentioned above, in general, a specific implementation may employ complex organizations of counter tables or index tables, so we emphasize that the groups of elements do not necessarily refer only to adjacent elements. The engineer skilled in the art implementing this invention determines the methods of grouping elements according to their specific implementation.

We also emphasize that although in simpler specific implementations of this invention, all groups of elements will be of the same size, this invention can be used in more complex implementations that use groups of elements of varied sizes. For example, this allows using the described solutions in sorting implementations based on logarithmic transformations of key values or other non-linear transformations and representations of key values (particularly as described below in the "Logarithmic Sorting" and "Normalization of Data in Sorting or Search" sections).

Since the resulting table, whose elements are computed using the methods described above, is usually significantly smaller than the original table, the resulting table can be placed in the same memory or variables as the original table. Alternatively, it can be located in separate areas of memory or separate variables, at the discretion of the engineer skilled in the art implementing the invention.

However, we emphasized that reducing the size of the table is not a mandatory characteristic of the methods described here. In certain specific implementations, the table size may even increase. However, in a typical implementation, the transformed tables will be smaller than the original ones.

The aforementioned transformations can be performed in a single pass over the original table or iteratively. For example, if pairs of elements from the original table are combined (or merged) on each iteration (by summing or using another function or transformation, according to the specific implementation), and the resulting combined (merged) value represents one element of the resulting table, the algorithm will reduce the effective bit depth (digit capacity) of the analyzed digit or symbol by one bit for each iteration. And this will also reduce the size of the table by half (if it is implemented using a simple linear structure and without optimizations for zero elements).

Similarly, in the iterative implementation of the proposed methods, it is possible to combine (or merge not only pairs of elements but also any other number of elements (as chosen by the engineer skilled in the art according to the characteristics of the specific implementation).

The number of elements combined (or merged) in different iterations can vary, at the discretion of the engineer skilled in the art.

The iterative implementation can simultaneously perform data analysis that determines the criterion for terminating this iterative process of transforming (rebuilding or obtaining new) tables, enabling the dynamic selection of a new optimal information capacity (including digit capacity, bit depth or radix) for digits or symbols.

For example, data analysis of digit or symbol frequencies or other statistical characteristics of their distribution can be used if the corresponding information can be obtained or estimated by analyzing the original table. Alternatively, an estimation of the expected workload that the sorting algorithm will require in subsequent steps can be performed, particularly (but not necessarily) by assessing the cache memory load of the computing system. This analysis can be performed as described below in the "Determining Optimal Information Capacity and Termination Criterion for Downsampling Algorithm" and "Fast Evaluation of Optimization Criteria or Characteristics" sections.

In a simple specific implementation (as a straightforward improvement to the classical radix, bucket, or interval sorting algorithm), when the improved sorting implementation decides to reduce the bit depth of the digits or symbols analyzed in the current step of the sorting algorithm, say from "n" binary digits (bits) to "m" binary digits (bits), where "n" is greater than "m", this sorting implementation will effectively transform a table of size 2^n (2 to the power of "n", denoted as "2"n" throughout this patent application) elements into a table of size 2^m elements.

To achieve this, this invention suggests combining (in this case, to improve the classical radix sorting, by summing them) the counter values in groups consisting of 2^n divided by 2^m=2^(n−m) elements and recording the combined values (in this case, the sums of the counters in the original groups) in the elements of the resulting table, which will consist of 2^m elements containing the combined (aggregated, in this case the summed) information corresponding to the smaller-sized table.

Moreover, the same memory that is used to store the data of the original table can be used to write data that comprises the resulting table (since the resulting table is known to be smaller than the original table). Alternatively, a separate memory area can be used, depending on the choice of the engineer skilled in the art.

Such summation (or other combining process) can be implemented either as a single iteration that combines all 2^(n−m) elements (cells) of the original table at each step of the iterative process implementing this data transformation or as a sequence of multiple iterations, where only pairs of elements (or some other number of elements less than 2^(n−m) elements) are combined at each iteration.

In an iterative implementation of the proposed improved version of the classical radix, bucket, or interval sorting, it would take (n−m) iterations, involving the processing of adjacent pairs of elements, to fully combine (merge) the cells of the original table. However, the number of iterations can be less than (n−m) if the algorithm combines (merges) more than two elements and/or if it uses an adaptive stopping criterion based on the analysis of data collected or computed during the transformation (thus allowing early termination without reaching the "m" bit depth (digit capacity)).

In a specific implementation where the original table does not contain counters (or other data regarding the frequency of digits or symbols, or statistical characteristics of their distribution, etc.), but rather serves as an index table, for example, containing references to record lists or represents another data structure designed for efficient retrieval of records corresponding to a specific digit or symbol value in the keys, the operation of merging (combining, joining, or concatenating) lists or other data structures corresponding to the group of merged elements of the index table can be used, instead of summing or combining values of the elements taken from the group (as in the case of counter tables).

The overall implementation scheme for this process remains essentially the same as in the implementation using counter tables (as described in detail above), with only difference being that when using index tables, the summation operation (or other combining or transforming function) that usually applied to the values taken from the elements of the merged group will be replaced by the operation of merging (concatenating, joining, or combining) lists or other data structures represented by the elements of the group from the original index table, or by merging list or other data structures referenced by these original elements of the index table.

This transformation process for the index table can also be implemented in a single pass over the original table or iteratively. It can also utilize data analysis to determine the stopping criterion for the iteration sequence.

In other words, this invention describes methods that allow for the initial construction of counter tables or index tables corresponding to a large information capacity (including digit capacity, bit depth or radix) of digits or symbols, which gather detailed information about the number of records whose keys contain a specific digit or symbol value, or which enable a detailed estimation of frequencies or statistical characteristics of the distribution of specific digit or symbol values (or even characteristics of the distribution of the key values themselves), or which (in the case of index tables) allocate the records to be sorted into large number of individual buckets (bins) (effectively with a high level of detail or "resolution"). In fact, these tables are constructed for a large radix value (in the case of radix sort). They have a higher level of detail in the sense that they divide the entire set of key values into a large number of intervals. They are built for a large number of buckets (bins).

However, thanks to the solutions proposed in this patent application, the effective and, if necessary, actual sizes of these counter tables or index tables can be reduced, as well as the information capacity (including digit capacity, bit depth or radix) of digits or symbols at the current or subsequent step(s) during the sorting process. These solutions can be seen as reducing the level of detail (resolution) in the partitioning of keys by buckets (bins) used by the sorting algorithm or method, by appropriately reorganizing the tables used in the sorting process. The process of reducing the level of detail (resolution) can be implemented iteratively with the option of early termination of iterations based on some criterion.

Furthermore, there may be (and likely will be most common) specific implementations where it is not necessary to perform a new iteration over the original records to be sorted during the transformation (rebuilding or construction of new) tables, for example, whet is not necessary to retrieve the key values of those records (unless additional retrieval is specifically required for extracting some additional information, at the discretion of the engineer skilled in the art).

Therefore, this method is also referred to by us as a method of constructing tables with increased resolution or "oversampling method" since it initially utilizes tables corresponding to a greater information capacity (including greater bit depth, digit capacity or radix) but then allows for the reduction of this information capacity (including bit depth, digit capacity or radix).

On the other hand, this method can also be referred to as a "downsampling method" when discussing the actual table transformation process described above. After all, the table transformation process allows reducing the information capacity (including digit capacity, bit depth or radix) of the digits or symbols corresponding to these tables (which is particularly useful when the initial information capacity is excessive compared to the optimal or required information capacity).

Additionally, we note that the methods described in this section (potentially in combination with other methods described in other sections of this patent application) can, in certain cases, be combined with optimization techniques for reusing the information collected in the counter table or index table after reducing the information capacity (including digit capacity, bit depth or radix) of the digits or symbols. This is discussed in detail in the section "Reuse of Tables After Reducing the Radix".

Determining Optimal Information Capacity and Termination Criterion for Downsampling Algorithm In this section, we describe a new method (algorithm, program, software, system, scheme, circuit, logic block or device that uses said method) for determining the optimal information capacity, digit capacity, bit depth, or radix of digits or symbols that is characterized by computing or determining the optimal information capacity, digit capacity, bit depth, or radix of digits or symbols using information extracted from the elements of the counter table or index table.

Additionally, in this section, we describe a more general method (algorithm, program, software, system, scheme, circuit, logic block or device that uses said method) intended for evaluating a certain optimization criterion (particularly for estimating the workload or cache memory load of a computing system) or for evaluating a certain characteristic of the processed set of records by using information extracted from the elements of the counter table or index table to compute the estimate of the optimization criterion or the characteristic of the processed set of records.

Such estimation (evaluation) can be used for optimization based on various criteria, including criteria other than determining the optimal information capacity (including digit capacity, bit depth or radix) of digits or symbols. For example, such estimation (evaluation) can be used for selecting the optimal algorithm or strategy in sorting, searching, or other data processing algorithms or methods during the operation of a specific implementation.

The decision to switch to another sorting or processing algorithm or to choose a different strategy for sorting, searching, or other data processing can be implemented by analyzing multiple factors. However, including estimates of workload or cache memory load (which can be estimated using the methods described in this patent application) as primary or additional factors allows to improve the quality of the decisions made.

Furthermore, one of the characteristics of the processed set of records or one of the estimates of the optimization criterion can be the estimation of the optimal digit capacity (including bit depth or radix) or information capacity of digits or symbols, which can be subsequently used at some step or steps during the sorting, searching, or other data processing.

We emphasize that while reducing the cache memory load is one of the optimization criteria for selection in our proposed methods (algorithms) and their specific implementations, the methods (algorithms) described in this patent application can be used for optimization based on any other criteria (and both these methods and criteria can be used for more than just sorting). In particular, for a specific sorting implementation, reducing table size or lowering the information capacity (including digit capacity, bit depth or radix) of digits or symbols may have intrinsic value, even beyond the criterion of reducing workload or cache memory load.

If necessary and at the discretion of an engineer skilled in the art, the methods (algorithms) described in this section can also be combined with iterative methods (algorithms) for reducing information capacity (including digit capacity, bit depth or radix) as described earlier. They can also be used to determine or improve termination criteria in iterative algorithms for reducing information capacity or digit capacity (including bit depth or radix), which were described above, in the "Building Tables with Enhanced Resolution (Oversampling)" section.

Thus, in this section, we also describe a new method (algorithm, program, software, system, scheme, circuit, logic block or device that uses said method) for determining an optimal information capacity, digit capacity, bit depth, or radix of digits or symbols that is characterized by utilizing an analysis or transformation of a counter table or an index table to determine the optimal information capacity, digit capacity, or bit-depth of digits or symbols, achieved through a function that incorporates information obtained from said analysis or transformation, or based on the fact that the sequence of iterations in said analysis or transformation is terminated. In particular, this resulting optimal information capacity, digit capacity, bit depth, or radix of digits or symbols can be used at some step or steps during sorting, searching, or other data processing.

We also describe a new method (algorithm, program, software, system, scheme, circuit, logic block or device that uses said method) that is characterized by utilizing information extracted from a counter table or an index table to determine the termination criterion of an iterative algorithm for transforming the counter table or the index table, enabling the subsequent use of a different information capacity, digit capacity, bit depth, or radix for digits or symbols at a certain step or steps in the process of sorting, searching, or other data processing.

We emphasize that, as with other solutions described in this patent application, the counter table or index table in the solutions we describe may contain not only trivial record counter values or enumerate records corresponding to specific digit or symbol values in a certain position or positions of the numeric value of the key, but, in some specific implementations, such a table may contain information about the frequencies of digits or symbols and/or information about other statistical characteristics of the distribution of actual digit or symbol values in the keys of the sorted records, or it may describe the properties of the distribution of the key values themselves. This information can be directly stored in the elements of such a counter table or index table or calculated using a certain function and/or other information taken from the elements of such a table, may be in combination with information taken from other sources.

In particular, specific implementations of some new methods described in this section can be performed as follows:

If a specific implementation uses a counter table, then the value of an element in this table, or a value extracted from such an element, or a value computed using information taken from such an element, is passed as input to a certain function that evaluates (computes the evaluation value of) the influence (impact) of that bucket or set of buckets corresponding to the given element of the counter table (or, in other words, the impact of a bucket or buckets corresponding to a certain value, set of values, or range of values of digits or symbols corresponding to the given element of the counter table) on the selected optimization criterion or the selected characteristic of processed records.

If a specific implementation utilizes an index table, the necessary information for computing the assessment of the influence (impact) of that element of the table (influence of a corresponding bucket or set of buckets) can be obtained by analyzing the data structure represented by that element of the index table, or can be directly extracted from that data structure, or computed based on information extracted from it.

In particular, for each element of the counter table or index table, an assessment can be computed, for example, assessment of the influence of the bucket or set of buckets corresponding to that element of the table on the amount of work that needs to be performed during sorting at the current or on the subsequent step(s) of the sorting process. In particular, when calculating this assessment, the number of elements in the bucket or set of buckets, or other characteristics of that bucket or set of buckets, can be taken into account. Similarly, an assessment can be computed of the influence of the bucket or set of buckets represented by that element of the counter table or index table on the cache memory load of the computational system.

Similarly, the method (algorithm) or specific implementation can assess the influence on the selected optimization criterion not only of individual elements of the counter table or index table but also of groups of such elements.

We also emphasize that, at the discretion of an engineer skilled in the art, the specific information necessary for computing the assessment of an optimization criterion (e.g., for computing the assessment of workloads or assessment of cache memory load of the computational system) or for computing a characteristic of the processed records can be obtained not only directly by reading or extracting it from an element or set of elements of the counter table or index table but also computed using information read or extracted from an element or set of elements of such a table, as well as using other information obtained from other sources.

For sorting tasks, one specific assessment of such an optimization criterion can be the assessment of cache memory load that the movement of records falling into that bucket or set of buckets corresponding to a given element or set of elements of the counter table or index table will presumably and/or approximately create.

In particular, the optimization criterion, including the cache memory load of the computing system, can be assessed based on the size of the bucket or set of buckets, i.e., based on the number of records in that bucket or buckets.

Similarly, the optimization criterion can be the estimation of amount of work required for moving records corresponding to a given element of the table, possibly in combination with an assessment of the cache memory load of the computational system.

In simpler specific implementations of radix, bucket, or interval sorting, the values of the elements in the counter table represent the computed sizes of the buckets corresponding to those elements. Each element of the counter table contains the calculated number of records that have a specific digit or symbol value at a particular position in the numeric values of the keys of the records being analyzed by the sorting implementation at that step of its operation.

If a specific implementation has information about the bucket size or an estimate of that size, then the amount of work or the cache memory load in the simplest case can be considered proportional to the bucket size or its estimate, or proportional to the value of some function of that quantity. The assessment of the bucket's influence can be normalized, for example, using information about the total number of processed records, the size of the maximum (longest) bucket (e.g., the maximum value of an element in the counter table in simpler implementations), the average size of the bucket (computed for all buckets or for some subset of them), or by using another normalization factor, at the discretion of an engineer skilled in the art.

We emphasize that an engineer skilled in the art can use an arbitrary function to compute the selected optimization criterion (including the assessment of workloads or cache memory load of the computational system) or the selected characteristic of the processed set of records. The main idea of this invention is the use of information extracted from the counter table or the index table to assess some (arbitrary) quantity characterizing the processed (for example, sorted) records.

The obtained assessment of the contribution of a specific element of the table, i.e., a specific bucket or set of buckets (e.g., assessment of cache memory load or assessment of the amount of work created by that bucket or set of buckets), is then used to compute a value or values that represent or serve as the basis for computing the overall final assessment of the selected optimization criterion (e.g., total amount of work or total cache memory load of the computational system) or the final value of the selected characteristic of the processed set of records, taking into account the contribution of all buckets.

At the discretion of an engineer skilled in the art, if it is possible in a specific implementation, the final assessment can be calculated iteratively by updating previously computed value(s) of such assessment using "elementary" assessment(s) made for the next bucket or set of buckets processed (corresponding to the next processed element of the table).

For example, the assessment of the contribution of a specific bucket can be used to compute or update the computed value of the assessment of the total amount of work or total cache memory load created by all the buckets that have already been analyzed (i.e., the assessment of the amount of work or load created by buckets corresponding to all the previously processed elements of the table).

At the discretion of an engineer skilled in the art, the calculation of the bucket's contribution assessment can take into account not only characteristics of the bucket itself, read or computed using analysis of the element (or elements) of the counter table and/or index table corresponding to or associated with that bucket but also other data. In particular, the bucket's characteristic (possibly in combination with other characteristics used to calculate the influence of that bucket) participating in the calculation of its contribution in final assessment can be the bucket's number, weight, index, other identifier, or value characterizing that bucket, the values corresponding to the digits or symbols associated with that bucket, or any other information about that bucket, its corresponding digits or symbols, or the position of the digits or symbols corresponding to that bucket in the entire ordered set of buckets, digits, or symbols.

At the discretion of an engineer skilled in the art, the computation of the optimization criterion or the characteristic of the processed set of records can also be implemented either in a unified manner or divided into two conceptual parts: the accumulation stage of information about the characteristics of buckets or sets of buckets that contribute to the final assessment and the actual computation of the final assessment taking into account the accumulated information. In any case, in a specific implementation, during the computation of the optimization criterion or the characteristic of the processed set of records, information can be accumulated in variables (not necessarily scalar) and/or in certain data structures.

As decided by an engineer skilled in the art, during the accumulation of information and/or during the computation of the final assessment of the optimization criterion or the characteristic of the processed set of records, external data can be taken into account. These external data can be represented, for example, by the values of additional variables (not necessarily scalar) and/or data structures, which, in turn, can also be updated during the processing described in this section.

Moreover, at the discretion of an engineer skilled in the art, the accumulated information characterizing buckets and used for the computation of the assessment of the optimization criterion or the characteristic of the processed set of records can be grouped for specific groups or classes of buckets, including as discussed below in the section "Fast Evaluation of Optimization Criteria or Characteristics", or in any other way.

The computation of the optimization criterion or the characteristic of the processed set of records can be performed in its entirety, i.e., for all elements of the counter table or index table. Alternatively, at the discretion of an engineer skilled in the art, it can be terminated prematurely (including before completing the iteration over all elements of the table). For example, the computation can be stopped when the current computed assessment or one of the computed quantities reaches a certain threshold value(s), possibly in combination with the use of other stopping criteria.

As mentioned earlier, the overall assessment of the optimization criterion or the characteristic of the processed set of records can be computed either directly during the iteration over the elements of the original counter table or index table or it can be computed later, after the completion of such iteration, based on the values accumulated during the iteration. It can also be computed using an additional (auxiliary) iteration or multiple additional iterations. Multiple iterations may be required, for example, when the computation of the overall assessment requires data that cannot be obtained until the previous full iteration over the set of elements is completed, or if this assessment is computed based on the analysis of multiple tables.

This invention allows for the use of an arbitrary function to assess the selected optimization criterion or the selected characteristic of the processed set of records for an individual bucket or set of buckets corresponding to a given element or elements of the counter table or index table.

This invention also allows for the use of arbitrary methods to compute the final (overall) value of such an assessment of the optimization criterion or the characteristic. The essence of this invention lies in the idea of applying a certain function to the information read, extracted, or computed based on the contents of the counter table or index table in order to compute the overall assessment of the selected optimization criterion or the selected characteristic of the processed set of records. It also includes the idea of using a certain function to compute the overall assessment of the optimization criterion or the characteristic based on the accumulated assessments of the contribution from individual elements if necessary (if the final value of the overall assessment is not computed directly during the iteration over the counter table or index table together with the computation of the contribution from individual elements).

We note that the described methods allow for an implementation that enables the computation of the final assessment of the optimization criterion or the characteristic without additional accessing of the processed records themselves and their keys.

In particular, but not limited to, this invention allows for the computation of the following optimization criteria or the characteristics of the processed set of records:

a) Estimation of the expected cache memory load or a quantity that grows with an acceptable error in proportion to the increase in the cache memory load (from the perspective of an engineer skilled in the art implementing this invention). The true value of the cache memory load can be difficult or impossible to estimate or calculate accurately in advance. However, there are quantities that correlate well with the increase in the cache memory load. Such quantities can be used as this optimization criterion. For example, with some error, the cache memory load in a radix, bucket, or interval sorting algorithm is proportional to the number of "active" buckets that participate more frequently than other buckets in record movements (relocation) during sorting. Typically, the long buckets are the most active because, for many distributions of key values, the probability of reading an element from or moving an element to a bucket (or corresponding memory area) is significantly lower for short buckets and significantly higher for long buckets. This is because elements from long buckets are encountered more often in the sorted array or other data structure outside the final placement of these buckets. Therefore, long buckets "compete" longer and/or more frequently with each other for placement in the cache memory of their corresponding leading zones in the areas of the final arrangement of their elements and/or for placement of their corresponding elements of the auxiliary tables.

b) Estimation of the workload volume. In many specific implementations of radix, bucket, or interval sorting, the main cost is associated with the process of moving (relocating) records between buckets. Therefore, the criterion of the number of active buckets mentioned in point (a) above can also be used to estimate the expected workload volume. However, an engineer skilled in the art implementing this invention can also use other quantities or methods to estimate the workload volume.

c) Estimation of the optimal information capacity (including digit capacity, bit depth, or radix) of digits or symbols that can then be used at some step or steps in the process of sorting, searching, or other data processing. Particularly it may be used for rebuilding auxiliary tables, including the counter table(s) or index table(s).

d) Estimation of the number of bits, digits, or symbols that need to be analyzed at the current and/or subsequent steps in the sorting process until a certain intermediate or final point (or state) is reached.

e) Estimation of the amount of information (entropy) in the keys of records or in certain parts of the keys (e.g., in specific digits or symbols within keys. In prefixes or suffixes of keys).

f) Estimation of any other characteristic for the records as a whole or for any field or set of fields in the records (including field(s) other than keys) if the information necessary to compute such a characteristic is partially or entirely collected in the counter table or index table or can be obtained through analysis or operations on the elements of such tables.

As mentioned earlier, an engineer skilled in the art can directly compute or update these quantities during the iteration over the elements of the counter table or index table or their final values can be computed later, after the completion of the iteration or a series of iterations over the elements of the original table(s) (possibly with the help of an additional iteration over some auxiliary data structure).

To assess the contribution of a bucket, a set of buckets, or an element of the counter table or index table to the selected optimization criterion or characteristic of the processed records, the following quantities or derivatives of these quantities can be used, as well as any combinations of these quantities or any value computed (using a certain function) based on these quantities:

a) The length of a bucket or the cumulative length of a set of buckets; the length of a bucket or set of buckets corresponding to a specific element of the counter table or index table (for example, in the simplest specific implementations, this can be the value of the counter table element, which usually equals to the number of records containing a certain digit or symbol value at a specific position or positions in the numeric values of the keys, i.e., the length of the bucket corresponding to that counter table element).

b) The frequency at which a certain digit or symbol value occurs at a specific position or positions in the numeric values of the keys of the records corresponding to a particular bucket, set of buckets, or particular table element.

c) The number of records referenced by an element or corresponding to a specific element of the index table or counter table (typically, this value coincides with the length of the bucket, but it may not coincide with the length of the bucket, for example, if the index table or counter table is constructed as a histogram with some resolution that does not match the exact separation into buckets).

d) Statistical characteristics of a bucket or set of buckets (including those represented by the counter table element or index table element) (this point is relevant when the bucket description or table element includes or allows the computation of statistical characteristics rather than simply containing a record counter that increments by one each time a certain digit or symbol value is encountered in a key).

e) Estimation of the amount of information (entropy) in the keys of the records that fall into a specific bucket or set of buckets (e.g., in the bucket or buckets corresponding to a specific element of the counter table or index table), or in certain parts of such keys (e.g., in specific digits or symbols within keys. In prefixes or suffixes of keys).

f) Any other information describing a bucket or set of buckets or obtained using an element of the counter table or index table, or the result of applying a certain function to such information or to the table element (e.g., the value of a certain field of the table element, the value referenced by a field of the table element, the value of a field of the data structure referenced by the table element, any derived information obtained by applying a certain function to the information extracted from or using the table element, etc.).

g) Any information describing a bucket, set of buckets, or table element as such (e.g., the value of the digit or symbol corresponding to that bucket or table element, the ordinal number of that element in the counter table or index table, which in some implementations may not coincide with the value of the digit or symbol, and so on).

h) One of the quantities listed above in points (a) . . . (g) or a result of certain function applied to such a quantity, normalized in some way, particularly normalized to the average value of that quantity calculated for all buckets or elements of the table or some subset thereof (e.g., the length of a specific bucket normalized to the mean value or root mean square value of all bucket lengths), or normalized to some extreme value (e.g., corresponding to the length or other characteristic of the longest bucket among all buckets or the longest bucket among a certain subset of buckets containing the majority of records).

i) The result of applying a certain function (including logarithmic function, square or other powers, square root or other roots, any other function) to any quantity or set of quantities computed as described above in points (a) . . . (h).

j) One of the quantities listed above in points (a) . . . (i), taken with a weight that can itself be so quantity computed as described above in points (a) . . . (i).

We note that in a specific implementation of this method, multiple different assessments of the contributions of individual buckets, sets of buckets, and/or table elements can be used during the accumulation of information and/or the computation of the final assessment. These different quantities can be as described in points (a) . . . (j) above or any other quantities selected by an engineer skilled in the art.

Correspondingly, the values accumulated during the computation of the final assessment can also be a set of quantities rather than a single quantity. The final assessment itself can be calculated as several separate quantities, which can then be reduced to a single quantity or kept as a set of quantities, depending on the decision of the engineer skilled in the art.

Thus, the final assessment can be a complex assessment computed for multiple sets of initial quantities characterizing the contributions of individual buckets, sets of buckets, and/or table elements.

During the consideration of the contributions from individual buckets or sets of buckets, a specific implementation may also accumulate additional information, such as the number of processed buckets, the number of non-empty buckets, and so on, at the discretion of the engineer skilled in the art. This information does not necessarily have to be scalar values. For example, a histogram of bucket length distributions may be accumulated, and so on.

Once again, it should be emphasized that, as mentioned earlier, bucket characteristics can be read (extracted) from the counter table or index table elements (e.g., the value of a counter table element can represent the length of a bucket), or they can be computed using information taken from the elements of such a table. In the simplest specific implementations, these quantities are directly contained in the elements of the counter table, or they can be extracted or obtained by analyzing the data structures contained in the elements or referenced by the elements of the counter table or index table, or they can be computed by applying certain functions to the information directly extracted from the elements of the table, or obtained using the values of the table elements itself.

It should also be noted that the solutions described in this section can utilize not only quantities directly read from the elements of the table but also derived quantities. For example, the logarithm of the number of records corresponding to a specific element or elements of the counter table or index table or the logarithm of the length of a bucket or the cumulative length of a set of buckets, which is the same as the logarithm of the number of records falling into that bucket or set of buckets) can be used.

The specific method of computing the final assessment is chosen by an engineer skilled in the art.

In particular, the final assessment can be computed as a simple or weighted sum or as a simple or weighted average (including arithmetic mean, geometric mean, or root mean square) of the contributions from individual buckets, sets of buckets, or table elements, possibly taken with certain weights.

Alternatively, it can be computed as a statistical quantity characterizing the set of contributions from individual buckets or from sets of buckets, such as standard deviation, variance, variability, or any other statistical characteristic for the set of quantities corresponding to the contributions (or weighted contributions) from individual buckets, their sets, or table elements.

However, in general, the engineer skilled in the art can use an arbitrary function or method to compute the final assessment, including additional information.

In particular, but not limited to, the following quantities can be used to compute the final assessment of the selected optimization criterion (e.g., to calculate the assessment of the overall cache memory load or the assessment of the overall workload) or to compute the final value of a characteristic of the processed set of records:

a) The count, percentage, or proportion of buckets whose length exceeds a certain value, such as the average or root mean square length of the buckets.

b) The count, percentage, or proportion of buckets or records in those buckets corresponding to a specific quantile (percentile) of the total number of records being analyzed at that stage.

c) The count, percentage, or proportion of buckets corresponding to a certain criterion chosen by the engineer skilled in the art implementing the invention.

d) The count, percentage, or proportion of records falling into buckets that meet a certain criterion chosen by the engineer skilled in the art implementing the invention.

e) An estimation of the number of "active" buckets or the number of records corresponding to such buckets, for example corresponding to such buckets that presumed to create the main cache memory load (pressure) or main workload at the current or subsequent step(s) of the sorting process.

f) General characteristics of the set of buckets, sets of buckets, or table elements collected during the consideration of their contributions or otherwise (e.g., total number of buckets, number of non-empty buckets, histogram of bucket lengths showing their distribution, etc.).

g) Weighted, normalized, or direct sum of the contributions from individual buckets into the overall value of the assessment of the selected optimization criterion or the selected characteristic of the processed set of records.

h) Any statistical characteristic(s) of the distribution of digit or symbol values computed or estimated by analyzing the set of buckets or the set of elements of the counter table or index table, or by other means (including the analysis of record keys at another stage of operation). These characteristics may include mean, standard deviation, variance, variability, characteristics of confidence intervals (e.g., one of the boundaries or the width), and other statistical characteristics that describe the distribution of digit or symbol values.

i) An estimation of the optimal radix, information capacity or digit capacity, or the number of bits, digits, or symbols that need to be analyzed at the current and/or subsequent steps of the sorting process, or an estimation of the expected number of steps until the process reaches a specified intermediate or final point (or state).

j) An estimation of the amount of information (entropy) in the keys of the records or in certain parts of such keys (e.g., in specific digits or symbols within keys. In prefixes or suffixes of keys).

k) Any other information obtained through the combination and/or through processing of information collected in the elements of the counter table or index table, or obtained through analysis or operations on these elements, or obtained from other sources.

l) Any other information external to the methods discussed here but useful for computing the final assessment.

m) The result of applying a certain function (including logarithmic function, square or other powers, square root or other roots, any other function) to any quantity or set of quantities computed as described above in points (a) . . . (l).

n) Any combination (set) of the quantities described above in points (a) . . . (m), as well as aggregate quantities computed based on (using) the primary quantities described above in points (a) . . . (m).

Any value of the contribution assessment of an individual element of the counter table or index table, computed as described above, and/or any value of the overall assessment of the optimization criterion or characteristic of the processed set of records, computed as described above, whether computed during the iteration or after the completion of the iteration or set of iterations over the elements of the counter table or index table, can be directly checked in arbitrary way or can be used as part of a complex verification criterion (utilizing arbitrary additional information). Therefore, they can be used as the criterion or as part of the criterion for terminating the iterative "downsampling" algorithm, such as algorithm for reducing the digit or symbol size, radix, information capacity, digit capacity or bit depth of digits or symbols.

The specific implementation of such a termination criterion is determined by the engineer skilled in the art. The essence of this invention lies not in the use of a specific formula as the termination criterion, but in the idea of incorporating at least one value computed using information taken from the counter table or index table as part of the termination criterion.

We emphasize that such a termination criterion can be checked not only upon completion of the iteration over all elements of the counter table or index table but also after assessing the contribution of each individual element or some specific elements to the overall value. Alternatively, it can be checked periodically (e.g., after processing a certain number of elements of the counter table or index table) or based on more complex conditions. This allows for terminating the iterations of "downsampling" algorithm (such as algorithm for reducing the size, information capacity, digit capacity, bit depth, or radix of digits or symbols) before completing the processing of all elements in the counter table or index table.

The methods described in this section can also be used to compute the value of the optimal information capacity or digit capacity (including bit depth or radix) for digits or symbols, which can be considered as an optimization criterion. The computed value of the optimal information capacity or digit capacity (including bit depth or radix) can then be used at the current step or subsequent step(s) in the sorting process.

The values computed using the methods described in this section can be directly checked arbitrarily or used as part of a complex verification criterion that utilizes arbitrary additional information. Thus, they can be used as the criterion or as part of the criterion for switching to the use of another sorting, searching, or data processing method, or for making any other decisions regarding the selection of the optimal working strategy.

We also emphasize that both the characteristics of buckets, records, or their groups, and the assessments of the contributions of such buckets, records, or their groups to the overall estimation, as well as the resulting (final) values of the overall estimation of the optimization criterion or overall estimation of the value of the characteristic of the processed set of records, as described above, do not necessarily have to be scalar quantities (scalar variables). They can be more complex types or data structures (such as arrays or structures with multiple fields). The composition of and specific implementation of all these input quantities or resulting quantities (variables, characteristics, parameters) are determined by the engineer skilled in the art.

Fast Evaluation of Optimization Criteria or Characteristics of Set

The direct implementation of certain methods (algorithms, schemes) described in the previous section, "Determining Optimal Information Capacity and Termination Criterion for Downsampling Algorithm", may require a significant amount of computation or the utilization of a large number of other resources.

Therefore, in this section, we describe a new method (algorithm, program, software, system, scheme, circuit, logic block or device that uses said method) for evaluating some optimization criterion (such as the estimated workload or cache memory load of a computational system) or for estimating a characteristic of the processed set of records that is characterized by using accumulation of information in an auxiliary data structure, where the elements of said auxiliary data structure correspond to groups of buckets, groups of elements of the counter table, or groups of elements of the index table, and these buckets, or elements of the counter table, or elements of the index table within each group correspond to a certain set or a certain range of values of a some feature that characterizes these buckets or elements of the table.

For example, this method may accumulate values of a characteristic or a set of characteristics of the buckets themselves, elements of the counter table, or index table. It accumulates information for buckets or table elements that correspond to similar bucket lengths. In this case, the bucket length is a feature used for grouping buckets according to the method described above. In particular, bucket lengths that are greater than or equal to specific power of two and less than the next power of two can be considered similar to each other (between these pairs of powers of two, taking into account some rule for boundary values). In this case, the method will accumulate values of a characteristic or a set of characteristics for buckets (or corresponding records) whose lengths fall within different powers of two (if we apply this technique to different pairs of powers of two).

In process of working according to the methods described in this section, values of a characteristic or a set of characteristics for buckets or table elements with similar values of the selected feature that serves as the grouping criterion, or values of a characteristic or a set of characteristics for corresponding records associated with the said buckets or table elements, are accumulated in an auxiliary data structure (e.g., an array, vector, set, or any other suitable data structure). The elements of this data structure correspond to groups of buckets or table elements. Then, these accumulated values of the characteristic or set of characteristics are used to compute the evaluation of an optimization criterion or estimate a characteristic of the processed set of records. They can be used, for example, to compute an estimate of the expected workload or cache memory load of a computational system.

Moreover, the accumulation of values itself can be done using some function or by any method determined by the engineer skilled in the art.

Since the elements of the counter table or index table directly or indirectly characterize records from the subset of records processed at the corresponding step or stage of the algorithm, the accumulated information can be considered as characterizing specific groups of records, not just the buckets or corresponding elements of the counter table or index table themselves. However, it may sometimes be more convenient to view the accumulated quantities as characteristics of the buckets or table elements themselves, depending on the choice of the engineer skilled in the art.

By the choice of an engineer skilled in the art, it is also possible to accumulate information such as the number of non-empty buckets or non-empty elements of the counter table or index table, or the number of those elements whose value or a certain field value exceeds or does not exceed a certain threshold or thresholds, corresponds to or does not correspond to a certain criterion.

We also describe a general method (algorithm, program, software, system, scheme, circuit, logic block or device that uses said method) that is characterized by the accumulation of values of a certain characteristic or set of characteristics for those buckets or for those elements of the counter table or index table that have similar values of a certain selected feature characterizing these buckets or elements of the counter table or index table, regardless of the purpose and manner in which the information accumulated in this way will be subsequently used. In particular, we describe a method that accumulates information about the total length or the number of buckets having similar bucket length values.

We also describe a general method (algorithm, program, software, system, scheme, circuit, logic block or device that uses said method) that is characterized by the use of computing the value of a certain function, hereinafter referred to as a "compression function" that maps the original set of possible values of a certain selected quantity characterizing the elements of an original set of objects into a more compact set of values, with the purpose of using such computed values of said compression function for indexing or addressing a certain auxiliary data structure, the elements of which are used for the accumulation of any information obtained or computed using arbitrary values that characterizing the elements of the original set of objects, or for counting the number of such elements of the original set of objects that correspond to certain computed value or values of said compression function, possibly in combination with other criteria.

In the context of buckets or corresponding elements of a counter table or index table, during or after the accumulation of values for a certain characteristic or set of characteristics of the buckets, table elements, or corresponding records, the information accumulated in an auxiliary data structure can be further used, in particular, for evaluating an optimization criterion. Alternatively, this accumulated information can be used to compute an estimate of a characteristic value for a processed set of records. For example, the accumulated information can be used to compute an estimate of the expected workload or cache memory load in a computational system.

According to the decision of an engineer skilled in the art, the computation of the optimization criterion or the characteristic estimate for a set of records can be implemented either by iterating through the elements of the auxiliary data structure that accumulated values of one or more characteristics of the buckets, table elements, or corresponding records, or the computation can be performed directly during the accumulation process by iteratively updating the computed estimate during the main iteration over the buckets or the elements of the counter table or index table.

In other words, in a specific implementation of the described methods, the accumulation of characteristic values (or values for a set of characteristics) for buckets, table elements, or corresponding records can be combined with the process of computing of an optimization criterion (e.g., estimating the expected workload or cache memory load in a computational system) or with the process of evaluating a characteristic of a processed set of records.

As mentioned above, these methods are applicable not only to buckets or corresponding elements of a counter table or index table but can also be applied to elements of an arbitrary set of objects (e.g., elements of a data structure) grouped by applying some compression function to the value of a selected object characteristic. The computed value of such a compression function is then used for indexing or addressing an auxiliary data structure. Then, information calculated or obtained from the analysis, or derived using elements from the original set of objects (e.g., calculated or derived using the field values of the elements of the data structure being processed or using other characteristics of such elements, such as their ordinal numbers) is accumulated in the said auxiliary data structure using a method selected for a specific implementation by an engineer skilled in the art.

The application of the described methods to an arbitrary set of objects is completely analogous to their application to buckets or elements of a counter table or index table (e.g., in sorting or searching processes)—only the purpose and meaning of the processed elements change. However, the basic processing steps for an arbitrary set of objects essentially are identical to those used for processing a set of buckets, or a set of elements of a counter table or index table. Therefore, below we mainly describe implementations for sorting and searching processes, but we specifically note that these same implementations can be easily reformulated by an engineer skilled in the art for processing elements of an arbitrary set of objects, as mentioned above. In this case, the engineer skilled in the art determines the further use of information accumulated in the auxiliary data structure.

We also note that according to decision of an engineer skilled in the art and according to the specifics of a particular implementation, the elements or fields of the auxiliary data structure used for accumulating information can be pre-initialized or otherwise initialized before starting to use this data structure for accumulation. Alternatively, the initialization (including zeroing) of elements or fields of said auxiliary data structure can be performed dynamically during the execution of the methods described in this section (e.g., in cases where a specific implementation dynamically creates or dynamically initializes elements of the auxiliary data structure during runtime rather than in advance).

In particular, a specific implementation of the methods described above can be performed as follows:

During the iteration over the elements of a counter table or index table, the specific implementation extracts or computes the value or values of a certain characteristic or a set of characteristics for a given table element, bucket (associated with said table element), or corresponding records, using or based on the information contained in such a table element. These values can be used to evaluate an optimization criterion (e.g., estimating the expected workload or cache memory load in a computational system) or to estimate a characteristic of a processed set of records.

Then, instead of directly and immediately using the extracted or computed characteristic value(s) to compute the final criterion or characteristic estimate, the specific implementation, based on the choice of an engineer skilled in the art, determines the value of a certain feature (or attribute) that characterizes the given bucket or table element. Then, it accumulates the extracted or computed characteristic value(s) into an element of an auxiliary working data structure corresponding to the value of the selected feature (attribute), which characterizes the bucket or table element (and, directly or indirectly, the corresponding set of records).

Wherein the feature (attribute) value characterizing a counter or index table element does not necessarily have to be derived from the information read from the respective element or computed based on such information. It can be any other value selected by the engineer skilled in the art. For instance, it can be the bucket number corresponding to the table element, or any other attribute characterizing the respective bucket or set of buckets.

In one of possible specific implementations, the feature (attribute) used for grouping the table elements or buckets can be the length of the bucket rounded to a certain granularity or the value of some function (e.g., a logarithmic function) applied to the length of the bucket. In particular, but not exclusively, the number of significant bits in the bucket length value, the position of the leading bit in the bucket length value, the count of leading zeros or ones in the bucket length value, or the rounded integer value of the logarithm of the bucket length can be used as the feature (attribute) for grouping the buckets or table elements.

The computed attribute value, according to the described method, will be used for indexing or addressing the auxiliary data structure, for example, as an index of an element in the auxiliary data structure where some characteristic or a set of characteristics of buckets, table elements, or corresponding records belonging to the given group are accumulated. The accumulated characteristic can be, for example, an exact value, an estimated value, or a rounded value of the total length of buckets for the given group.

The accumulated information can include not only a certain characteristic of buckets, table elements, or corresponding records, but also, for example, the number of non-empty buckets or non-empty elements of the counter table or index table, or the number of those elements whose value or a certain field value exceeds or does not exceed a certain threshold or thresholds, corresponds to or does not correspond to a certain criterion.

The methods described in this section allow for the accumulation of values for multiple characteristics of buckets, table elements, or corresponding characteristics of the processed (e.g., sorted) set of records during a single iteration over the buckets or elements of the counter table or index table. This can be useful, particularly when multiple such values will subsequently be used for estimating the expected workload, cache memory load in a computational system, or for evaluating a characteristic of a processed set of records.

We emphasize that both the accumulated values and the results computed using the accumulated information do not necessarily have to be scalar variables. They can be more complex data structures (e.g., arrays, vectors, matrices, or structures with multiple fields). An engineer skilled in the art determines the composition and specific implementation of these values (variables).

In other words, the specific implementation can use the value of the selected feature (attribute) that characterizes the buckets, counter table elements, or index table elements to accumulate the values of a certain characteristic or a set of characteristics for buckets or table elements with specific feature (attribute) values (e.g., with the same attribute values or with the values corresponding to the same power of two or another base, etc., based on the choice of an engineer skilled in the art). In essence, the specific implementation divides the entire set of buckets, counter table elements, or index table elements into groups.

For example, when grouping by an attribute based on the bucket length, the entire set of possible values for bucket lengths can be divided into equally sized intervals (similar to the buckets in radix or bucket sort). Alternatively, the set can be divided in another manner, in particular using powers of two or another base. In particular, the logarithmic function can be applied to the bucket length, and the resulting value of said logarithmic function can be used as the attribute characterizing the bucket. Then, this calculated attribute value is used for indexing or addressing an auxiliary data structure, where information characterizing groups of buckets, table elements, or corresponding records is accumulated. For instance, as a value of the logarithmic function to calculate the attribute for the grouping can be used the rounded integer value of the logarithm of the bucket length, the position of the leading bit in the bucket length value, the count of leading or trailing zeros in the direct or transformed value of the bucket length, and so on—depending on the choice of an engineer skilled in the art for a particular implementation of the described method (and in accordance with the definition of the logarithmic function provided by us at the beginning of this patent application).

If we consider the elements of the auxiliary data structure, in which our proposed methods accumulate values of characteristics of buckets or elements of tables with similar values of a selected feature or attribute, as new buckets, then essentially, during the iteration process over the original buckets or the elements of the counter table or index table, we determine to which specific new bucket the value of the selected feature, characterizing the given specific original bucket or set of buckets (for example, the original bucket(s) represented by the given element of the counter table or index table), falls. In particular, we can determine the number (index) of the new bucket for this method by computing the logarithmic function value of the original bucket's length. Then, we use the computed new bucket number as the number (index) of the element in the auxiliary data structure, where we accumulate values of characteristic(s) of the original buckets, table elements, or theft corresponding records.

Thus, in a specific implementation (for example, a device or software implementing this invention), the values of characteristic(s) of buckets, table elements, or corresponding records are accumulated in an auxiliary data structure. The elements of this structure themselves bear some resemblance to buckets, as they gather data for original buckets, or records, or for elements of the original set of objects that are similar in some way or belong to the same cell (new imaginary bucket) based on a certain attribute value.

The introduction of information into this auxiliary data structure (referred to here as the accumulation of characteristics of buckets or table elements with similar values of the selected attribute) can be implemented, for example, by adding the value of the selected characteristic to the current value stored in the corresponding element of the auxiliary data structure designed for accumulating values of that characteristic. The initial value for the elements of such a data structure can, for example, be initialized to zero or they can be created dynamically or initialized upon the discovery of the first bucket or table element with the corresponding attribute value.

For example, the total length of all buckets whose sizes correspond to each power of two can be computed using this method, and/or the total count of buckets with lengths corresponding to each power of two can be calculated.

Once the accumulation of characteristic values (or a set of characteristics) is completed, the specific implementation can iterate over the elements of this auxiliary data structure (either over all elements or only non-empty elements, depending on the specifics of the implementation and the decision of an engineer skilled in the art).

During this process, the accumulated characteristic values are extracted from the auxiliary data structure and based on these accumulated values (rather than the characteristic values of individual buckets), an estimate of the expected workload, cache memory load in a computational system, another optimization criterion, or a characteristic of the processed set of records is computed.

This computation can be performed as described in the previous sections of this patent application, but instead of using the characteristic values directly from the counter table or index table, the accumulated values taken from the elements of the auxiliary data structure filled (calculated, formed) according to the methods described in this section will be used as the necessary characteristic values for the estimation.

Additionally, normalization may be performed considering the count or total length (volume) of buckets in a particular group (corresponding to an element of the auxiliary data structure), and such information about the count or total length (volume) of buckets in the groups can be accumulated in the manner described here.

If the number of elements (or buckets) in the accumulating auxiliary data structure is smaller or much smaller (theoretically or in practical terms, considering the prevalence of empty or missing elements, zero values) than the total number of buckets directly represented by the counter table or index table, the methods described above significantly reduce the overall volume of computations required for estimating the expected workload, cache memory load in a computational system, another optimization criterion, or a characteristic of the processed set of records.

It should be noted that this invention also allows (at the discretion of an engineer skilled in the art) the use of analysis of the characteristics of the original buckets or table elements, or analysis of the accumulated (accumulating) characteristic values (including, but not limited to, during the accumulation process) for computing a criterion that enables early termination of the iteration over the buckets, counter table elements, or index table elements, or over the elements of some other set of objects. This can be useful in determining the optimal information capacity (including digit capacity, bit depth or radix) and can be combined with other solutions from the previous section "Determining Optimal Information Capacity and Termination Criterion for Downsampling Algorithm". In particular, it allows for dynamically stopping further iterations when the optimal value of information capacity (including digit capacity, bit depth or radix) for digits or symbols is found.

Of particular interest is the use of the method described in this section in combination with grouping buckets by their length using a logarithmic function of the length. For example, in this case, the entire set of buckets is divided into groups based on the number of significant bits or digits in the bucket length value (or based on the position of the most significant bit/digit, the count of leading zeros in that value, the integer value of the logarithm or an approximate value of the logarithm of the bucket length, another function related to logarithms, determining bit or digit positions, or counting the number of bits or digits).

For example, when using integer logarithmic functions or bit counting, if the bucket length is a 32-bit value, we can use only 32 elements (buckets) in the data structure where bucket characteristics are accumulated (thus, we have only 32 possible values for the element or bucket number in such a data structure). This allows us to perform the overall estimation with no more than 32 iteration steps over the elements (new "buckets") of the accumulating data structure, computing the overall estimation based on the accumulated characteristic values of buckets with similar sizes. If the computation of the overall estimation involves floating-point operations, slow operations like multiplication and/or division, logarithm, square root, etc., using the proposed method significantly reduces the computational workload compared to a direct implementation of similar calculations for individual buckets represented by elements of the original counter table or index table (which could be much larger than the 32 elements in the accumulating data structure in this example). Thus, we can significantly improve the performance of the estimation computation. In reality, we may even require fewer than 32 elements and 32 steps in the iteration process, as the maximum length of the bucket is typically much smaller. This can be easily accounted for by an engineer skilled in the art who implements this method in a specific implementation.

This method is interesting not only for application to radix sorting or to constructing search tables but can also be used in other areas.

For example, in a generalized method for processing an arbitrary set of objects, we propose using the computation of an arbitrary function, selected by an engineer skilled in the art, of the value that characterizes an object. This function maps the entire set of possible values of the object's characterizing value to a more compact set of new values. Therefore, we refer to said function as a compressing function. The newly computed values can then be considered as the values of some new characteristic (derived from the original one) of the objects in the original set. We note that in a specific implementation, the extraction or computation of the initial characteristic of the objects and the application of the compressing function to the value(s) of this characteristic can be effectively combined, meaning that the compressing function does not necessarily have to be explicitly separated as a distinct structural unit in the software or device implementing our described method. The essence is that the computed final values of a certain characteristic of objects form a more compact set compared to the set of values of some other "initial" quantity (attribute) that characterizes the objects (the value not yet transformed using the compressing transformation), regardless of whether the initial quantity (attribute) is explicitly represented in a specific implementation.

Next, we propose using the computed value of the compressing function of a quantity that characterizes the objects for indexing or addressing the elements of an auxiliary data structure intended for accumulating information.

After accessing an element of the auxiliary data structure, the values of some characteristic or set of characteristics inherent to the objects in the original set are accumulated (e.g., through summation or applying any other accumulation function, at the discretion of the engineer skilled in the art). These characteristic(s) values can be computed, obtained, or read in an arbitrary manner (by choice of the engineer skilled in the art). For example, if this method is applied to process elements of a data structure, the characteristic(s) can be the value(s) of field(s) of the elements of that data structure, as well as other characteristic(s) of the elements themselves, such as their ordinal numbers, indices, selectors, keys, etc.

Effectively, the elements of the auxiliary data structure that accumulates information correspond to specific values of the new quantity that characterizes the objects in the original set, computed using the compressing function. Note that throughout this section of the patent application, we frequently refer to this new quantity as the "feature" or "attribute" that characterizes the original element of the counter table or index table, the corresponding bucket or set of buckets, or the original element of any arbitrary set of objects to which we apply this method of accumulating characteristics for groups of similar elements.

For example, when using an array as the auxiliary data structure and a logarithmic function as the compressing function, the accumulation (e.g., through summation) of the values of some characteristic or set of characteristics of each processed object is performed in the accumulating array, where the index is determined by the value of the logarithmic function applied to a quantity characterizing the current processed object.

Simultaneously with or as an alternative to that, counting the number of objects corresponding to specific values of the characteristic transformed using the compressing function can be performed (e.g., by incrementing the corresponding elements of a pre-initialized auxiliary data structure). This count can take additional selection criteria into account, as determined by the engineer skilled in the art.

The accumulated information can then be used to estimate a certain characteristic of the processed set of records. For example, it can be used as described earlier in this section or as described in previous sections.

And at the end of this section, we also note that a specific implementation of the described method for computing the estimation of an optimization criterion or characteristic of a set of objects can be performed using the original method(s) described in the section "Determining Optimal Information Capacity and Termination Criterion for Downsampling Algorithm", with the additional modification that the operations described in that section should be applied not to the elements of the original counter table or index table but to the elements of a corresponding working table (or another working data structure). Each element of such a working table (data structure) corresponds to a group of buckets or to a group of elements in the original counter table or index table and should contain the computed (or combined, accumulated, summed) values of characteristics for the corresponding group of buckets or elements of the original table (or original set of objects). Whereby the grouping of elements in the original table or their corresponding buckets, as well as the accumulation of information about them in the working table (data structure), is performed as described in this section.

Optimization of Operation Count in Downsampling or Characteristic Estimation

In this section, we describe a method (algorithm, program, software, system, scheme, circuit, logic block or device that uses said method) for optimizing operations during a some process involving reducing or determining the optimal information capacity, digit capacity, radix, or bit depth of digits or symbols, or during evaluating some optimization criterion, or during estimating a characteristic of the processed set of objects, which involves the combination or summation of "a" to the power of "n" elements of a counter table, the combination or merging of "a" to the power of "n" buckets or data structures represented by corresponding elements of an index table, or the combination, merging or summation of "a" to the power of "n" elements of other data structure at the current iteration of said process where otherwise such combination, merging or summation would be performed in several passes through the entire set of elements of the counter table, index table, or by entire object set; wherein "a" represents the number of buckets, the number of the elements of the counter or index table, or number of data structure elements that are combined, merged or summed in a single step of iteration in the unoptimized said process, and "n" is an estimation of the number of iterations of the unoptimized said process that can be performed immediately (taking into account the constraints of the specific implementation, such as an acceptable risk of performance degradation or skipping the optimal state due to immediate combination without intermediate analysis between iterations).

In particular, the optimization described in this section allows for the acceleration of many specific implementations of the methods described in the sections "Determining Optimal Information Capacity and Termination Criterion for Downsampling Algorithm" and "Fast Evaluation of Optimization Criteria or Characteristics" of this patent application.

The value of "n" in this optimization is determined by an engineer skilled in the art, according to the specific characteristics of the chosen implementation of the sorting process or other process that utilizes the methods from this patent application.

In particular, the value of "n" in a specific implementation of this optimization may be proportional to the logarithm of the difference between the estimated number of active buckets (which create the main load in the record relocation process during sorting) and a predetermined ("acceptable" or "optimal") number of buckets. Alternatively, the value of "n" may be predicted (accessed) based on the estimation of the workload or cache memory load of the computing system. In the case of "downsampling" algorithms (algorithms for reducing information capacity, digit capacity, bit depth, or radix of digits or symbols), the value of "n" can be the difference between the current information capacity (including digit capacity, bit depth, or radix, which has already been achieved at the moment or was used in building the counter table or index table) and the estimation of the optimal information capacity for digits or symbols.

In some specific implementations, a certain amount (such as one or more steps) may be subtracted from the initial estimation of "n" to allow for a "protective" step or steps to be performed without utilizing this optimization. This can be useful when a very accurate estimation of some optimization criterion (e.g., workload or cache memory load of the computing system) or a precise assessment of a characteristic of the processed set of objects is required, or when a precise selection of the optimal information capacity (including digit capacity, bit depth or radix) of digits or symbols is needed and when. in this specific implementation, there is a risk of missing the optimal state without employing the "protective" step or steps.

In an iteration of the process that utilizes optimization described in this section, once the value of "n" is determined (estimated), the combining or merging of "a" to the power of "n" buckets, table elements, or other objects or data structures is immediately performed instead of executing multiple individual iterations, where only of "a" objects would be merged separately on each iteration.

For example, when using a traditional counter table together with this optimization in the process of evaluating the optimal information capacity (including digit capacity, bit depth or radix) of digits or symbols or in the process of reducing tables to decrease the information capacity of digits or symbols, or in the evaluation of another optimization criterion, an estimation of the potential reduction of the effective size of the counter table can be made at the beginning or at a certain iteration of the optimized process. If the estimated reduction is "n" digits (or other similar units of information capacity), then, in some implementations, this allows for the accelerated (immediate) execution of "n" iterations (e.g., without performing a new state analysis after each iteration). In such cases, using the method described in this section, the summation (or combining, merging) of "a" to the power of "n" counters can be performed immediately instead of sequentially executing "n" individual iterations of the original (non-optimized) algorithm, where "a" elements of the counter table would be summed (or combined, merged) on each iteration. If the process uses index tables instead of counter tables, then the summation operation (used for simplest counter tables) can be replaced with a combine or merge operation (e.g., concatenation or joining) of data structures, the references to which or the headers of which are stored in the elements of the index table. This optimization can also be applied to combining or merging elements of other data structures in some specific implementations of the generalized process for evaluating characteristics of a set of objects (e.g., set of records).

In some specific implementations of the sorting process or, for example, in some specific implementations of the process for evaluating characteristics of a set of objects (e.g., set of records), this approach allows for the elimination of numerous unnecessary operations, including intermediate calculations and checks.

In particular, in many specific implementations of radix, bucket, or interval sorting, using the methods from this patent application, "a" of buckets will be merged (combined) or "a" of counters will be summed on each iteration in these processes. However, the number of "active" buckets, which contribute significantly to the amount of work performed or the cache memory load of the computing system, and thus determine the optimal information capacity (including digit capacity, bit depth or radix) of digits or symbols, cannot decrease by more than a factor of "a" on each merging iteration. Therefore, it is possible to compute an exact upper bound or at least approximate the value of "n" at which the optimal information capacity of digits or symbols will not be missed (or where the optimal value of information capacity is expected to be reached). This makes it feasible to apply this optimization for accelerated merging of "a" to the power of "n" table elements in these processes.

Reuse of Tables after Reducing the Radix (after Downsampling)

When using methods based on constructing counter tables or index tables for increased information capacity (including digit capacity, bit depth or radix) of digits or symbols, followed by reducing this information capacity, for example, using the methods described in the section "Building Tables with Enhanced Resolution (Oversampling)", there is an opportunity to reuse the information collected in tables of higher information capacity (in tables of higher precision, higher resolution) after transforming them into more compact tables for use with digits or symbols of lower information capacity.

Such reuse of information contained in these tables allows avoiding multiple operations of constructing new counter tables or index tables in subsequent stages (steps, rounds, or passes) of sorting, searching, or other data processing, thereby enhancing the performance of these processes.

Therefore, in this section, we describe a novel method (algorithm, program, software, system, scheme, circuit, logic block or device that uses said method) for sorting, searching, or other data processing, characterized by utilizing the values of the elements of a counter table or index table that correspond to certain digit or symbol values in the numeric values of the record keys, whereby the said counter or index table is constructed in a previous stage, round, pass, or step of the sorting, searching, or other data processing process, and some values of its elements have already been used directly or after certain transformation on the previous stage, round, pass, or step of the such sorting, searching, or other data processing process in connection with the digits or symbols of lower information capacity, digit capacity, bit depth, or lower radix than the one used during the construction of said counter table or index table.

The provision regarding the use of values of the table elements from a previous stage (round, pass, step) in the definition of the method in the previous paragraph is made to emphasize that it pertains to a new method that uses the same table element values in two stages, rather than an implementation of already known solutions that pre-build a separate counter table or index table for a new (subsequent) stage in the process without utilizing its contents in the main sorting or searching operations on the current stage (except for the construction of that pre-built table itself).

In particular, a specific implementation of this method can be performed as follows:

If, on a previous stage (round, pass or step) in the sorting, searching, or other data processing process (referred to as "in the process" hereinafter in this section), a counter table or index table was constructed for digits or symbols of increased information capacity (including digit capacity, bit depth or radix), for example, as described in the section "Building Tables with Enhanced Resolution (Oversampling)" or by any other means, and then a transition was made to using digits or symbols of lower (compared to the initially chosen) information capacity, or a transition was made to using other sorting, searching, or data processing methods, we will refer to such a counter table or index table as a "table of elevated resolution".

Furthermore, if a new stage (round, pass or step) in the process begins in such a way that the new values of digits or symbols at this stage are or can be extracted from the same areas or information parts of numerical key values that were already used at one of the previous stages (rounds, passes or steps) during the construction of the elevated resolution table, and if, in doing so, the table of elevated resolution or the values of all or some of its elements were preserved, then, at the choice of an engineer skilled in the art, instead of constructing a new counter table or index table from scratch for new stage, it is possible to reuse the information taken from the original table of elevated resolution.

The sorting, searching, or other data processing process can be modified to use a fragment or fragments of the table of elevated resolution as new counter tables or index tables, or to use the values of certain elements of the table of resolution table (e.g., values of its fragments) as ready-made elements or as the initial information for constructing new counter tables or index tables to be used at the new stage (round, pass or step) in the process.

In some specific implementations, it is sufficient to simply skip or modify the standard step of constructing a new table (which would be used in the unmodified process) and instead either use a fragment of the table of elevated resolution as the new table, or copy a portion of the elements from the original table of elevated resolution into a new counter table or index table, or transform the values of the elements from the original table of elevated resolution into elements of the new counter table or index table using a method chosen by an engineer skilled in the art.

Such reuse of information contained in the table of elevated resolution is possible when the new stage (round, pass or step) uses digits or symbols that are extracted from the same areas or information parts of numerical values of the keys that were used in constructing the table of elevated resolution.

In particular, if in a specific implementation a counter table or index table for higher information capacity (including digit capacity, bit depth or radix) was constructed for digits or symbols with a fixed digit capacity equal to "m", it can be divided into groups of elements with a fixed size of "d^(m−n)", where "d" represents the base of this digit capacity (e.g., "d" equals 2 for implementations using the binary computing system), "m" corresponds to the original digit capacity used in constructing such the table of elevated resolution, and "n" corresponds to the digit capacity of digits or symbols that have already been used at the previous step or steps (e.g., "n" equals the digit capacity to which the original table of elevated resolution was reduced when constructing the working counter table or index table for the previous step). Each group of elements from the table of elevated resolution will correspond to a single new digit or symbol of lower digit capacity of "m−n" (equal to the difference between "m" and "n") used at the current new stage (round, pass or step) in the process.

At the discretion of an engineer skilled in the art, the same counter table or index table of elevated resolution can be used even on multiple different stages (rounds, passes or steps) in the sorting, searching, or other data processing process—if the condition is met that new digits or symbols on each such new step are extracted from the same areas or information parts in the numerical key values that were used in constructing the original table for digits or symbols of higher information capacity or digit capacity (including higher bit depth or radix).

The use of the method discussed in this section is not always an optimal solution. The reuse of information taken from the table of elevated resolution may limit the information capacity or digit capacity of digits or symbols available (when using this method) for the new stage (round, pass or step)—therefore, an engineer skilled in the art may include additional analysis (including various heuristic, statistical, and other assessments and tests, checks of various optimization criteria, both as described in this patent application and others) in their specific implementation to determine the feasibility of using this method (this optimization).

Let us consider a specific implementation of this method for sorting with MSD (Most Significant Digit) order of movement by key, which uses a counter table and digits or symbols of fixed digit capacity at each individual stage (round, pass or step) in the sorting process.

Suppose that a specific implementation of the sorting process uses a "classic" counter table, where each element represents the count of records containing a specific digit or symbol value in a specific position in the numerical values of the keys. Let us also assume that at a certain step in the sorting process, the current position was equal to a value "p", and the extended digit capacity used in constructing the counter table was a value "m", but then it was reduced to a value "n". In this case, the original counter table (before reducing the digit capacity) was preserved. This original table can be divided into multiple fragments, each of which has a size of "d^(m−n)" elements, where "d" is the base of the numeral system in which the precision is measured (e.g., d=2 for binary systems), "m" corresponds to the original digit capacity used in constructing the table of elevated resolution, and "n" corresponds to the digit capacity of digits or symbols that have already been used in the previous stage (e.g., "n" equals the digit capacity to which the original table of elevated resolution was reduced when constructing the working counter table or index table for the previous stage).

Each fragment of this partition of the original table of elevated resolution corresponds to a new digit or symbol whose digit capacity is equal to the difference between "m" and "n", i.e., "m n". These new digits or symbols can be extracted from the record keys starting at position "p+n" (the sum of "p" and "n"), assuming that the position value increases as we move along the key in the chosen direction.

Each fragment of the original table of elevated resolution can be directly used as a new counter table or copied to a new location for use as a new counter table, or its elements can be considered as elements of a new counter table (e.g., for the purposes of analysis) at a new stage (round, pass or step) in the sorting process.

This direct reuse of fragments from the table of elevated resolution as new tables is possible when the new position at this step or stage (where this optimization is used) is equal to "p+n" (the sum of "p" and "n").

If the new step or stage does not utilize the entire available digit capacity of digits or symbols (i.e., the entire difference between and "n"), the original table of elevated resolution can continue to be used on the next (subsequent) step(s) or stage(s) (in these cases, the value "n" on subsequent step(s) or stage(s) will include all the cumulative progress made in the previous series of steps or stages).

Moreover, in some cases, a fragment of the original table may not only be used directly but also be further transformed and used at any new position within the range that does not reach "p+m" (within the range less than the sum of "p" and "m"). Specifically, this is possible when the keys at the current new step or stage have a common prefix, allowing this specific implementation to advance the position of extracting new keys beyond "p+n" but not reaching a position equal to "p+m". In this case, the transformation of the table involves extracting an even narrower fragment from the original table of elevated resolution (effectively extracting a fragment from a fragment). However, in more complex specific implementations, a more intricate transformation can be employed (at the discretion of an engineer skilled in the art and in accordance with the peculiarities of the specific implementation).

Inverted Transformations for Table Expansion

Above, we described methods and specific implementation techniques for transforming counter tables or index tables to reduce the information capacity (including digit capacity, bit depth or radix) of digits or symbols (for use with reduced information capacity on a certain step or steps in the sorting, searching, or other data processing process). We also outlined auxiliary methods for such transformations.

However, the steps of each of the methods described above can be reversed and modified by an engineer skilled in the art to obtain a corresponding "inverse" method. This inverse method, in contrast, allows for the utilization of greater information capacity (including digit capacity, bit depth or radix) of digits or symbols on the current or subsequent steps in the sorting process.

We explicitly state that for each of the methods described above, an engineer skilled in the art can reverse the steps or actions in the method described above (algorithm, transformation process) to derive a corresponding solution (method, algorithm, transformation process) for the inverse transformation. This inverse transformation transforms one element of the original table into multiple elements of the resulting table and enables the use of greater information capacity (including digit capacity, bit depth or radix) of digits or symbols.

In some specific implementations, the reverse transformation may require access to the keys of the original sortable or processed records because, without additional information, it would be impossible to separate the original table element or the extracted information from it to construct a group of elements in the resulting table. This is most typical for implementations using counter tables (but not limited to them). However, in some cases, the implementation of the inverse transformation may still have practical value—for example, when the information required to separate the original table element is already known a priori or can be obtained efficiently.

In other specific implementations, the missing information necessary to divide the original table element into a greater number of elements in the resulting table may be stored directly in the transformed data structure. In such cases, there is no need to access again the sortable or processed records in the implementation of the inverse transformation. This is particularly relevant for some transformations applied to index or hybrid tables. In such cases, it is possible to avoid accessing the keys of the sortable or processed subset of records during the reconstruction of the index or hybrid table.

Taking the above into consideration, we emphasize that by protecting the forward transformations methods described above, we also protect the corresponding inverse transformation methods, which are the obvious inversions of the forward methods described in this patent application.

The implementation of such inverse transformations is trivial for an engineer skilled in the art who has studied the content of this patent application, and they may have practical value in certain applications. Therefore, we believe that our main claims encompass the protection of the inverse methods as well. However, we anticipate the possibility of adding separate claims for the symmetric methods, obtained by reversing the steps of the main methods described in this patent application, if there is a legal need to do so in the future.

Partial Restructuring of Tables and Direct Utilization of Results

We emphasize that in some specific implementations, the methods described above can be used not only for the complete restructuring or processing of an entire counter table, index table, or other data structure but also for processing individual groups of elements within such tables or data structures, at the discretion of an engineer skilled in the art.

In such cases, the resulting element (or transformation result) corresponding to a group of elements in the original table or data structure, or the group of elements (or transformation results) corresponding to an element in the original table or data structure, does not necessarily have to be stored in a separate resulting table or data structure for long-term storage and subsequent use in later stages of sorting, searching, or other information processing.

In some specific implementations, the resulting element(s) (transformation result or results) can be used directly. For example, they can be used at the current sorting stage immediately after computation (construction) without being explicitly stored in long-term memory.

Since groups of elements in the original counter table, index table, or other data structure can be considered as a table or data structure themselves, all the methods described in this patent application can be applied to individual groups of elements in the original table or data structure, which in this case would be considered as a new original table, data structure, or set to which the solutions described in this patent application are applicable.

Normalization of Data in Sorting or Search

There are numerous sorting or searching methods that work well when the keys in the array being sorted or the data structure being searched are uniformly or normally distributed, but they lose performance or other advantages when the key values are unevenly distributed.

To overcome this and similar limitations, we propose normalizing the key values before using them in the sorting or searching algorithm by applying a mathematical function or data processing function to the original key values. This normalization process aims to make the key values more evenly distributed or better suited in some other sense for the efficient operation of the sorting or searching algorithm (for superior performance of the sorting or searching algorithm).

In this section, we describe a new method (algorithm, program, software, system, scheme, circuit, logic block or device that uses said method) for sorting or searching, characterized by the utilization of a normalization of the numeric values of the keys or normalization of the values of information extracted or derived from them before their use in the sorting or searching process, where such normalization is performed by applying a certain function to the numeric values of the keys or to the values of information extracted or derived from them, which modifies such characteristic as the range, statistical or probabilistic distribution, length or form of representation, structure, nature, or pattern of digit or symbol distribution for the normalized values, or modifies a combination of two or more of these characteristics.

In particular, a specific implementation of this method can be performed as follows:

Before using it in a sorting or searching algorithm, the numerical value of a key (refer to the definition of this term at the beginning of the detailed description of the invention) extracted from a certain record, or computed (obtained) using information contained in the record or referenced by it, is first transformed into a new (working) numerical value of the key by applying a certain normalization function to it. Only then is this new (already transformed) value of the key used in the sorting or searching process, according to the original algorithm or method.

Furthermore, we especially emphasize that this normalization method can be applied not only to the complete numeric values of the keys but also to any information extracted or derived from the keys. For instance, it can be applied to the specific digit or symbol values extracted from the key at various stages (rounds, passes or steps) in the sorting or searching process.

In particular, but not exclusively, the transformed (normalized) value can be used to compare this new key value with a similar transformed key value of another record (for example, if the normalization transformation preserves the order of key values, then the transformed value can be used in any sorting or searching method based on key comparisons, even without modifying the comparison operations in it). Alternatively, the transformed value can be used to extract digits or characters located at specific positions from this new (normalized) value of the key (for example, in radix sorting or when accessing a trie or trie-like structure during searching or during index construction). Alternatively, the transformed value can be used to determine the bucket number or interval number based on this new (normalized) value of the key (for example, in bucket or interval sorting, when sorting or searching using trie or certain trie-like structures), and so on.

We also note that the use of normalization may require changes in the comparison methods (or may require modification of the comparison operations) in the original specific implementation to which our proposed normalization is added, depending on the characteristics of the normalization function and the keys, as chosen by an engineer skilled in the art. Additionally, compensation may be required after normalization in case the order of key values changes, which will be discussed below.

As a normalization function, various options can be used, including but not limited to: square root extraction or squaring, power functions, logarithmic functions (refer to the definition of a logarithmic function at the beginning of the detailed description of this invention), as well as combinations of these and other mathematical functions or data processing functions.

Specific implementations that may be of interest are those in which the normalization function converts record keys or parts thereof into other formats or modifies the method of encoding information. For example, the normalization function can convert keys into prefix codes, universal codes, variable-length codes, Gray codes, and so on, or vice versa. Such implementations are particularly interesting in cases where the corresponding transformation reflects the nature of real data in a practical problem and/or can be performed very quickly, for example, if it is supported at the hardware level (and for sorting or searching methods based on comparisons, if it preserves the order of key values or has a dedicated comparison operation or operations).

The normalization function can also calculate the value of a certain hash function from the original key value, and this hash function may even allow collisions if normalization is not used in the final pass of the sorting or searching process, or if an engineer skilled in the art specially considers the presence of collisions. Another class of normalization functions for specific implementations includes functions that change the order of bits, digits, or characters in keys (e.g., by reversing them). However, the use of hash functions and permutation functions should take into account the change in the order of key values introduced by such normalization (see methods for compensating for changes in the order of key values described below).

According to the decision of an engineer skilled in the art, this method can also be implemented in combination with preserving normalized key values in the original records instead of the original key values, or by storing them in additional memory or in additional fields (in addition to the original keys).

In the majority of practically important specific implementations, the normalization function should be chosen in such a way that it is computationally efficient and corresponds to the nature of the real data being processed when normalization is used.

In some implementations, at the discretion of an engineer skilled in the art, the normalization function may also be required to preserve the order of keys (with respect to a certain operation or set of comparison operations or other operations). In this case, we refer to it as an order-preserving normalization function because it must maintain the order defined for the original set of numerical values of the keys with respect to a particular operation (such as comparison operation) or set of operations.

However, the condition of preserving the order is not strictly necessary (in general) for the application of this invention because even if this condition is violated, the sorting or searching algorithm can be modified (supplemented) to compensate for the order violation caused by normalization.

For example, compensation can be achieved by adding an additional pass (or series of passes) over the data after they are sorted based on normalized key values. Alternatively, compensation can be achieved by redistributing (permuting) the records before performing the search. In other specific implementations, a normalization function that violates the order can be selected in such a way that the order violation introduced by it is compensated by another order violation inherent in the sorting or searching method. Conversely, using a normalization that violates the order can help compensate for the order violation that is inherent in the used sorting or searching algorithm (method). The order violation caused by normalization can also be compensated by a specific access or indexing order or rules for a sorted and/or unsorted set of records. In some specific implementations based on key comparisons, it can also be compensated by replacing the comparison operations with operations adapted to a different order, to a different representation, or to the transformed form of the keys.

Thus, above we have additionally described implementation options for the new method described at the beginning of this section, in which the normalization function violates the order of key values, but this violation compensates for another order violation embedded in the algorithm (method) of sorting or searching. Alternatively, this introduced order violation is compensated later through additional operations after sorting or before searching. Or it is compensated by a specific access or indexing order (or rules) for a sorted or unsorted set of records. Or it is compensated by replacing the comparison operation.

Sometimes, violating the order of key values during normalization is irrelevant and permissible even without compensation (and without replacing comparison operations in specific comparison-based implementations).

In particular, the use of hash functions and other order-violating transformations as normalization functions may be of interest in cases where sorting is performed to implement set operations (such as comparison, union, or intersection of sets)—because in these tasks, the order of sorted keys is not important; it only needs to be the same for all sets involved in a single set operation. In this case, normalization using a hash function may disrupt a certain structure inherent in the numerical key values that otherwise hinders efficient sorting using a particular method. Alternatively, such normalization may replace long keys with short hash values at initial stages (rounds, passes, steps) the sorting process, which speeds up the sorting process by forming shorter buckets and/or by forming it more quickly and/or reducing the cost of comparisons (such transformations are particularly effective if there is an opportunity to preserve normalized values for reuse).

Logarithmic Sorting

In this section, we describe a new method (algorithm, program, software, system, scheme, circuit, logic block or device that uses said method) for sorting that is characterized by utilizing the computation of a logarithmic function, a function for determining the value or extracting the biased or unbiased value of an exponent, a function for determining the position or location of the leading or trailing bit, digit, or symbol in a representation or notation of the numeric value, a function for counting the number of significant bits, digits, or symbols in the representation or notation of the numeric value, a function for determining the length of the representation or notation of the numeric value, a function for counting the number of leading or trailing bits, digits, or symbols equal to a certain value in the representation or notation of the numeric value, a function for reinterpreting the data type of an argument, a function for counting the number of specific digits or symbols in the representation or notation of the numeric value, or an any other function that is analogous or derived from at least one of the functions listed here, which applied to a record key or to some value derived from or obtained using information taken from a record or record key for determining the value of a digit or symbol in a numerical value of the key, or for selecting an element of a counter table or an index table, or for selecting or determining a bucket number, interval number, or bin number corresponding to a given record or record key.

In particular, a specific implementation of this method can be performed as follows:

To determine the value of a digit or character in the numerical value of the key, or to determine the number (or index, identifier, associative key, selector, address) of an element in a counter table or an index table, or to otherwise determine or select one of the elements in a counter table or an index table, or to determine the bucket number, interval number, or bin number corresponding to a given key, a specific implementation of this method, based on information contained in the analyzed key, calculates the value of a certain logarithmic function (in a broad sense, as described in the definition of the term "logarithmic function" at the beginning of the detailed description of the invention) from the numerical value of the key, if necessary interpreting this value as a number written or represented in a certain numeral system and/or in certain specific notation, or as a string represented using a certain alphabet or character set.

In particular, the resulting value of the logarithmic function can be:

a) An exact, approximate, or rounded value of the logarithm with any base of the numerical value of the key value (e.g., the value of the binary, decimal, or natural logarithm of the numerical value of the key).

b) The count of leading or trailing digits or symbols equal to a specific value (or set of values) in the representation (or in notation) of the numerical value of the key, possibly taking into account the sign of the numerical value of the key (in particular, it could be the count of leading or trailing bits that equal to zero or one).

c) The position number where the leading or terminating bit equal to zero or one is located; or the position where the leading or terminating digit or symbol in the representation (or in notation) of the numerical value of the key is located, possibly taking into account the sign of the numerical value of the key.

d) The length of the notation or representation of the numerical value of the key (if it is represented as a number written in a specific numeral system and/or notation).

e) The count of specific bit, digit, or symbol values in the representation of the numerical value of the key.

f) The biased or unbiased value of the exponent of the numerical value of the key (both computed or extracted from the machine representation).

g) The value of the key itself, having a certain data type (e.g., an integer value), artificially interpreted (i.e., not adhering to the declared or actual data type of this original value) as a number written or represented in exponential notation (including specific forms of number representation or notations such as IEEE floating-point numbers, universal numbers, and posits), or vice versa.

h) The result of transforming the numerical value of the key or some part of it into a specific exponential notation.

i) The result of any other function that counts specific bits, digits, or characters during its computation, determines the position of a certain bit, digit, or character in the representation (or notation) of the numerical value, or determines the biased or unbiased value of the exponent of some number.

j) The result of an arbitrary transformation of one or more quantities obtained using methods (a) . . . (i) listed above.

We emphasize that, at the choice of an engineer skilled in the art, the logarithmic function can be applied to either the entire numerical value of the key (as described above) or only to a part of it, allowing, in particular, the use of this method at different steps or stages in the sorting process (including recursive application of this method to different steps or stages in the sorting process). In particular, but not exclusively, the logarithmic function can be applied to the prefix or suffix of the numerical value of its argument, to a part of such a value selected using a mask or otherwise.

Furthermore, the computed value of the logarithmic function is used as the value of a digit or symbol, or as the number (or index, identifier, associative key, or selector) for indexing, addressing, or selecting a specific element in a counter table or an index table, or as the bucket number, interval number, or bin number corresponding to the given key—as determined by an engineer skilled in the art for their specific implementation.

We emphasize that, like other methods described in this patent application, this method can be applied at all stages or steps of the sorting process, as well as at individual stages or steps in the sorting process. In this regard, the numerical value of the key to which the logarithmic function is applied may differ at various stages or steps of the sorting process.

For example, if the aforementioned method is used in the implementation of one of the steps of radix sorting, in this case, the counter table or index table at given step will be constructed not based on the values of the digit or symbol in a specific position in the numerical representation of the record keys (as in the classical algorithm of this method), but based on the values of a logarithmic function (in a broad sense, as described above) applied to the entire numerical value of the key, to the its prefix or suffix, or to some part of such a value. However, at the same time, the result of the computation of this logarithmic function can be considered and used in the same way as the value of a digit or symbol—for the purpose of selecting one of the table elements (or bucket) in the process of constructing the counter table or index table, or, for example, later, during the record reallocation phase, to index or access those tables.

Radix sorting has a known drawback associated with the inability to quickly reach the significant part of the key if the keys of the sorted records have long common prefixes (when sorting in Most Significant Digit (MSD) order, i.e., from the most significant digit or symbol to the least significant one) or suffixes (when sorting in Least Significant Digit (LSD) order, i.e., from the least significant digit or symbol to the most significant one).

This drawback significantly slows down radix sorting, especially when the lengths (or number of digits or characters, information capacity, digital capacity, bit depth or radix) of the keys is relatively large numbers, but their actual values are relatively small (when sorting in MSD order) or, conversely, very large (when processing in LSD order).

In such cases, the classical radix sorting performs many inefficient passes over the data, where there is actually no significant movement of records between the areas occupied by bins or buckets. This is also characteristic of virtually all variations of bucket sort or interval sort known to the authors of this patent application.

An intermediate solution to address this problem involves the utilization of adaptive algorithms such as spread sort, which are capable of eliminating common prefixes. However, these approaches, while effective in reducing the common prefix or suffix, prove unsuccessful if even a small subset of keys within certain records contains non-zero values of digits or symbols different from the prevalent leading prefix or suffix. This presence of non-zero or uncharacteristic values prevents the elimination of the dominant common prefix or suffix, which is prevalent among the vast majority of other records.

The logarithmic sorting described above allows overcoming these drawbacks, as it can reach the very last (or first) digits of a key in a single pass, even in the presence of a subset of elements in the sorted set with differing prefixes (with MSD sorting order) or suffixes (with LSD sorting order).

We also note that that upon completing a pass over a subset of records to be sorted in logarithmic sorting (which refers to the completion of a full stage, round, pass, or step in the sorting process, including any intermediate steps or stages such as record relocation), the described method can be reapplied. Furthermore, when using the MSD (Most Significant Digit) order (direction), the method can be recursively applied to all, or to a selected subset of bins or buckets that formed on the current round, pass, stage, or step of the sorting process. The decision of whether to apply the method to all or a subset of bins or buckets is determined by the engineer skilled in the art.

In general, logarithmic sorting can be applied to individual bins or buckets both after the completion or before the completion of the rearrangement of all records at the current stage of the sorting process. Applying the sorting method prior to the full completion of record rearrangement at the current stage is possible when the bin or bucket is already formed and full, or based on the other specific conditions, as determined by an engineer skilled in the art.

In this case, an engineer skilled in the art can determine the position offset from which the extraction of a new "virtual" key value or the new digit or symbol (representing the argument of the logarithmic function) will be performed on the new pass (round, stage, or step of the sorting process). This offset represents the position from which a new portion of the key data is extracted to be passed as input to the logarithmic function on the new pass (round, stage, or full step) of sorting. The extraction of the key portion can be implemented using relatively straightforward operations (e.g., masking and shifting for binary integer keys) that the engineer skilled in the art selects, taking into account the specific implementation characteristics (such as the nature of the chosen logarithmic function, the type and representation of key data, etc.).

Specifically, when using binary number representation and employing the binary logarithm as the logarithmic function (with the result truncated to an integer), the position shift value in the logarithmic implementation of radix sorting can be calculated by subtracting the logarithmic function value for the corresponding bin or bucket on the just completed (previous) step of the logarithmic sorting method from the width of the unprocessed portion of the key (from the previous full step, pass, round, or stage of the sorting process). In such cases, there is also the possibility to skip an additional bit since all values in a bin or bucket start with this leading bit with the same value for all records in the bucket (i.e., the position offset can be increased by one). And when using the function for counting leading zeros (instead of the truncated binary logarithm), the shift value will be equal to the number of leading zeros for the given bin (and, possibly, plus one bit, as all the number values in that bin or bucket start with a leading one). The exact expression for calculating the position offset when transitioning to the next digit (when transitioning to the next pass, round, stage, or full step in the logarithmic sorting method) is determined by the engineer skilled in the art, considering the nature of the chosen logarithmic function and data representation.

Thus, logarithmic sorting can be a complete solution for the task of sorting a set of records, rather than just a partial or intermediate solution for performing a single or the initial pass over the set of records.

In a sense, the logarithmic sorting described above represents a new class of sorting methods, although it can also be considered as a very specific and enhanced variation of radix, bucket, or interval sorting.

Logarithmic sorting can also be seen as an important special case of applying data normalization in the sorting process, as described above in the section "Normalization of Data in Sorting or Search" (if we consider the computation of the logarithmic function, which is the basis of this section as a normalizing transformation).

Logarithmic Search and Indexing

Some sorting methods that utilize binary search or determination of the index of a pivot element, as well as the binary search method itself, or, more generally, all search methods in a sorted set based on its bisection or partitioning into intervals (including binary search, Fibonacci search, interpolation search) suffer from highly uneven distributions of key values in real data.

These methods work well in identifying the pivot element and/or quickly locating the desired element when the data is uniformly or normally distributed. However, in cases of strong non-uniformity or asymmetry in the distribution of record key values, these methods either divide the array or processed subset of records into disproportionate parts (in the case of sorting), or they perform a large number of steps that do not significantly narrow down the search boundary before reaching the boundaries of the narrow interval in the sorted array or set of records where the desired record lies (in the case of searching).

In this section, we describe a new method (algorithm, program, software, system, scheme, circuit, logic block or device that uses said method) that is designed to determining the position of the pivot element based on the key value, or to search for an element using key comparisons, or to determine the position or select an element when accessing a data structure (particularly an array) during sorting or searching, or to construct a data structure used as an index during sorting or searching; which is characterized by utilizing the computation of a logarithmic function, a function for determining the value or extracting the biased or unbiased value of an exponent, a function for determining the position or location of the leading or trailing bit, digit, or symbol in a representation or notation of the numeric value, a function for counting the number of significant bits, digits, or symbols in the representation or notation of the numeric value, a function for determining the length of the representation or notation of the numeric value, a function for counting the number of leading or trailing bits, digits, or symbols equal to a certain value in the representation or notation of the numeric value, a function for reinterpreting the data type of an argument, a function for counting the number of specific digits or symbols in the representation or notation of the numeric value, or an any other function that is analogous or derived from at least one of the functions listed here; provided that the result of such a function is used in this method for comparison(s) instead of the original key value, or is used to determine the position of the pivot element, or to select a specific element in a data structure, or to determine the position or value of a digit or symbol that is subsequently used for accessing a data structure.

In the presence of significant non-uniformity or asymmetry in the distribution of key values in real data, utilizing the logarithmic function of the key value and/or the logarithmic function of the boundary value (instead of directly using the original key value and/or the boundary value) significantly enhances the likelihood of dividing the array, working interval, or set into approximately equal parts during sorting or searching, and/or allows for faster narrowing of the boundaries of the examined interval during the search for the desired record.

In particular, a specific implementation of this method can be performed as follows:

Instead of dividing the set of sorted elements according to a fixed scheme (e.g., halving as in the classic quicksort algorithm or binary search, or dividing into parts corresponding to Fibonacci numbers as in Fibonacci search, etc.); or instead of directly using the original value of the desired element's key and/or the original value(s) of the key(s) corresponding to the boundary value(s) (e.g., search interval boundaries as in interpolation search); or instead of directly comparing the extracted key value with the value of the desired key and/or with the keys corresponding to the search boundaries; a specific implementation of this method, based on information contained in the analyzed key, calculates the value of a certain logarithmic function (in a broad sense, as described in the definition of the term "logarithmic function" at the beginning of the detailed description of the invention) from the numerical value of the key, if necessary interpreting this value as a number written or represented in a certain numeral system and/or in certain specific notation, or as a string represented using a certain alphabet or character set.

In particular, the resulting value of the logarithmic function can be:

a) An exact, approximate, or rounded value of the logarithm with any base of the numerical value of the key value (e.g., the value of the binary, decimal, or natural logarithm of the numerical value of the key).
b) The count of leading or trailing digits or symbols equal to a specific value (or set of values) in the representation (or in notation) of the numerical value of the key, possibly taking into account the sign of the numerical value of the key (in particular, it could be the count of leading or trailing bits that equal to zero or one).
c) The position number where the leading or terminating bit equal to zero or one is located; or the position where the leading or terminating digit or symbol in the representation (or in notation) of the numerical value of the key is located, possibly taking into account the sign of the numerical value of the key.
d) The length of the notation or representation of the numerical value of the key (if it is represented as a number written in a specific numeral system and/or notation).
e) The count of specific bit, digit, or symbol values in the representation of the numerical value of the key.
f) The biased or unbiased value of the exponent of the numerical value of the key (both computed or extracted from the machine representation).
g) The value of the key itself, having a certain data type (e.g., an integer value), artificially interpreted (i.e., not adhering to the declared or actual data type of this original value) a number written or represented in exponential notation (including specific forms of number representation or notations such as IEEE floating-point numbers, universal numbers, and posits), or vice versa.
h) The result of transforming the numerical value of the key or some part of it into a specific exponential notation.
i) The result of any other function that counts specific bits, digits, or characters during its computation, determines the position of a certain bit, digit, or character in the representation (or notation) of the numerical value, or determines the biased or unbiased value of the exponent of some number.
j) The result of an arbitrary transformation of one or more quantities obtained using methods (a) . . . (i) listed above.

Furthermore, the computed value of the logarithmic function is used in the following ways:

a) As the number (or index, identifier, associative key, or selector) for indexing, addressing, or selecting a specific element in a counter table or index table presented in direct or cumulative form (including this applies both to the pre-built table and to the process of its construction).
b) As the value of a digit or symbol for indexing, addressing, or selecting a specific element in a data structure (e.g., in a trie or trie-like structure), or in a counter table or index table if digit or symbol values are used to access their elements (in particular, if the value of the logarithmic function is interpreted in this specific implementation as a digit or symbol of a virtual key, rather than the value of an abstract number (or identifier) of an element in the table).
c) For comparison with the key of another record in the process of searching or sorting, or with the key corresponding to the boundary element of a subset or interval in a search or sorting algorithm or process, where the key of another record or the key value corresponding to the boundary element or interval is also previously transformed (preprocessed) (either in advance or directly during the operation of the main part of the corresponding algorithm) by applying the logarithmic function to it,
d) For calculating the position (index) of the next probe (e.g., in interpolation search) or for calculating the position (index) of the pivot element during sorting. At the discretion of an engineer skilled in the art, such the calculation of the position (index) for the next probe or the position (index) of the pivot element can also be performed with consideration of the key(s) corresponding to the current search interval or to the boundary element(s) of the sorted subset of records that are previously transformed (preprocessed) by applying the logarithmic function to them.
e) As a position, index, offset or shift value used directly or after some additional transformation and possibly together with other quantities to compute an adjustment that refines the position (e.g., index or number of an element) of the pivot element, or the position for the next probe, or the position for the next access to a data structure during sorting or searching.

We also specifically note that the boundary values to which this method is applied can be not only the values of real keys of specific records represented in real data but also synthetic values, at the discretion of the engineer skilled in the art.

We emphasize that at the discretion of the engineer skilled in the art, the logarithmic function can be applied to either the full numerical value of the key or only to a certain part of this value, allowing, in particular, the usage of this method at different steps or stages in the sorting, searching, or indexing process (including recursive implementations that utilize this method). In particular, but not exclusively, the logarithmic function can be applied to the prefix or suffix of the numerical value of its argument, to a part of such a value selected using a mask or otherwise.

In short and simplified summary, the logarithmic function value can be used as the new numeric value of the key or the new boundary value. It can also be employed for comparisons, bucket, or bin selection, and may be used in other decision-making steps within the sorting or searching process.

In particular, in one of possible specific implementations of a search (utilizing the method described here) based on the dissection of the ordered set of records, where the elements of such a set are accessible by indices (for example, when the ordered set of records is sorted by the key and stored as an array or vector with elements accessible by indices), a counter table can be pre-built for the sorted set of records. In this case, the counter table may contain the counts of records corresponding to a specific value of the logarithmic function applied to the record's key value. Furthermore, this counter table can be transformed into cumulative form or directly constructed in the cumulative form, as chosen by an engineer skilled in the art.

After this preparatory stage, the computed value of the logarithmic function from the desired key value can be used as an index to access such a cumulative counter table. In this case, a pair of neighboring elements in the table (the element corresponding to the index computed as the value of the logarithmic function from the desired key, and the next element, possibly with the addition of a real or virtual element at the end of the counter table containing the total number of records) will respectively contain the lower and upper (typically non-inclusive or increased by one) initial index values for searching the desired record (i.e., the initial and final index values of the elements in the set, between which the desired record lies if it is present in the set).

Subsequently, these lower and upper boundaries for the index can be used, for example, as initial values for the classic binary search algorithm or for another search algorithm based on bisection of the ordered set.

Due to the use of the logarithmic function during the construction of the cumulative counter table, the search will terminate faster in cases of highly uneven or asymmetric distributions of record keys. Thanks to the significant reduction of the search interval (the distance between the initial index values) in the very first step of the algorithm, the total number of steps in the binary search will be much smaller compared to using a regular binary search with initial boundaries corresponding to the full array.

If the corresponding additional tables are pre-built, at the discretion of the engineer skilled in the art, this technique can be applied not only for the first step of the search but also for other step(s) in the search algorithm, including it can be applied multiple times or recursively. In this case, it may be necessary to compute the logarithmic function of various parts of the key (for example, applying the function to key parts extracted using a mask that shifts on each subsequent search iteration as the search progresses along the key).

A Dictionary of Prefixes or Suffixes

Usually, when we refer to a counter table or an index table in existing implementations of radix and similar sorting algorithms, we assume that such a table is built for digits or symbols with a fixed radix.

In this case, we face the challenge of selecting the optimal radix (or information capacity) for the digits or symbols. If it is very small, we will have compact auxiliary tables, but each pass through the data will divide the records into a very small number of buckets. Progressing through the digits of the key value will be very slow. On the other hand, if we choose a larger radix for the digits or symbols, we will have very large auxiliary tables that may not fit in the primary cache memory of the computing system, which will also reduce performance. Additionally, we will have a large number of buckets, and moving records between them will lead to significant competition for the main cache memory of the computing system, which will also greatly reduce performance.

We can find a balance, including through the methods described in this patent application. However, for some key distributions encountered in practice, any balance expressed as a fixed number (even just for this sorting step) will be a compromise—many keys will have repeated prefixes that differ beyond the chosen "optimal" radix (beyond the chosen digit capacity or information capacity).

By selecting a radix (or digit capacity, information capacity), we make the number of buckets acceptable, but they will have significant disparities in length. Effectively, we will observe a scenario where records with frequently repeating but distinct long prefixes fall into the same bucket, and their data goes into the same cell (element) of the counter table or index table. This is because the length of their common prefix is greater than or equal to the chosen fixed radix (or digit capacity, information capacity) of digits or symbols.

In such cases, during the main phase of record movement in given pass, we will be unable to separate records within the corresponding long buckets. Instead, we will spend computational resources grouping such records within the boundaries assigned to these long buckets. Then, we will need at least one more pass through the data to separate the records located within these long buckets.

To address this problem, we propose using variable-length digits or symbols and associating them with elements of the main or auxiliary counter table or index table.

Even in cases where we have a large number of records with long matching prefixes (or suffixes in the case of LSD sorting order), where the differences start beyond the optimal radix (or digit capacity, information capacity) selected for a fixed length of the digit or symbol, this method allows us to distribute such records into different buckets within a single pass. It also allows for shifting in each of them by a larger magnitude than the radix (or digit capacity, information capacity) of a digit or symbol that would be selected using a fixed length of the digits or symbols.

We also describe a method that allows us to maintain the sizes of tables for variable-length digits or symbols at a level where the number of active buckets remains acceptable in terms of the workload during record movement (relocation between buckets) and/or in terms of the competition for the cache memory of the computing system.

We emphasize that this technique can be used not only in the first pass of sorting or searching (when working with prefixes or suffixes of full numerical values of the keys) but also in intermediate passes (steps, iterations) of sorting or searching when the prefixes or suffixes are counted from the point (position) within the numerical key value to which the key was already processed in the previous pass (full step, iteration) of sorting or searching.

We also emphasize that in the definitions section at the beginning of this patent application, we have already indicated that digits or symbols can have variable and even different radixes (different digit capacities or information capacities). Therefore, the tables formed as described in this section can be considered a special case of organizing counter tables or index tables.

Thus, this section essentially describes one of possible techniques for implementing counter tables or index tables for digits or symbols with variable radix (digit capacity) or information capacity, rather than an entirely new entity. Consequently, other methods related to counter tables or index tables, including those described in this patent application, may be applicable to such tables (with appropriate adaptation to account for the specifics of this particular specific implementation, which should be done by an engineer skilled in the art, considering both the information provided here and the decisions made by them regarding the implementation details that fall beyond the scope of this patent application).

Thus, in this section, we describe a new method (algorithm, program, software, system, scheme, circuit, logic block or device that uses said method) for sorting, or searching within a fully or partially sorted set of objects that is characterized by the utilization of a dictionary or table of prefixes or suffixes, a counter table, an index table, or a histogram constructed for the digits or symbols, or for their corresponding prefixes or suffixes that may have different lengths, different radixes, different digit capacity, different bit depth, or different information capacity.

In other words, this new method provides access to a counter or index table, dictionary or table of prefixes or suffixes, or histogram whose elements correspond to frequently used prefixes or suffixes of string or numerical values of the keys, without necessarily having the same length (or same radix, bit depth, digit capacity, or information capacity) for such prefixes or suffixes. Such a table can replace (or may be complement) a counter table or index table used in traditional implementations. It serves as a functional replacement for the table that would otherwise have been constructed for digits or symbols of fixed radix (or fixed bit depth, digit capacity, or information capacity), or for prefixes or suffixes of fixed length. In addition, this method allows for the construction of prefix or suffix tables themselves, accommodating variable length, radix, bit depth, digit capacity, or information capacity of digits or symbols.

We note that although we describe applications for sorting, this new method can also be used in information retrieval (searching) implementations and other data processing processes, as chosen by an engineer skilled in the art.

Since, according to our terminology presented at the beginning of the detailed description of the invention, string values are considered a specific case of the more general concept of "numerical value of the key", when we refer to prefixes and suffixes of numerical key values (or simply prefixes and suffixes of keys) in this section, we also include prefixes and suffixes of string values.

The methods described in this section allow for quickly skipping common prefixes or suffixes in string or numerical values of the keys during sorting, searching, or other data processing processes, by grouping records with keys that share a common prefix or suffix into separate buckets.

Furthermore, a method will be described below that allows limiting the number of buckets controlled by a counter table or an index table constructed for digits or symbols of varying (variable) radix (bit depth, digit capacity, or information capacity). This is done to avoid uncontrolled memory consumption in cases where key values do not have long matching prefixes or suffixes, but we still need to store the encountered prefixes or suffixes during table construction in anticipation of future repetitions. This method is also useful when dealing with a large number of repeating prefixes or suffixes that differ from each other.

In particular, specific implementations of these methods can be performed as follows:

Prefixes or suffixes of strings can be considered a special case of digits or symbols in terms of their subsequent use in radix-based sorting and similar sorting, searching, and data processing methods that utilize counter tables or index tables.

Therefore, extracting a prefix or suffix from a string or numerical key value (specifically starting from a specific position or from a set of positions within the numerical key value) can be seen as extracting the next "virtual" digit or symbol from the key. It is worth noting that the length of the extracted prefix or suffix may vary for different key values.

If the computing device or software environment does not provide ready-made operations for extracting prefixes or suffixes from numerical key values, or if the standard operations do not satisfy the engineer skilled in the art, then in a specific implementation, the extraction of the digit or symbol corresponding to the prefix or suffix can be implemented, for example, by reading a large portion of data from the key value (potentially the entire key value) and subsequently truncating, shifting, and/or masking unnecessary parts of the read information (e.g., by masking extra bits or digits located outside the prefix or suffix, possibly in combination with shift operations and/or other transformations, including transformations dependent on the sign of the numerical key value). The engineer skilled in the art makes this implementation choice.

In other specific implementations, the process of extracting the "virtual" digit or symbol representing a prefix or suffix can be realized by sequentially reading (extracting) individual small portions of information (such as bits, bytes, digits, individual elementary digits, or symbols) from the string or numerical key value, with such process of reading stopping at a certain point according to the logic chosen by the engineer skilled in the art.

For instance, the process of sequential reading of a prefix or suffix can be terminated by employing the logic derived from constructing a counter table or an index table, or by utilizing the logic of key searching. The key, which represents the value of the prefix or suffix, can be searched both within a pre-constructed table (while using the constructed table), or during the construction process. This can be implemented as described below (when discussing specific implementation options).

The value of the prefix or suffix, or in other words, the value of the "virtual" digit or symbol for a given step (pass, round, or stage) in the sorting process (if a specific sorting implementation uses the methods described here) does not necessarily need to be explicitly represented as a complete value of the prefix or suffix. As mentioned above, it can be extracted in small portions, and it can even be done without storing the complete value as a separate entity that includes all the extracted information (e.g., all the bits, bytes, digits, elementary digits, or symbols) that make up the complete value of the prefix or suffix.

If the value of the prefix or suffix is fully extracted, it can be used as a digit or symbol in the usual way (for the corresponding data structures)—for constructing a counter table or an index table and/or for accessing it (and may be other working tables).

The counter table or index table, which in this section we also refer to as a dictionary of prefixes or suffixes, can be implemented using an associative data structure, a hash table, a tree or tree-like structure (such as a prefix tree or trie), etc. as chosen by the engineer skilled in the art. Access to the elements of such a data structure is performed using an index, selector, or some associative key, where the extracted value of the prefix or suffix is used as the value of such index, selector or key.

In specific implementations, it is also possible to use a regular linear array or vector to implement tables of prefixes or suffixes (especially in combination with table transformation methods that will be discussed later in this section). However, such usage is not always practical, especially due to significant memory consumption (and for this reason, it may be entirely unacceptable for long prefixes or suffixes).

An alternative implementation approach is possible where the extracted value of the digit or symbol is used as a selector (an associative key) for a data structure that allows searching not only for elements with an exact match to the selector (key) but also for elements with a partially matching selector (key)—where the prefix or suffix matches (or best matches) the desired value. In such implementations, the process of extracting (or retrieving) the digit or symbol is effectively combined with the process of accessing an element in the counter table or index table since the search in such a data structure (used to implement the counter table or index table) determines the exact value of the prefix or suffix's length or information capacity with which this particular implementation will proceed. Therefore, the exact length (information capacity) of the "virtual" value of the digit or symbol is determined no earlier than the completion of the search in the data structure implementing the counter table or index table.

If the value of the prefix or suffix is not read entirely but extracted incrementally as small portions of information (such as bits, bytes, digits, elementary digits, or symbols, together forming the complete value of the prefix or suffix) as described earlier, the process of implicitly extracting the value of the prefix or suffix is combined with the process of searching in the counter table or index table. In such cases, the counter table or index table is usually organized as an associative data structure, a tree or tree-like data structure, a hash table, a prefix tree, trie or trie-like structure, two-level or multi-level hierarchically organized structures (table, vector or array), in the form of a PATRICIA tree, a suffix or prefix tree, a dictionary for one of the methods of the Lempel-Ziv family with modifications for use with this method, or another data structure for digital search or organizing dictionaries, as chosen by the engineer skilled in the art.

In this section, we generically refer to the data structure used to implement the counter table or index table as a dictionary of prefixes or suffixes.

During the search in the counter table or index table with incremental information extraction, the process stops either when the extracted portion of the prefix or suffix found so far is found in the dictionary or when further search attempts in the dictionary (using the next portion of information) fail, as determined by the engineer skilled in the art and depending on the requirements of the specific implementation.

By the choice of the engineer skilled in the art, the process of adding a new prefix or suffix (i.e., an element corresponding to a new value of the "virtual" digit or symbol) to the dictionary may involve adding a new element or node to the internal data structures of the dictionary. Such a node would correspond to an unmatched portion of information or an unmatched prefix or suffix. It may contain the key value, a reference to the key value, or a reference to some part of the string or numerical key value, as determined by the engineer skilled in the art and considering the specific implementation details of the dictionary and the corresponding information addition methods.

We deliberately do not specify all the specific techniques for constructing the dictionary and organizing it at the level of discussing the details of specific implementations, leaving these details beyond the scope of this invention. Various efficient techniques for constructing dictionaries and organizing them are chosen by an engineer skilled in the art and can be the subject of separate innovations. An engineer skilled in the art can also employ well-known data structures and procedures for working with such data structures.

The essence of this invention lies in the actual usage of prefixes or suffixes extracted from numerical key values as values of "virtual" digits or symbols, allowing the selection of an element in the counter table or index table and thus enabling the use of variable-length prefixes and suffixes (corresponding to the digits or symbols) in algorithms that utilize such tables, for example, in advanced sorting methods based on the logic similar to classical radix sort.

In doing so, we highlight the semantic similarity of the counter table or index table, constructed for such implementations, to the structures used to implement dictionaries in other information processing methods and demonstrate how the dictionary can be used as a counter table or index table, if we extend the concept of "digit" or "symbol" to allow them to have variable length, radix, bit depth, digit capacity or information capacity.

To efficiently sort using the methods described in this section, it may also be necessary to control the size of the dictionary or, in more complex implementations, the number and composition (e.g., their cumulative length) of active buckets corresponding to elements in the counter table or index table constructed using the methods described here. Alternatively, other criteria and characteristics that affect the workload and/or the cache memory load of the computing system may need to be considered.

For these purposes, the methods described in this patent application, particularly in the sections "Determining Optimal Information Capacity and Termination Criterion for Downsampling Algorithm" and "Fast Evaluation of Optimization Criteria or Characteristics".

Furthermore, we describe here a method (algorithm, program, software, system, scheme, circuit, logic block or device that uses said method) for sorting, or searching within a fully or partially sorted set of objects that is characterized by the utilization of a stage or process of constructing a dictionary or table of prefixes or suffixes, a counter table or an index table, or histogram, which elements correspond to prefixes or suffixes of varying lengths, or to digits or symbols with different radix, bit depth, digit capacity or information capacity; and said method is also characterized by the calculation or evaluation of a certain optimization criterion such as workload estimation, estimation of the cache memory load of a computing system, estimation of the overall size or the number of elements of the data structure corresponding to the dictionary or table of prefixes or suffixes, counter table or index table, or histogram, or any other optimization criterion; wherein computed or evaluated value of said optimization criterion or a logical condition involving it is then employed to limit the overall size or number of elements in the dictionary or table of prefixes or suffixes, counter table or index table, or histogram, during process of its construction, and this is achieved by replacing or removing one or more elements while or instead of adding a new element to such the dictionary, table or histogram, or by refraining from adding a new element altogether.

That said, the specific implementation of the function or functions for evaluation of optimization criterion, the logic used in selecting the action (deleting an element or elements while or instead of adding a new one, replacing an element with a new one, or not adding an new element), as well as the specific organization of the dictionary or table of prefixes or suffixes, the counter or index table, or histogram, and the implementation details of the element addition, replacement and/or removal processes are determined by the engineer skilled in the art.

The essence of the aforementioned invention lies not in the specific organization of the dictionary, histogram, or table but in the idea of using a function or procedure to calculate or evaluate at least one of the listed optimization criterions, and subsequently selecting an action before or instead of adding a new element to the dictionary or table based on that calculation or evaluation. The available actions include adding the new element, replacing element, rejecting its addition, or adding the new element while removing at least one existing element. This allows maintaining specific (or controllable) dictionary or table sizes and/or maintaining a specific (or controllable) number of elements it them and/or maintaining a specific (or controllable) number of buckets without violating certain optimization criteria (defined by the engineer skilled in the art), including, among others, estimation of the workload or cache memory load of the computing system.

In particular, the solutions described in the sections "Determining Optimal Information Capacity and Termination Criterion for Downsampling Algorithm" and "Fast Evaluation of Optimization Criteria or Characteristics" can be used to evaluate criteria during the element addition process. Furthermore, we note that the evaluation methods and optimization criteria described in these sections can also be used to decide which specific element or set of elements should be removed from the dictionary or table during the addition of a new element.

The specific implementation of the element selection process for removal from the dictionary or table is determined by the engineer skilled in the art. However, we recommend removing elements corresponding to either short buckets or to buckets that contribute the least to the optimization criteria evaluation (such as the estimated workload or cache memory load of the computing system).

We also note that removing an element may require modifying other elements in the same dictionary or table to transfer the semantic load previously associated with the removed element. For example, removing an element controlling a bucket implies that the records from that bucket must be transferred to another bucket corresponding to a higher "granularity cell". This can involve either explicitly moving the records to another bucket (for certain index table organizations, for example) or modifying the values in another table element (for counter tables) to account for the logically transferred records. The structure of the table reflecting the bucket division must be modified accordingly to ensure that another element controls the records previously assigned to the removed element. An engineer skilled in the art should consider this aspect when implementing the element removal process.

Furthermore, we describe another class of possible specific implementations.

If the counter table or index table is constructed for higher radix, bit depth, digit capacity, or information capacity of the digits or symbols, it can be transformed into a table for variable radix, bit depth, digit capacity, or information capacity of the digits or symbols (in a prefix or suffix table) after construction.

In particular, the method for constructing high-resolution tables with subsequent downsampling (described in the section "Building Tables with Enhanced Resolution (Oversampling)") and the workload or cache memory load estimation methods (described in the sections "Determining Optimal Information Capacity and Termination Criterion for Downsampling Algorithm" and "Fast Evaluation of Optimization Criteria or Characteristics"), can be modified to reduce the main digit capacity, bit depth, radix or information capacity of the counter table or index table to an acceptable level while preserving high resolution (high digit capacity, bit depth, radix or information capacity) in the regions corresponding to long buckets.

These methods can involve special processing for buckets corresponding to frequently repeated prefixes or suffixes in key values. In this processing, the digit capacity (bit depth or radix) or information capacity corresponding to the original counter table or index table is reduced by a smaller amount in the areas where "long" buckets are present compared to other parts of the table where such buckets are not present, or it will be left unchanged altogether for "long" buckets.

The logic of selecting the areas of the table for such processing and the specific technique for implementing partial reduction of digit capacity (bit depth or radix) or reduction of information capacity in these areas of the table will be determined by an engineer skilled in the art, in accordance with the characteristics and objectives of a specific implementation. Additionally, they may utilize other solutions described in this patent application for this purpose.

In these implementations, the original table is effectively divided into zones (or layers) or parts corresponding to different resolution of the digits or symbols, which may overlap. For example, the table may consist of a zone (layer) corresponding to elements with reduced resolution (reduced information capacity), which can be logically considered a separate counter table or index table. At the same time, in the extended part or parts of the same table, or in separate memory areas where the relevant information is transferred, or in separate additional table or tables, there will be zones (layers, at least one zone or layer) corresponding to elements with higher digit or symbol resolution (higher information capacity).

A marker can be added to denote those elements in the "reduced" parts zones, layers) of the table for which the higher level of detail is also preserved, i.e., the elements of table corresponding to higher resolution are also retained. For example, the elements in the initial reduced part of the counter table, corresponding to parts of the table where higher resolution is preserved, can contain negative numbers instead of the usual counter values, indicating that accessing that particular element of the reduced counter table requires an additional access to the "extended" part of the table where elements with higher resolution are located, allowing the use of higher resolution for the digit or symbol. Such a negative number may, for example, indicate in some form the location of corresponding elements and/or their resolution, which is preserved in the extended table (if necessary, at the discretion of the engineer skilled in the art).

Such a marking can also be done in reverse, where elements of the extended table for which it was decided to reduce the resolution will be marked, for example, using negative numbers in their values. And, at the discretion of the engineer skilled in the art, they may also contain direct or indirect references to their corresponding cells in the reduced table and/or their reduced resolution.

Alternatively (for example, instead of using negative numbers), such markers can be placed in a separate "parallel" data structure, such as a marker table, where the elements correspond to the elements of the counter table or index table.

In certain specific implementations, references from one table to another or from one part of the table to another may not be necessary, as the index of an element in one table (or part of the table) can be used to determine the index of the corresponding element in another table (or its part). That is, the indices of the corresponding extended or reduced elements can be calculated using a formula (using a function), at the discretion of the engineer skilled in the art.

The resolutions in various parts of the table (or in different tables used together to implement such a complex counter table or index table) can vary from each other. However, in some implementations, only two resolutions may be allowed—for the reduced parts and for the extended parts, without supporting intermediate resolution values.

An engineer skilled in the art can adapt the solutions described above to index tables.

In these solutions, we can consider that we are not referring to separate reduced and extended counter tables or index tables, or separate zones (layers) within the tables corresponding to higher or reduced resolution, or individual markers or marker tables. Instead, we are referring to a more complex organization of the counter tables or index tables themselves.

As stated in the terminology section, counter tables and index tables are not necessarily implemented using trivial arrays. They can be more complex data structures that require more complex logic to access their elements, which the engineer skilled in the art must implement, considering the decisions made regarding the specific implementation of the tables.

The use of such implementations with a partially reduced table, which includes both reduced parts and parts corresponding to higher resolution (information capacity, digit or symbol resolution), also implies that the engineer skilled in the art using such techniques or similar ones must make appropriate modifications to the algorithm for determining the buckets locations (for example, in the algorithm for transforming the table into cumulative form) and to the algorithm for relocation (transfer) of records between buckets. Specifically, modifications may be required in parts related to buckets traversal, extraction of digits or symbols, as well as in parts involving access to counter tables, index tables, and/or other auxiliary tables and data structures (for instance, dictionaries, histograms), depending on the specifics of the particular implementation.

Thus, above, we have described a novel method (algorithm, program, software, system, scheme, circuit, logic block or device that uses said method) for organizing a counter table or index table that is characterized by utilizing a transformation of said counter table or index table constructed for fixed-resolution digits or symbols into a new counter table or index table that enables support for different resolutions for elements corresponding to different digits or symbols, achieves this by being divided into zones or layers, or by having elements of different types or formats that correspond to digits or symbols of varying resolution, or by adding additional parallel data structures allowing to define type or resolution for particular elements, zones or layers, Optimization of String Comparison in Presence of Common Prefix or Suffix Another problem that can be addressed using the methods described in this section is the redundant comparison of common prefixes among strings that fall into the same bucket.

For instance, if at a certain stage of sorting the remaining records belong to the same bucket and there are few records in that bucket, existing advanced radix sorting algorithms can switch to using a different sorting method. For example, they can sort the remaining records using quicksort. However, in such cases, the classical (unmodified) quicksort procedure would perform many unnecessary comparisons every time it compares keys of records with each other, because during the process of comparing them, the characters that make up the initial prefixes of these strings will also be compared with each other, despite the fact that these characters are known to be identical among all records being sorted at this stage (since they are common to all strings belonging to the same bucket). Such redundant comparison of matching initial prefixes among strings can significantly slow down the sorting process.

Therefore, we describe here a method (algorithm, program, software, system, scheme, circuit, logic block or device that uses said method) for radix, bucket or interval sorting, or for searching within a set of objects or records divided into buckets associated with specific digit or character values that is characterized by the fact that, when switching to the use of other sorting or searching methods within a certain bucket or bin, it employs modifications of those other sorting or searching methods in which some or all string comparisons are performed with the exclusion of the initial prefix, final suffix, or another group of characters common or insignificant within the given bucket, and this achieved by skipping comparisons or computations for some or all digits or characters that compose or comprise such common or insignificant parts of strings to be compared during the sorting or searching process.

In particular, this method can be implemented by including in the adaptive algorithm for radix, bucket, or interval sorting a modified version of another sorting algorithm (e.g., a modified version of quicksort), or, alternatively, by passing a modified key comparison function to another sorting algorithm in such a way, that this other modified sorting or key comparison function compares keys without regard to, i.e., omitting the common or insignificant prefix (in the case of MSD-order radix, bucket, or interval sorting) or suffix (in the case of LSD-order radix, bucket, or interval sorting), or any other common or insignificant part of the keys (as chosen by an engineer skilled in the art and in accordance with the specific implementation details).

In particular, for classical radix, bucket, or interval sorting, and most of their modifications, such optimization is possible because all strings within each individual bucket, for which a modification of another sorting method will be used, will always have a common prefix (in the case of MSD-order sorting) or a common suffix (in the case of LSD-order sorting), which can be skipped during key comparisons within that bucket without altering the result of the sorting process.

In addition, we describe further development of this method that also allows accelerating the processing of numeric keys, not just string-based operations.

Many classical sorting methods, such as quicksort, heavily rely on the choice of an initial pivot element. Typically, they use a random element, the first, last, or middle element within array to be sorted, or the median of three or more elements. However, these values may not accurately reflect the true nature of the data (distribution of key values within real data).

However, when classical sorting algorithms are combined with radix sort, bucket sort, or interval sorting, additional information can be provided, such as the initial and final boundaries of the current interval, and/or the contents of the counter table or index table. This can improve the classical partitioning algorithm to select the partition boundary considering the initial or final value for the given bucket or even based on the analysis of actual data performed through the analysis of the counter table or index table, which is particularly relevant when dealing with a high-resolution counter or index tables.

By utilizing this additional data, the modified classical algorithm can enhance the quality of the pivot selection algorithm or, in some cases, employ lighter implementations of comparison functions.

Thus, above, we have described a new method (algorithm, program, software, system, scheme, circuit, logic block or device that uses said method) for radix sort, bucket sort, or interval sort that utilizes information about the initial boundary, final boundary, middle point between such boundary values for a specific bucket or that utilizes information extracted or derived from the counter table or index table to improve the selection of the pivot element or to calculate synthetic value of the pivot element, which may be used in another sorting algorithm applied to the contents of a specific bucket, Optimization of Verification that a Record Belongs to a Bucket In this section, we describe an optimization for checking the membership of records to specific buckets.

In the implementation of radix sort and similar sorting algorithms, it is often necessary to check whether a record belongs to the current or target bucket. In these cases, certain steps of the algorithm can be skipped or, conversely, must be performed.

Typically, such a check is done by extracting a specific digit or symbol from the numerical value of the record's key and comparing it with the value corresponding to a particular (e.g., current or target) bucket. However, for certain types or representations of data, such as numerical keys represented by basic data types, extracting the digit or symbol from the key, and then comparing it may be slower than directly comparing the key's value with the boundary values specific to the bucket.

Therefore, here we describe a method (algorithm, program, software, system, scheme, circuit, logic block or device that uses said method) for radix, bucket, or interval sorting, or for searching within a set of records divided into buckets that is in the process of determining whether a certain record belongs to a certain bucket it utilizes a comparison between the key value of such a record and a certain boundary value, which corresponds to the maximum or minimum key value for the given or for an it's neighboring bucket, wherein such boundary value or values computed using a formula, a method, an algorithm, or they determined by analyzing the keys of the records processed at a previous step or stage in the sorting or searching process, or they are obtained or derived from the characteristics of given bucket.

In particular, in a specific implementation of this method, the minimum and/or maximum value of a record key can be computed, which determines whether the record still falls into the current or target bucket, or the value at which it will fall into the adjacent bucket (preceding or succeeding bucket). Subsequently, comparing the key of the actual analyzed record with this boundary value allows determining whether the record belongs to the desired (e.g., current or target) bucket or confirms that it lies below (above) the next or previous bucket (which, in given specific implementation, may indirectly indicates whether the record belongs to the current or target bucket).

In some cases, two checks may be required, separately for the lower and upper boundaries of the given (current or target) bucket or for the adjacent buckets. In other specific implementations, a single check may be sufficient (this depends on the characteristics of the specific implementation performed by an engineer skilled in the art).

In particular, in the classical MSD-order radix sort algorithm, where the buckets are processed sequentially in accordance with their order in the sorted output set, there is always a guarantee that a record whose key is less than or equal to the maximum key value for the current bucket definitely belongs to the current bucket. This is because all previous buckets have already been processed, and therefore, an unprocessed record cannot belong to any of them.

In such a case, a single check of the record's key is sufficient to ensure that it is less than or equal to the boundary value for the current bucket or that it is less than the minimum value corresponding to the next bucket.

However, in the case of parallel sorting or with different order of traversing the buckets, two comparisons of the key value with two boundary values may be required, corresponding to the current or target bucket or to the values for the adjacent buckets.

The boundary values that characterize the buckets can either be determined based on real data at some previous stage of the search or sorting algorithm's operation, or they can be computed synthetically, for example, as the maximal possible values for the numbers that still remain within the range of the key for the current or neighboring bucket, as chosen by an engineer skilled in the art. Computing synthetic boundary values for a specific bucket allows avoiding the analysis of key values for records corresponding to that bucket (if it has not already been performed for other purposes).

Such boundary values may also be obtained or derived from the characteristics of a given bucket, for example, they may be read from a bucket descriptor or may be parameters of a sorting call for that bucket.

The method described in this section allows checking the membership of a record to a bucket without extracting a digit or symbol from the numerical value of the key, which, in some cases, may be preferable for a specific implementation.

Preprocessing of Bucket Placement Areas Prior to Main Record Relocation Phase

In certain specific implementations of radix, bucket, or interval sorting, an optimization related to the rearrangement of elements in an array, or another sortable data structure can be beneficial. This optimization aims to gather all the elements that do not belong (or, conversely, do belong) to a particular bucket into a separate group within the data structure. The purpose is to prevent these elements from mixing with the ones that belong (or do not belong) to the bucket and, therefore, require (or do not require) movement (relocation) within the area(s) designated for other buckets.

Specifically, in some specific implementations of sorting algorithms, this optimization eliminates the need to check the membership of an element in the original bucket during the main stage of data movement (relocation) between areas assigned to different buckets. Other optimizations based on pre-ordering the elements corresponding to the specific bucket's placement are also possible.

In this section, we describe a new method (algorithm, program, software, system, scheme, circuit, logic block or device that uses said method) for radix, bucket, or interval sorting that involves the preliminary movement or relocation of records corresponding to elements located within a specific region of an array or another data structure, which boundaries correspond to the future placement of a specific bucket inside said array or another data structure; wherein said preliminary movement or relocation of records occurs at a stage preceding the movement or relocation of records between areas corresponding to the final placement of different buckets rather than just inside said specific bucket (at some step or stage in the sorting process).

In other words, we describe a method for radix, bucket, or interval sorting that moves or rearranges records (e.g., by modifying the values of corresponding array elements or other data structure elements) within a specific region in the data structure (e.g., an array) corresponding to the final placement of a particular bucket. In this context, the final placement of a bucket refers to the arrangement of records that belong to that bucket and will be achieved in a partially or fully sorted data structure (e.g., an array) after the movement or relocation of records between different buckets at a discussed step or stage of the sorting process.

This preliminary movement or relocation of records aims to partially or completely order them within the designated region during a preliminary stage preceding the main stage of moving (or relocating) the records between different areas corresponding to the final placement of different buckets.

In particular, this method can be implemented by analyzing the keys of records corresponding to elements located within a specific region in the array (or another sortable data structure) that corresponds to the final placement of a particular bucket within the array (or another data structure).

If a record's key matches (or, conversely, does not match) the bucket, the values of the array elements or other data structure elements can be modified accordingly, moving the record to the beginning or end of the unprocessed part of the current region (corresponding to the final placement of records for that bucket).

The purpose of this preliminary processing, achieved through such movement of records (by modifying the values of corresponding elements of the sortable array or other data structure), is to group a portion of records whose keys match (or, conversely, do not match) the bucket at the beginning, end, and/or in the middle of the region corresponding to the final placement of that bucket. After this transformation is completed, the elements of the array or data structure containing or pointing to the records that match (or, conversely, do not match) the given bucket will be gathered in the designated area (at the beginning, end, and/or in the middle) within the data structure corresponding to the final placement of that bucket.

During the implementation of this method, the membership of a record in the bucket can be checked by extracting a specific digit or symbol from the numerical value of the record's analyzed key (followed by checking if the value of that digit or symbol matches the bucket). Alternatively, other methods, including those described in the "Optimization of Verification that a Record Belongs to a Bucket" section, can be employed.

Another specific implementation of this method involves using a sorting algorithm known as the Dutch national flag algorithm within the area designated for a particular bucket. In this case, some, or all checks for class membership (to check whether a record belongs to the class of records located at the beginning, in the middle or at the end of the bucket) can be replaced with checks for membership or non-membership of the elements in the specific bucket (for pre-processing the area to which this method is applied).

We emphasize that the membership check for a specific bucket is not a mandatory attribute of implementing this method. An engineer skilled in the art can implement other criteria for pre-ordering records (elements of an array or another data structure corresponding to these records) within the designated region of the final placement of a particular bucket.

In particular, in one of possible implementations, the preliminary processing can be used to separate elements that are more efficiently sorted using a specialized sorting method or methods, such as logarithmic sorting (as described in the "Logarithmic Sorting"), from the other elements within the area designated for a specific bucket. In this case, instead of checking the membership of an element in the bucket (or in conjunction with this check in more complex specific implementations), a check can be performed to determine whether the element belongs to a class for which a more efficient sorting method will be used. Subsequently, the resulting compact regions containing records of distinct types within the area designated for the bucket can be sorted separately from each other using different methods. Then, at the discretion of an engineer skilled in the art, an additional pass can be performed to merge the sorted regions into a single ordered set, or this merging can be done later for the entire partially ordered array or other data structure.

Analysis of Data Distribution for Selecting Sorting or Searching Strategy

The most advanced algorithms of radix sort and certain other sorting methods can adaptively change the data processing strategy during the sorting process based on the overall characteristics of the dataset or subset of records, such as its size (number of records to be sorted) or the boundary values of the keys (e.g., minimum and/or maximum key values). Such indirect analysis of data patterns, based solely on the analysis of the current state of the sorting process, but without testing hypotheses about the nature of the statistical distribution of values in the processed set of keys, may be insufficient for selecting an optimal strategy.

In this patent application, we describe a new method (algorithm, program, software, system, scheme, circuit, logic block or device that uses said method) for sorting, or searching within a fully or partially sorted set of records, which involves performing an analysis during its operation, where such analysis refers to computations or operations on the data, resulting in an evaluation of a certain assumption or hypothesis about the nature of the statistical distribution of record key values, or involves an analysis to evaluate a hypothesis or assumption about the correspondence of record keys to a specific pattern or set of patterns, or involves an analysis intended to estimate the amount of information or entropy in the record keys or in certain parts of such keys, or involves analysis of a least one element of a counter table or index table; and subsequently result of at least one such analysis is directly or indirectly, via a chain of dependent variables, used as a parameter or variable that controls the sorting or searching process or as a condition influencing the choice of further actions; wherein the term “index table” is understood as a data structure used in numerical sorting and search algorithms in which a set of records is partitioned into buckets corresponding to values of digits or symbols extracted from their keys, and the set of these buckets corresponds to elements of such index table.

In other words, we describe a method that directly or indirectly (via a chain of dependent variables) determines the value of a least one parameter or variable controlling the sorting or searching process or selects the subsequent sorting or searching strategy using the results of at least one of the following types of analysis (that is, empirical or statistical, including those based on probability theory, tests, some calculations on data, or operations on data):

a) Analysis aiming to evaluate a certain assumption or hypothesis about the nature of the statistical distribution of record key values or the correspondence of record keys to a specific pattern or set of patterns qualitatively or quantitatively.

b) Analysis of a counter table or index table, including the analysis of all or some of its elements (at least one of its elements).

c) Analysis (estimation) of the amount of information or entropy in the record keys or in certain parts of such keys.

These analyses provide insights that are used to determine the value of a parameter (variable) controlling the sorting or searching process or to choose the subsequent sorting or searching strategy. The method utilizes the results of these analyses to make informed decisions during the sorting or searching process.

And at the discretion of an engineer skilled in the art, any of the above-mentioned analyses can be performed either for the entire set of records or elements of the table, or only for a subset of elements selected from the overall set of records or from the overall set of elements of a counter or index table, particularly using one of the sampling methods.

The use of a counter table or an index table to analyze (evaluate) the statistical characteristics of keys distribution is possible because the elements of such tables directly or indirectly represent (characterize) the distribution of key values and indirectly reflect certain patterns that characterize the keys.

We emphasize that the results of the analysis according to this method, which are subsequently used as (or as part of) a criterion for making decisions on further action strategies or as (or for determining) a control parameter in the sorting or searching process, do not necessarily have to be an absolutely accurate assessment of a quantity or choice variant. It can be an empirical assessment (based on some empirical criterion) that is not always precise, or it can be a statistical estimate calculated with a certain reliability or margin of error, or it can be a probabilistic estimate that is correlated to the exact result but not always precise.

In particular, hypothesis testing about the nature of the statistical distribution of key values or their correspondence to a certain pattern or set of patterns, analysis of the counter table or index table, estimation of the amount of information (entropy) in the record key values or in certain parts of such values, or some combination thereof (possibly along with other conditions), can be used to transition in the sorting or searching process to the use of one of the methods described in this patent application or to refrain from using such a method. For example, for dynamically switching between traditional or enhanced (including using the methods we described) radix, bucket, or interval sorting algorithms and logarithmic sorting described in our “Logarithmic Sorting”, or for dynamically switching to a method that utilizes key value normalization (as described in our “Normalization of Data in Sorting or Search”), or for dynamically switching to the use of another search or sorting method. Similarly, another sorting method can be chosen in case of obtaining a very high or very low entropy level assessment in key values (or in certain parts of key values). And so on, at the option of an engineer skilled in the art.

Certain specific implementations of this method applied to radix, bucket, interval, and other sorts, based on the analysis of the contents of the counter table or index table, have already been described in detail in other sections of this patent application. In particular, in the sections “Determining Optimal Information Capacity and Termination Criterion for Downsampling Algorithm” and “Fast Evaluation of Optimization Criteria or Characteristics” methods for computing characteristics that can be used to select different strategies for further actions or as parameters controlling the sorting or searching process are described.

The main essence of the innovation proposed in the method described at the beginning of this section is the idea of using the results of analyzing the record keys to check their compliance with a certain statistical distribution, pattern, or set of patterns, as well as the idea of using some analysis of the counter table or index table, and the idea of using analysis (calculating estimates) of the amount of information (entropy) in key values or in certain parts of such values, to then use the results of at least one of the listed analyses (or their combination) as a criterion or criteria in the process of selecting a strategy for further actions or for determining the values of parameters or a set of parameters that control the sorting or searching process.

In other words, the main essence of the method we’re defending in this patent application lies precisely in the use of specific classes (types) and methods of analysis (including those described in this patent application) in the sorting or searching task, in order to select a strategy for further actions or determine the values of control parameters, which is not done in known implementations of sorting or searching (or is done using other classes and methods of analysis different from those described in this section).

We also emphasize that in specific implementations, these methods can be combined with other steps, stages and operations in the search or sorting process (as well as other methods described by us). In particular, the analysis required for selecting a strategy for further actions (as described in this section) does not necessarily have to be implemented as a separate stage. At the discretion of an engineer skilled in the art, it can also be combined with other actions at a certain step or stage of the process. For instance, it can utilize the side results of other operations on record keys or table elements.

We also emphasize that determining the value of a parameter that controls the sorting or searching process and/or selecting a strategy for further actions may not only be based on the results of preliminary analysis of the keys of the entire set of records processed at a given step or stage, or solely on the analysis of all elements of the counter table or index table. It can also be based on the analysis of a subset selected from the overall set of records or table elements (i.e., on the analysis of a sample of elements taken from the population).

In particular, the analysis may only be performed on the keys of certain records taken from the complete set of records processed at a particular step or stage.

For example, if records or references to them are stored in an array, list, or other data structure, only the keys of the records represented by certain elements of such an array, list, or data structure can be analyzed. These elements may be spaced at a fixed, variable, or random interval. Alternatively, only the keys of records represented by random elements selected from the entire population using a random or pseudorandom number generator can be analyzed. In the case of analyzing counter tables or index tables, the analysis may also involve the analysis of initial and/or final elements of such a table, diagonal elements, certain partitions or bisections of the set of elements of such a table, analysis of elements with indices that are multiples of powers of two, analysis of an element or pair of elements with maximum values, and so on, at the option of an engineer skilled in the art.

We also emphasize that all the described analysis methods can be used not only for selecting a strategy for further actions but also for calculating the values of certain control variables (parameters) that govern the search, sorting, or other data processing process.

An important special case of implementing the analysis methods of the counter tables described in this section is calculating the sum of initial and/or final elements of the "classical" counter table (where the elements represent the counts of records containing a specific digit or symbol in a specific position in their numerical key value) or calculating the sum of elements in a fragment or set of fragments of such a table, followed by comparing the obtained sum with a certain threshold value, possibly dependent on the total number of records processed at that step in the sorting, searching, or other data processing process.

The reason for this is that the initial and final elements of the counter table may correspond to digits or symbols with long prefixes equal to the minimum and maximum values of the digit or symbol (zero and one in binary representation), and other fragments of the counter table may correspond to digits or symbols with certain common prefixes or sets of adjacent common prefixes. Thus, the sum of elements in the initial, final, or other fragments of the counter table will indicate the total number of records with keys where the digits or symbols have prefixes of a specific type.

Comparing such a sum with a threshold value, possibly depending on the total number of records processed at this step or stage (specifically, which may be proportional to or exceed half the number of records), can be used as a heuristic or estimate for switching to logarithmic sorting, logarithmic search, or similar methods of data processing.

For example, if the counter table is constructed for digits with a length of "m" bits and the optimal radix for such radix sorting is "n" bits, and logarithmic sorting is based on counting the number of leading zeros or ones in the key value, depending on the sign of the number, then the sum of the first and last 2^(m−n) elements of the counter table will indicate the number of records for which applying the logarithmic function is more advantageous because the keys of these records have long prefixes consisting of zeros or ones. Accordingly, comparing this sum with a threshold value, such as a proportion exceeding half the number of records, can be used as a heuristic for switching to logarithmic sorting. The specific condition for switching can be more complex, taking into account additional factors, at the discretion of an engineer skilled in the art.

This process can also be generalized to work with index tables or counter tables that contain more complex information or multiple fields (rather than just being integer counters of records) if for the elements of such a table implemented a certain function that returns the count or estimation of the count of records corresponding to that table element. In this case, the summation of elements in the specific implementation described above is replaced (may be replaced) with the summation of the results of applying that function.

This process can be organized in some other way, respecting the general principle of accurately counting or estimating the number of records corresponding to some part of buckets that are represented by some part (fragment or fragments, a certain set of elements) of a counter table or index table—but the details of implementation are left to an engineer skilled in the art.

Similarly, comparing the sum of elements with a threshold value can be replaced with a more complex analysis, at the discretion of an engineer skilled in the art.

For example, if instead of summing the initial and final fragments, we select a different set of elements from the counter table or index table by appropriately calculating the boundaries of the summed fragments, or if we add a check in the summation loop for the presence of a specific suffix in the value of the loop variable, which serves as an index in the table, then, similar to common prefixes, we can also count or estimate the number of records with common suffixes.

Thus, we have described here a generalized method (algorithm, program, software, system, scheme, circuit, logic block or device that uses said method) for estimating the number of records that have matching or similar prefixes or suffixes, or that have prefixes or suffixes of a specific type, which utilizes the summation or accumulation of values of elements or information computed or obtained using elements of a counter or index table, where these elements are taken from a fragment or set of fragments or from a sample taken from the counter table or index table; or, alternatively, which utilizes the summation or accumulation of the results of applying a certain function to such information; wherein result of this summation or accumulation, obtained using this method, can be used to assess the feasibility of switching to logarithmic or other sorting or searching methods, or as a parameter or variable that controls the sorting or searching process.

Similar processes for summing specific groups of elements in the classical counter table or cumulative processes that use a function (for example, implementing an accumulation operation other than arithmetic summation) can be used to identify other patterns or distributions of key values. This can be useful for switching to normalization (as described in the "Normalization of Data in Sorting or Search"), section), or for switching to other specialized methods of sorting, searching, or data processing, or for determining the values of control parameters.

In particular, summing or accumulating information related to elements of the counter table, whose indices correspond to powers of two or powers of some arbitrary value "d," and/or correspond to numbers of the form (d^m−d^n) and/or to arithmetic sums of such numbers and/or their bitwise sums modulo two, where "m" and "n" are integers, can be used to assess the similarity of a set of key values with sparsely populated matrices of various types. Specialized methods of sorting, searching, or other data processing can be employed in such cases.

In a more general implementation, the summation of element values or the results of applying a function can be replaced by applying an accumulation function (possibly different from arithmetic summation) to the original data (the values of elements or the information obtained by applying a function to the elements), followed by arbitrary analysis or use of the accumulated information, the implementation of which is determined by an engineer skilled in the art. The engineer skilled in the art also determines which subset of elements from the counter table or index table the summation or other accumulation function should be applied to.

Thus, above, using specific implementation examples, we have described a method (algorithm, program, software, system, scheme, circuit, logic block or device that uses said method) for sorting, searching, or processing data that utilizes counter tables or index tables whose elements correspond to buckets into which the set of records is partitioned or to digits or symbols obtained using record keys, which is characterized by the summation or accumulation using an accumulation function of element values or the results of applying a certain function to the elements of the counter table or index table, where this summation or accumulation is performed for elements that are located at the beginning, end, in a certain fragment, or in a certain set of fragments, or taken from a specific sample of elements taken from the counter table or index table, or simultaneously belong to several of the mentioned subsets; wherein the result of summation or accumulated information is subsequently used in the process of selecting a strategy for further actions or in determining the value of a control parameter.

Entropy Estimation

In some sections of this patent application, we describe the use of entropy estimation or, in other words, the estimation of the amount of information contained in record keys or in other data.

There are many methods for estimating entropy (information quantity), but most of them either compute this estimation as a byproduct during resource-intensive data transformations (e.g., data compression), or they are tied to specific data semantics. Such methods are not suitable for use in general-purpose sorting processes because while entropy estimation can be useful, for example, in selecting the optimal sorting method or estimating the values of parameters such as the initial digit capacity or information capacity for building a counter table or index table, the computational cost of calculating entropy itself can outweigh the positive effect of its use.

Therefore, in this patent application, we describe two novel entropy estimation methods. They do not claim to provide accurate estimates but have two advantages: they are not tied to the semantics of the numerical or string values for which the entropy estimation is computed, and they allow for efficient implementation on modern computing devices.

One of these methods is based on the idea of estimating the uniformity of the distribution of values of individual digits in various positions of hash function values, where such a hash function applied to the elements of the dataset for which the entropy estimation is computed. The second method is used to estimate entropy in individual digits or symbols within keys through the analysis of the counter table or index table.

Entropy can be expressed in different units and can be calculated for different entities, with different assumptions about their nature. In this section, we discuss entropy estimation for a set of independent elements where the order of the elements does not matter. An engineer skilled in the art may supplement our proposed method for use with other conditions.

Let us consider the idea of estimating the uniformity of digit distribution. For example, for a set of 64-bit numbers for which we need to estimate entropy, we can count the number of elements that contain a '1' in each of the 64 binary digits of the number. The more information the data contains, the closer it will resemble a random variable. Therefore, the expected value for the count of ones in each bit for a set of maximally information-filled numbers will be N/2, where 'N' is the size of the set for which we are computing the estimate. Having this information, we can use an appropriate method from mathematical statistics or probability theory to estimate the deviation from the expected ideal pattern, where we expect to see N/2 ones in each position.

If the values were random, this estimation of deviation would serve as an estimation of entropy. We would just need to express it in bits or other units in which we measure entropy, which can be done, for example, using the theories and formulas developed by Hartley and Shannon.

Unfortunately, such a simple estimation would be very unreliable in practice. If there is any pattern in the input data, such as correlation between digits, we can get a high entropy estimation even though the actual entropy may be close to zero. For example, if the entire array is filled with infinite repetitions of the value pair {0xAAAAAAAA, 0x55555555}, then using a trivial method, we would obtain an entropy value equal to or close to 32 bits per element, even though the actual amount of information in this array is much less (no more than 1 bit per element). However, since the two similar values perfectly overlap zeros and ones with each other, after counting the ones in each individual digit, we obtain the same ideal distribution of zeros and ones.

To eliminate this drawback without resorting to complex analysis, we propose that an engineer skilled in the art use a method (algorithm, program, software, system, scheme, circuit, logic block or device that uses said method) that estimates the amount of information or entropy for a set of arbitrary elements by calculating a hash function or a set of hash functions for each of the elements being evaluated, and then counting the non-uniformity of the distribution of digits, symbols, or bits in different positions within the computed values obtained from applying the hash function or set of hash functions, possibly combined together using some function or rule.

In other words, we suggest estimating entropy by evaluating the non-uniformity (e.g., deviation from the mathematical expectation) for each position within the hash value of the input data or within the value obtained by combining the values of multiple different hash functions (obtained using a certain function, or, for example, using a concatenation, bit shuffling, or any other method at the discretion of an engineer skilled in the art).

In this basic method, we do not fix specific mathematical formulas or algorithms for computing the non-uniformity estimate of the distribution of digits, symbols, or bits, nor do we specify a particular way to convert this estimate (if necessary) into bits or other units in which entropy is measured in a specific application. Depending on the specific application, precision, and nature of the intended use of the estimate, different calculations may be employed.

We emphasize that the method we described is not tied to sorting or searching tasks and can be used beyond these specific domains. Additionally, this method can be applied to any set of arbitrary elements, such as record keys or numerical values extracted from full record keys at a certain step (pass, round, or stage) in the sorting or searching process or to other arbitrary data in different tasks.

We also note that the "digits" or "symbols" in this entropy estimation method do not necessarily refer to the same digits or symbols that can be extracted from the same data (e.g., the same numerical key values) during sorting or searching. Specifically, they can be digits or symbols of a different radix, bit depth or digit capacity (or information capacity). Sorting or searching usually will operate on digits or symbols with a larger radix, bit depth or digit capacity (or information capacity) such as 8-bit digits or symbols. However, entropy estimation using the proposed method can be an estimation of the non-uniformity in the distribution of ones or zeros within individual bits of hashed key values, rather than the non-uniformity in the distribution of their 8-bit digits or symbols.

Applying a high-quality hash function or a set of such hash functions to the input data randomizes the data by destroying patterns such as linear and trivial non-linear dependencies, correlations between digits that exist in real data (unless they are deliberately selected to compromise the hash function or set of hash functions). Thus, our proposed method significantly reduces the likelihood of incorrect estimation of the amount of information or entropy, even when using primitive methods for further estimating the non-uniformity in the distribution of values of individual digits, symbols, or bits in various positions.

This allows for the quick estimation of entropy (information quantity) for a set of elements with a sufficient level of quality, without resorting to complex and resource-intensive statistical analysis methods.

The method for estimating non-uniformity in each digit is chosen by an engineer skilled in the art. For binary implementations, we recommend estimating the deviation of the count of ones from the expected value of N/2 for each digit. Then, the overall entropy can be estimated as the deviation of the entire system from the expectation. In practice, it may be sufficient to simply add the estimates made for individual bits (digits) if they are already expressed in the desired units of measurement.

However, in general, the choice of the method for calculating the final value of the estimate after calculating the non-uniformity for individual digits is left to the engineer skilled in the art since the calculation method and the units in which it will be expressed are determined by the specific implementation and its characteristics.

Additionally, we describe another method here for a rough estimation of the amount of information or entropy. This method is applicable when there is a need to quickly obtain an approximate estimation of the entropy for an individual digit or symbol in the numerical values of keys or within specific positions (e.g., digits or bits) inside the digits or symbols, and a counter table or an index table has already been constructed for these digits or symbols.

In this case, an engineer skilled in the art can use a method (algorithm, program, software, system, scheme, circuit, logic block or device that uses said method) designed to estimate the amount of information or entropy that is characterized by estimating the amount of information or entropy in the values of a certain sample of elements or in the data obtained by applying a certain function to a sample of elements taken from the counter table or index table, or in the sums of such element values or function results, or in aggregated element values or function results; where subsequently the estimated value of information or entropy obtained through such processing of a sample of elements taken from the counter table or index table is used as or to calculate a general estimation of the amount of information or entropy present in a set of record key values, in specific value(s) of digits or symbols in the record keys, or in individual position(s) of digits or symbols, which were used in the process of constructing the counter table or index table, for all records or for a subset of records corresponding to the processed subset of counter table or index table elements.

The result of such an estimation can be used as a rough estimate of the entropy or amount of information in the parts of record keys for which the counter table or index table was constructed (for the whole set of records, or for some bucket or set of buckets corresponding to the processed elements of the counter table or index table).

This method is applicable not only to full digit or symbol values as used on given step or stage of sorting or searching but also to their individual positions or sub-digits (for example, bits). In particular, if there is a need to estimate the amount of information in the first "n" positions or sub-digits (for example, bits) taken from digits or symbols with "m" sub-digits, the proposed method requires summing of groups of $2^{(m-n)}$ elements (for example elements, taken from the counter table) and then estimating the entropy in those sum values using any suitable method (including the one described at the beginning of this section, if appropriate).

Utilizing Machine Learning and Neural Networks for Sorting or Searching Strategy Selection We also describe a method (algorithm, program, software, system, scheme, circuit, logic block or device that uses said method) for improvement of arbitrary sorting, or for improvement of searching specifically in a partially or fully sorted set of objects for which a counter table or an index table is built, the elements of which correspond to groups of records containing a specific value(s) of a digit or symbol in their keys that is characterized by utilizing at least one parameter directly or through a chain of dependent variables used as a parameter controlling the sorting or search algorithm, or as a parameter in a condition influencing the selection of further action strategies, where such parameter depends on the output variable or represents the output variable of a Bayesian network, Bayesian classifier, belief propagation network, Markov network or chain, Restricted Boltzmann Machine, another machine learning-based classifier, model, or network, a layer of perceptrons or a separate perceptron, neural network, or some combination thereof.

In particular, a specific implementation of this sorting or searching method can be performed as follows:

The specific implementation of this sorting or searching method generates a set of input features (input variables), which may include:

a) Numeric values of keys of all records or a certain sample from the entire set of records (at the choice of an engineer skilled in the art), individual digits or symbols, prefixes or suffixes extracted from these keys.
b) Values of all or some elements of a counter table or an index table, or any other information obtained using the elements of the counter table or the index table.
c) General statistical or other characteristics of the keys of the processed subset of records or some sample of records from this subset (for example, such characteristics may include the maximum and/or minimum value of the key, statistical characteristics of the numeric values of the keys, such as the average value of the key, variance of the key values, and so on), general characteristics of the subset of records or sample itself (for example, the number of elements in this subset or sample).
d) General characteristics computed using all or some elements of the counter table or the index table, general characteristics of the table itself (for example, its length, the number of non-empty buckets corresponding to the elements of the table, the maximum length of a bucket, the average length of a bucket, and so on).

e) Any characteristics and estimates, intermediate values obtained using the methods described in the sections "Determining Optimal Information Capacity and Termination Criterion for Downsampling Algorithm" and "Fast Evaluation of Optimization Criteria or Characteristics".

f) Values of variables describing the current progress of the sorting or searching process (for example, the position and length of the currently processed subset of records, information capacity or digit capacity of digits or symbols at the current step (round, stage or pass), information capacity or digit capacity of the already processed or yet to be processed part of the keys, position in the key, shift magnitude or mask for extracting digits or symbols for the current round (step, stage or pass), number of current round (step, stage, or pass), identifier of the current search or sorting strategy, and so on).

g) Variables that directly or indirectly indicate the efficiency or inefficiency of the current strategy or reflect the history of the sorting or searching process (for example, information capacity or digit capacity at the previous step (round, stage or pass), position in the key, shift magnitude or mask for extracting digits or symbols at the previous round (step, stage or pass), previous assumption about optimal information capacity or digit capacity, identifier of the strategy chosen in the previous round (step, stage or pass), and so on).

h) Other features (input variables) formed arbitrarily by the decision of an engineer skilled in the art.

i) Results of empirical or statistical tests, results of other analyses as described in the section "Analysis of Data Distribution for Selecting Sorting or Searching Strategy".

j) Result of applying a certain function to any individual variable or a set of features described in points (a) . . . (i).

The generated set of features is inputted to one of the classifiers, models, networks, or machine learning algorithms (which were listed above in the description of the method at the beginning of this section), to a layer of perceptrons or a separate perceptron, to a neural network, or to a more complex system combining some of the aforementioned components.

As a result of the model's, classifier's, algorithm's, perceptron's, or network's operation, one or more output variables are generated. Then, at least one of these output variables is directly or indirectly (through a chain of other dependent variables) used as a control parameter and/or for selecting the strategy of further actions in the sorting or searching process.

Parallel Implementation of Record Redistribution Phase

Most implementations of radix, bucket, or interval sort with MSD (Most Significant Digit) order of movement by key, and possibly other sorting methods, contain some form of operation step in which the records of the subset being sorted at that stage (during that pass, round, or full sorting step) are redistributed.

During this step, the redistribution or relocation of records is performed in such a way that they are relocated according to the arrangement of buckets defined for them by the sorting algorithm. For example, according to the bucket arrangement specified in the counter table, converted into cumulative form in the radix sort with MSD (Most Significant Digit) order of movement by key.

While radix sort itself and similar sorting methods allow highly efficient parallel implementation, the step of record redistribution in these sorts is typically implemented (executed) sequentially. Existing implementations of radix sort, known to us at the moment, cannot perform this task in a parallel manner, even on a multiprocessor or multi-core system.

In this context, we will generically refer to a real or virtual computational device or the control flow on such a device as an "executive device." In specific implementations, in addition to hardware and closely related solutions (such as processors, processor cores, etc., as per our adopted terminology), these could also be individual program control flows (execution control flows)—such as threads, fibers, coroutines, and so on, functions performing in parallel, automata, and abstract machines.

The challenge for a parallel implementation of the phase of record redistribution lies in the necessity of accessing at least two elements of the counter table or index table to transfer one record from the source bucket location (where the record is not in its correct position) to the target bucket location prescribed for it by the sorting algorithm. Different executive devices may concurrently process different records, but they will constantly compete with each other for access to the elements of the shared counter table or index table.

We note immediately that a trivial parallel implementation of the record redistribution process is possible, which would use atomic operations whenever one of the executive devices attempts to read or modify the next element of the counter table or index table.

However, different elements of the counter table may be located in the same cache lines, and in such an implementation, the executive devices will constantly contend for access to these lines, triggering complex cache synchronization and sharing protocols between processors or their cores at the lower level, resulting in significant inter-processor or inter-core traffic on system buses and frequent conflicts when attempting to share the same cache line for writing. Therefore, such an implementation may be highly inefficient.

Partially, competition can be mitigated by spreading different cells of the counter table or index table across different cache lines, but this significantly increases the cache memory requirements for each processor or core.

Thus, we describe here a new method that replaces most accesses to the main counter table or index table with local accesses to a "shadow" counter table or index table, which is used only by the given executive device. This approach reduces substantially the frequency of conflicts between executive devices during the process of record redistribution.

Thus, we describe a new method (algorithm, program, software, system, scheme, circuit, logic block or device that uses said method) for the parallel implementation of the step or phase of record redistribution in a sorting process or another process of ordering a set of records, which uses a counter table, index table, or some auxiliary or working table that is characterized by creating a separate "shadow" copy of the main counter table, index table, auxiliary or working table for each executive device, thread, or program control flow in this specific implementation; wherein said "shadow" table is subsequently used instead of the main table in the main part of the operation of the said executive device, thread, or program control flow; and at certain points during the operation, the elements of said "shadow" table are dynamically modified to be populated with new information, and this is achieved by executive devices by capturing a part of elements or a portion of space designated for the placement of records from those areas indicated by corresponding elements of the main counter table, index table, auxiliary or working table.

In particular, a specific implementation of this method can be performed as follows:

Since the method described in this section is applicable not only to the counter table or index table but also to other auxiliary or working tables that indicate the location of records or buckets, which may be used in specific implementations during the process of record redistribution, we introduce the general term "record location table" in this section. It refers to the counter table, index table, or some auxiliary or working table used in the process of redistribution or movement of records.

We also introduce the concept of "bucket element group", representing a certain area in the data structure being sorted or ordered where the records of a specific bucket should be placed. In the case of sorting an array, this will simply be a group of sequentially located array elements within the area of the future or actual location (placement) of one of the buckets, as prescribed by the sorting algorithm. For more complex data structures, it could be a specific portion of the data structure where the elements of one bucket are currently placed or are to be placed in the future, according to the logic of the specific implementation chosen by an engineer skilled in the art.

Initially, for each executive device, a separate "shadow" record location table should be created (hereinafter simply referred to as the "shadow table"). It could be, for example, the counter table (possibly and probably converted into cumulative form) or index table pointing to the beginnings of record lists. The elements of this table may be initialized with a special value (e.g., a negative number for the counter table, a null pointer for the index table, or in any other manner as chosen by an engineer skilled in the art, considering the characteristics of the specific implementation). This helps the specific implementation quickly recognize that a given element of the shadow table does not contain a valid value and cannot be used directly. In the specific implementation, a separate marker table or a bit map may also be used for this purpose, chosen by the engineer skilled in the art.

During operation, resembling the ordinary implementation of the record redistribution step (phase) in the corresponding sorting method or data processing, the executive device accesses the shadow table instead of the main (original) record location table (e.g., instead of the main counter table represented in cumulative form or the main index table).

If an element of the shadow table is valid (not equal to a negative number for the counter table, not a null pointer for the index table, not marked as invalid, etc., see the explanation above), the implementation of the record redistribution step uses this element's value in the usual way.

However, if an element of the shadow table is marked as uninitialized, the executive device employs some memory access coordination method (atomic memory operations, transactional memory access, locking operations, barriers, critical sections, mutex locks, and/or other synchronization and coordination mechanisms) to access the main table, retrieve the current value of the corresponding element, and increment or modify its value in the main table as if a certain group of elements corresponding to a specific bucket (a portion of record location space) has already been processed.

In other words, in the classical implementation of record redistribution, if only one record were processed and the corresponding element, for example, an element of the counter table, would receive an increment by one to skip this already processed record, then in this new implementation, the element of the main counter table will be increased by a certain value greater than one (the exact value determined by an engineer skilled in the art in a specific implementation).

That is, although a certain portion of the record location space, such as portion of elements of an array within one of the buckets' location, has not been processed yet (i.e., records placed in the corresponding elements or pointed to by the corresponding elements have not been moved to new positions), multiple such elements are skipped at once due to the modification of the main table's element (e.g., the main counter table represented in cumulative form, whose current element values at the record redistribution step point to the current positions of unprocessed parts within the buckets).

For example, when using atomic memory access operations for the "classic" counter table represented in cumulative form, it means atomically adding to the value of one of the elements of this main table a number equal to the size of the bucket element group that will be classified as "already processed", while simultaneously obtaining, as the result of this atomic addition, the original value of that element (the value it had before the addition of the group size).

Subsequently, the original value retrieved from the main table is placed in the corresponding element of the shadow table. Alternatively, it may be first used, incremented (or shifted) accordingly to skip the one processed record, and then placed in the corresponding element of the shadow table—as chosen by an engineer skilled in the art. At this point, the shadow table contains valid and up-to-date information that allows the method to proceed with the normal handling f records.

And then the process of record redistribution (relocation) continues as usual since this element of the shadow table is no longer uninitialized, it can be used in the regular manner.

By incrementing the main table's elements to skip group of records at once and updating the shadow table accordingly, this method achieves a more efficient record redistribution process. It enables the executive devices to work in parallel on separate groups of records while minimizing conflicts over accessing shared memory where the main table (record location table) is located. This parallelization helps improve the overall efficiency of the sorting or ordering process and allows for better utilization of multi-core or multi-processor systems.

In this implementation, there should also be a local counter for available or already used space (for example, a counter for available or already used elements in a group of bucket elements captured from the main table). For instance, this can take the form of a parallel table or data structure, which elements correspond to the elements of the shadow table.

Alternatively, the regions of record location space (bucket element groups) should be captured in such a way that their boundaries are aligned to some value, such as a cache line boundary (which can be useful for other reasons as well). This allows the implementation's logic to detect the exhaustion of a bucket by checking if an element of the shadow table aligns with a specific value (of course, such a solution requires special handling of non-aligned bucket tails, which an engineer skilled in the art implementing this method should take care of).

Or, alternatively, the boundary value corresponding to the last element of a captured bucket element group or pointing to the adjacent region (adjacent element), should be moved to a local bucket top table (a local copy of the table with tops of buckets, which is often used in radix-like sorts to point to top or tail elements of the buckets) if used in the specific implementation. This helps to detect the exhaustion of captured bucket element groups through comparison with this value of the dummy bucket top. Alternatively, an engineer skilled in the art should devise another method for detecting the exhaustion of captured bucket element groups (regions of record location space).

This allows the detection of the exhaustion of the captured record location space (bucket element group) during the operation with the local shadow table. Each time it is discovered that one of the bucket element groups is fully exhausted (e.g., fully filled with new records), the corresponding element in the local shadow table can be marked as uninitialized again. Alternatively, a new region (group of elements) should be captured through a new access to the main table (record location table)—as chosen by the engineer skilled in the art.

In the proposed method and its implementations, a conflict may arise when a particular executive device attempts to capture a new record location space (bucket element group) from the main table, but there is no unprocessed space (unprocessed records) left in the corresponding bucket. This means that all record location spaces for that bucket (all corresponding bucket element groups) are already being processed by other executive devices.

In such a case, the engineer skilled in the art can devise a special handling for this situation based on their choice and requirements.

For example, this can be accomplished by using a method (algorithm, program, software, system, scheme, circuit, logic block or device that uses said method) for deferred record relocation in a parallel implementation of the step or phase of record redistribution between bin or buckets, characterized by placing a record or a pointer to it into a queue associated with an element of a data structure corresponding to the target bucket when it is necessary to defer the placement of a certain record in the target bucket as it is moved from its location in the source bucket to a certain target bucket and also performing a check for the presence in this data structure of another queue of elements associated with the source bucket, from which the relocation of the deferred record to the target bucket occurred, and if this other queue is not empty, then taking a record from one of its elements and placing it into the position vacated by the deferred record, after which the said element is removed from the corresponding queue it belonged to.

In cases where the queue associated with the source bucket is empty, the said element of the source bucket can be moved to a separate data structure with queues (or to the same data structure but with different labeling). The elements of this data structure will be checked in the event of a conflict and/or when the bucket is depleted (exhausted in the shadow table), either before or after attempting to capture the next group of elements from the bucket in the primary (non-shadow) table (record location table) or at other selected points in time, as determined by an engineer skilled in the art.

Regarding the remaining elements in the queues, a specific implementation can handle them at the end of the record-moving step (or at another moment), possibly through sequential processing, given that the number of such 'tail' records is limited. Alternatively, a specialized parallel algorithm can be used, as determined by the engineer skilled in the art.

Also, at the discretion of an engineer skilled in the art, at certain points during its operation, the executive device may move one of its unprocessed record location areas (groups of bucket elements) or a set of such areas (groups) to a special queue or another data structure designed to track deferred areas (groups). Other devices may access these deferred areas (groups) when they require an area (group) with space for a new record, and the corresponding element of this bucket is marked as not containing a valid value in the local shadow table, or when the corresponding bucket is fully depleted (exhausted) in the local shadow table or in the main table, etc. An engineer skilled in the art makes these decisions.

Despite the complexities and numerous intricacies involved in implementing this method, the performance of the parallel implementation phase for redistributing records using shadow tables can be significantly higher than that of a direct implementation using atomic operations on elements of a single counter table or an index table (when access to it is shared by devices in a direct way without being mediated by a shadow table). This is because the use of local shadow tables only requires memory access coordination at the moments of capturing areas (groups of elements) from the main table or when resolving conflicts that prevent such capture. However, as long as the next area (group of elements) is not depleted (not exhausted), the processing device can work with memory without the need for specific measures or operations to coordinate access (such as atomic access, bus locking, entering critical sections, capturing mutexes or semaphores, etc.).

Using Radix Sorting to Select (Extract) Special Groups

Radix sorting and related sorting methods, such as bucket and interval sorting, as well as improved modifications of these methods that incorporate solutions from this patent application, can be utilized to address tasks involving the extraction of special groups of elements (searching for or retrieving records that form such groups). For instance, the following tasks can be performed:

a) Extracting 'n' records with the largest key values.
b) Extracting 'n' records with the smallest key values.
c) Searching for a record corresponding to the exact value of the median within the set of keys.
d) Extracting 'n' records from the vicinity (neighborhood) of the record corresponding to the median.
e) Extracting a subset of records whose keys match a specific quantile (e.g., percentile or decile) of the set of key values.
f) Extracting the most compact subset of records whose key values sum up to a value higher or lower than a certain threshold.
g) Extracting 'n' records representing the neighborhood of a record containing a specific key value in an ordered set.
h) Extracting a subset of records from the neighborhoods of a certain record in an ordered set, where the composition of such subset is determined by additional conditions.

And so on.

A trivial solution to these tasks would involve sorting the entire set of records (e.g., fully sorting an array) and then extracting a certain number of records from the sorted array.

For example, to find 'n' records with the smallest key values, one would simply take the first cn' elements of the sorted array. Similarly, to determine the exact median value, one would analyze the record or pair of records located precisely in the middle of the sorted array (sometimes more than two entries are needed, depending on the definition of median in complex cases in a specific subject area or task).

However, employing partial sorting methods, similar to and based on ideas of radix sorting, allows for even more efficient solutions to these tasks—without performing a full sorting of the entire set of records. Moreover, in certain cases, this implementation can be faster than other partial sorting methods.

In this section, we describe a method (algorithm, program, software, system, scheme, circuit, logic block or device that uses said method) for partially ordering a set of records, characterized by using radix sort, bucket sort or interval sort modified for skipping the processing of those buckets whose location or content allows them to be classified as definitely not containing records that fall into the subset requiring further ordering.

We emphasize that this general method can find applications beyond solving the specific tasks listed above in the preamble of this section.

Furthermore, we emphasized that the methods described in this section can be used in all passes (steps, rounds, or stages) of the sorting process (during the partial ordering of the set of records) and not limited to just one of them. This additional feature allows for further reduction of the workload performed during partial sorting.

In particular, a specific implementation of method described above can be performed as follows:

Consider addressing the complex task of performing partial ordering of a set of records to extract a specific subset of records, their keys, fields, and/or any other information related to the records (e.g., data referenced by the record fields). Let us refer to the group of records that should be extracted or that contain the desired information as the "target subset of records". Once the target subset of records is identified (or extracted), extracting additional information, such as the values of their keys, fields, or other related data, becomes trivial and straightforward for an engineer skilled in the art. Therefore, we focus here is on describing (below) the process of finding or extracting the target subset of records rather than processing the already identified records.

The task of extracting (identifying, retrieving, searching, or gathering) the target subset of records can be solved using partially ordering sorting, as described below.

To partially order records according to this method, radix, bucket, or interval sorting with MSD (most significant digit) order of movement by key can be used, the specific implementation of which may, in particular, utilize other methods described in this patent application.

At each pass (round, stage, or step) of such sorting, a counter table or an index table is first constructed. Then, at the discretion of an engineer skilled in the art, the counter table or index table is transformed into a cumulative form.

If the partial ordering is performed to access a specific target subset of records, whose boundaries can be described as a window (a group of sequentially located elements in a hypothetical ordered set) or as a set of windows indicating the position of the target subset within the hypothetical ordered set, and these windows have fixed boundaries that already pre-calculated, pre-defined or may be pre-calculated at this sorting step (stage, round or pass) without additional analysis of record key values, then analyzing the cumulative counter table, the positions of the buckets during the sequential traversal of the counter table (e.g., by calculating the position of the next bucket by adding the size of the previous bucket to a working variable), or the positions of the buckets during traversal in a different order (which allows determining their final positions at some stage of this traversal) allows for identifying which buckets contain or potentially contain the records from the target subset that are of interest for solving the given task.

In this case, classifying the buckets as relevant or irrelevant can be achieved by comparing the computed bucket boundaries with computed or pre-defined window boundaries that describe the position of the target subset of records in the hypothetical ordered set of records. We note that, in general, we refer to the hypothetical state of the final ordering of the set—since, at this specific step (stage, round or pass), the set may not be fully ordered within the windows (unless it is the final sorting step). Additionally, this optimization leaves the set unordered outside the windows.

For example, if solving the task of extracting the 'n' records with the smallest key values, and using radix sorting as the base method to sort the array in ascending order of keys with MSD order of movement by key, then, after constructing the counter table with elements containing the counts of records in the buckets and transforming this counter table into a cumulative form, a specific implementation using this method can traverse the cumulative counter table in a straightforward manner until the boundary of the next bucket is below 'n' (i.e., until the value of the counter table element is less than 'n'). Buckets corresponding to counter table elements with values less than 'n' potentially contain the desired records, and they should be processed in subsequent steps (passes, rounds, or stages) of the sorting process. However, all other buckets corresponding to counter table elements with values exceeding 'n' can be discarded (in such case after moving or relocating the records) as they are deemed to be irrelevant. These buckets will not participate in the further sorting process when using this method.

Next, the sorting algorithm, method, or scheme in a specific implementation performs the redistribution (relocation) of records so that they are placed within the boundaries of the buckets corresponding to their keys. This corresponds to the usual logic of working with the base algorithm of radix, bucket, or interval sorting, in which, under MSD order of movement by key, there exists a solution for redistributing (moving, relocating) records between the buckets—either in-place, or by moving them to a new array or another data structure, by concatenating (merging) certain data structures (such as lists), or in some other manner.

We note that in specific implementations based on the use of a counter table, this record redistribution phase also handles records related to buckets that are not of interest, as the records are not yet within the buckets corresponding to their keys before the start of this record redistribution phase.

If only a limited subset of buckets is of interest (e.g., only one of the buckets), then, at the discretion of an engineer skilled in the art, a specialized algorithm such as the partition step from the classic quicksort algorithm or its modifications, Dutch National Flag sorting, etc., can be used for the redistribution (movement) of records between the buckets. In this context, the methods described in the sections "Optimization of Verification that a Record Belongs to a Bucket" and "Optimization of String Comparison in Presence of Common Prefix" can be utilized.

Thus, we have described some specific implementations of the method (algorithm, program, software, system, scheme, circuit, logic block or device that uses said method) for partially ordering radix, bucket, or interval sorting, which are characterized by the fact that, when not all non-empty buckets fall into the set of buckets of interest for further processing, then, at least at one step of sorting, the ordering of the sorted subset of records is performed using the certain sorting process implementation, which does not guarantee ordering for records whose keys do not correspond to the buckets included in the set of buckets of interest for further processing.

It is also noted that, when using the proposed methods and at the discretion of an engineer skilled in the art, the buckets of interest (i.e., those affected by the target subset of records) can be collected in any part of the sorted data structure, not necessarily in the positions that the original (unmodified) sorting algorithm would have used. For example, the records of these buckets can be gathered at the beginning of an array, even if they would have been placed somewhere in the middle in a fully sorted array. Specifically, this can be achieved by modifying the array of counters, presented in cumulative form, or by other means. An engineer skilled in the art determines the arrangement of the bucket grouping (if used) and its implementation method.

Thus, we describe a novel method (algorithm, program, software, system, scheme, circuit, logic block or device that uses said method) of partial sorting based on radix sort, bucket sort, or interval sort that is characterized by collecting target records at a certain step or stage of its operation and placing them at the beginning, end, or any other desired area within the sorted array or data structure, even if in a fully sorted set these target records would have been located elsewhere, achieved by changing the positions of buckets representing the buckets of interest during the sorting process while ignoring other buckets that are not of interest and will be discarded at said step or stage of operation.

Additionally, especially if a modification of the in-place sorting method is used, and/or if the conditions of the task for which this specific implementation is made allow for the destruction of the original data structure or its content, special modifications of the sorting methods and/or specific implementations of the phase (step) of record redistribution (relocation, movement) can be used, which do not preserve the data structure or its content outside the areas of the final arrangement of the buckets of interest.

After completing the actions for the redistribution or movement of records between the buckets at this step (round, pass, or stage), or other actions for ordering records at this step, the sorting implementation can proceed to the next (subsequent) step (round, pass, or stage) either recursively or in some other manner (at the discretion of an engineer skilled in the art), performing processing for each of the buckets of interest but discarding (ignoring) all other buckets. This avoids processing them in subsequent stages and eliminates the need to access the corresponding records and their keys any further.

Furthermore, further processing may differ for "edge" buckets of interest (for which it is not known whether they are fully covered by the target subset of records), and "middle" buckets located between them (and fully covered by the target subset). Specifically, at the discretion of an engineer skilled in the art, sorting may be stopped for "middle" buckets if, based on the problem's conditions, processing their contents can be completed on a not fully ordered target subset.

If the partial ordering is performed to extract the target subset of records whose position or boundaries cannot be determined in advance without analyzing the values of the keys themselves, then, in addition to or instead of analyzing the positions of the buckets, an analysis of the computed boundary or real (corresponding to real data) boundary values of keys within each potentially interesting bucket can be performed. Alternatively, a full analysis of the keys of the records entering each potentially interesting bucket can be performed.

This can be accomplished, for example, by comparing key values, or by comparing individual digits or symbols extracted from the key values that describe the target subset of records with computed or real boundary (limiting for that specific bucket) values of keys, digits, or characters (symbols) characterizing the buckets.

In certain tasks, instead of or in conjunction with analyzing boundary values to determine whether a bucket is of interest or falls outside the target subset of records, it may also be necessary to access the keys of the records comprising that bucket for certain computations and analysis. In this case, the specific implementation will access the keys of the records at this stage of bucket analysis, as determined by an engineer skilled in the art. However, since a portion of buckets (analyzed in the current pass) will be discarded as uninteresting, the corresponding records will not participate in subsequent similar analysis in the subsequent stages (subsequent passes, rounds, or steps) during the further sorting process.

If real record keys (not just computed boundary key values characterizing the buckets and other computed quantities) are used in the described analysis of the buckets, such analysis should be performed after the redistribution (movement, relocation) of records between the buckets or other relevant actions for ordering records at given stage (pass, round, or step) but before the start of the recursive or other (at the discretion of an engineer skilled in the art) processing of the buckets themselves on the subsequent pass (to exclude further processing of buckets that, based on the analysis, will be classified as not of interest), or at the beginning of processing a bucket at a new stage—before other actions related to further sorting.

At the discretion of an engineer skilled in the art, in particular, with certain forms and methods of specifying the boundaries of the target subset, for which the methods described in this section are used, a combination of both techniques described above also may be used (with the analysis of bucket boundaries, in particular, through the analysis of elements of the counter table presented in cumulative form, and with the analysis of key values of the records forming the buckets)—to determine the subset of buckets that are of interest for further processing.

Sorting using the methods described above can be prematurely stopped, both globally (completely) and within individual buckets, based on certain conditions determined by the engineer skilled in the art, in accordance with the specifics of their specific implementation and/or the requirements of the task.

For example, if a bucket is entirely within the location of the target subset of records, it may not need further ordering (depending on the task's conditions for which this method is used). For instance, if (based on the task's conditions) records from the target subset can be returned or processed in any order, and the bucket is entirely within the target subset, then it may not require sorting in subsequent stages (rounds, passes or steps)—the sorting of this specific bucket can be stopped at this stage as soon as full coverage is detected.

Alternatively, further processing may not be necessary if a sufficient number of records (according to the task's conditions) have already been extracted or found during the algorithm's operation. In a specific case, processing may stop when a single record is found that needs to be returned or processed.

Detailed Descriptions of the Drawings (Schemes of Several Embodiments of the Described Inventions)

The drawings below illustrate some possible specific implementations of algorithms, programs, software, methods, systems, schemes, logic blocks, or devices that perform sorting, searching, or other data processing using the solutions described in this patent application.

These drawings are intended to help the engineer skilled in the art to understand the essence of the solutions presented in the patent application and some specific ways of their specific implementation. However, these drawings are not a replacement for the main text of the patent application, and they do not provide an exhaustive or complete overview of all possible specific implementations (embodiments) of the solutions described in the patent application.

In same time, these drawings can be considered as supplementary material to the main text of the patent application, containing additional solutions and innovations.

We note that while these examples provide valuable insights, they should not be regarded as the sole authoritative source of information for the described methods and techniques beyond the scope of additional matter. In case of any discrepancies between the content in this section and the main part with description of the inventions, preference will always be given to the material that allows for a broader interpretation of the invention.

FIG. 1

This figure illustrates the operation of software or a computational device scheme implementing a method of reducing resolution, converting a counter table with higher resolution to a counter table corresponding to lower resolution. In particular, this new table can be used in a standard or enhanced method, algorithm, or device for radix, bucket, or interval sorting, instead of the original counter table.

The figure shows the original array of counters (denoted as 100) representing a counter table, constructed with increased resolution (larger digit capacity or information capacity of the digits or symbols). In this example, the array is divided into multiple groups of four elements each, such as the groups denoted as 110, 111, and 112 (boundaries between these groups are represented by solid lines, and boundaries between individual elements within the groups are represented by dashed lines).

While this patent application describes a general method that supports arbitrary groupings, the scheme in this figure demonstrates a specific implementation with fixed-size groupings of four elements each. This corresponds to a counter table whose initial resolution is four times higher (or two bits more) than the resolution used in the subsequent stages of the sorting algorithm (e.g., at the stage where elements corresponding to different buckets are relocated (redistributed) or where lists corresponding to different buckets are merged).

While this patent application describes a general method that supports arbitrary groupings, the scheme in this figure demonstrates a specific implementation with fixed-size groupings of four elements each. This corresponds to a counter table whose initial resolution is four times higher (or two bits more) than the resolution used in the subsequent stages of the sorting algorithm (e.g., at the stage where elements corresponding to different buckets are relocated (redistributed) or where lists corresponding to different buckets are merged).

The values of elements (i.e., counter values) from each group are summed through addition operations or hardware adders (in hardware implementation). These addition operations or adders are denoted as 300, 301, or 302 in the figure.

While it is more convenient to schematically represent each summation as a separate operation as illustrated in this figure, the specific implementation may perform these summations in a loop that sequentially processes groups of elements or in multiple parallel loops. Alternatively, vector (SIMD) operations can be used. The figure illustrates the essence of the method described in this patent application, showing only the substantive operation of summing elements within a group. Other auxiliary operations required in a specific implementation to organize the summation loop or to facilitate parallel data processing are not shown, since the specific implementation of these operations does not constitute the essence of the present invention.

In the case of hardware implementation, an adder for each group can be implemented as a separate logic element or a combination of logic elements. Alternatively, a hybrid implementation may combine parallel operation of several hardware adders with a higher-level loop implemented in software or microcode (an example of such implementation could be a loop utilizing vector or SIMD operations for parallel data processing).

The sums of elements from the original groups represent the values of elements in the resulting transformed counter table, which will be subsequently used by the sorting algorithm (e.g., for redistributing or relocating elements corresponding to different buckets or for merging lists corresponding to different buckets). These values of elements in the new counter table are denoted as 210, 211, and 212, and the resulting counter table is denoted as 200 in the figure.

An engineer skilled in the art can adapt this figure into a scheme for processing using an index table (in a similar implementation of this method applied to the index tables). In this case, the counter table should be replaced with an index table, and the adders should be replaced with list merge or concatenation operators (or other data structure operations corresponding to the elements of the index table).

FIG. 2

This figure illustrates the operation of software or a computational device scheme implementing a method of reducing resolution, converting a counter table with higher resolution to a counter table corresponding to lower resolution. In particular, this new table can be used in a standard or enhanced method, algorithm, or device for radix, bucket, or interval sorting, instead of the original counter table. In this specific implementation, the transformed table is placed in the same memory area as the original table with higher resolution.

The illustration shows the original array of counters, constructed with increased resolution, divided into three hypothetical parts.

The first part, denoted as 100, contains the yet-to-be-processed portion of counters. The reading pointer (register or variable) denoted as 600, points to the start of this part. The array of counters in this part is divided into multiple groups of four elements each, such as the group of four counters denoted as 110.

While this patent application describes a general method that supports arbitrary groupings, the scheme in this figure demonstrates a specific implementation with fixed-size groupings of four elements each. This corresponds to a counter table whose initial resolution is four times higher (or two bits more) than the resolution used in the subsequent stages of the sorting algorithm (e.g., at the stage where elements corresponding to different buckets are relocated (redistributed) or where lists corresponding to different buckets are merged).

The values of elements (counters) from the current group (denoted as 110) are summed through an addition operation or a hardware adder, represented as 300 in this figure.

While it is more convenient to schematically represent each summation as a separate operation as illustrated in this figure, the specific implementation may perform these summations in a loop that sequentially processes groups of elements or in multiple parallel loops. Alternatively, vector (SAID) operations can be used. The figure illustrates the essence of the method described in this patent application, showing only the substantive operation of summing elements within a group. Other auxiliary operations required in a specific implementation to organize the summation loop or to facilitate parallel data processing are not shown, since the specific implementation of these operations does not constitute the essence of the present invention.

In the case of hardware implementation, an adder for each group can be implemented as a separate logic element or a combination of logic elements. Alternatively, a hybrid implementation may combine parallel operation of several hardware adders with a higher-level loop implemented in software or microcode (an example of such implementation could be a loop utilizing vector or SIMD operations for parallel data processing).

The result of this summation, denoted as 500, is written into another part of the array (denoted as 400), which contains elements that have already been processed earlier. Specifically, the result of summing the elements from the group denoted as 110 is stored in a cell in this part of the array, denoted as 410.

This part of the array contains elements from groups that have already been processed (summed) earlier, and thus, it can be used to store the results of new summations. The writing pointer (register or variable) denoted as 610 in the illustration, points to the start of this part of the array, which contains the previously processed elements. It can be considered as pointing to the current working element for writing new data (denoted as 410 in the illustration). It is precisely in this cell that the new summation result (denoted as 500 in the illustration) will be stored.

The second part of the array (denoted as 200) shows the already-written sums of counters, representing the values of the new counters (in this example, the sums of counters taken from the original array constructed with higher resolution).

Upon the completion of this specific implementation, this part of the array will contain the resulting (transformed) counter table, which can be used in a standard or enhanced method, algorithm, or device for radix, bucket, or interval sorting. One of the cells in this transformed array, containing the counter value that may be used in the subsequent stage of the sorting algorithm, is denoted as 210 in the illustration.

At the end of the process, the writing pointer (denoted as 600) will point to the first cell in the array beyond the end of the area with the final counter table (this final counter table denoted as 200).

This method can be implemented in different ways with slight modifications to the scheme. For instance, the original array of counters may be processed in reverse order, and then the final (transformed) table will be located at the end of the array. Alternatively, the writing pointer may point to the last cell that has already been written, instead of pointing to the next cell where the next entry will be made. And so on. Decisions on such modifications are made by the engineer skilled in the art.

This figure can also be adapted into an implementation scheme for an index table (similar to FIG. 1).

FIG. 3

This figure illustrates the operation of software or a computational device in which a method is implemented for the rapid evaluation of a specific optimization criterion (particularly for assessing workload or cache memory load in a computing system) or for computing a characteristic of the processed subset of records, as detailed in the section "Fast Evaluation of Optimization Criteria or Characteristics".

The figure depicts the processing scheme for a single individual element taken from the counter table (or index table) and denoted as 110 in the illustration.

It is important to emphasize that, as determined by an engineer skilled in the art, the value denoted as 110 in the figure may also represent another value extracted or computed using information taken from the counter table or index table's element, which could include a value from a field of such a data structure if the counter table or index table contains data structures with multiple fields.

In most of real specific implementations of the data processing method depicted in this figure, it is typically applied sequentially or in parallel to all elements of the processed counter table or index table or to a specific subset of elements from such a table. For example, this method may be applied sequentially to the elements of the counter table or index table until the processing is halted in the manner described in the section "Determining Optimal Information Capacity and Termination Criterion for Downsampling Algorithm".

The original value of the current counter (denoted as 110 in the figure) is fed into a function or part of the scheme denoted as 330.

In this example, the function denoted as 330 returns an integer value representing a logarithmic function's result. Specifically, it could be a function to compute an integer (possibly rounded) value of a logarithm, a function to determine the leading bit position, a function to count the number of leading or trailing bits equal to zero or one, and so on (refer to the definition of the logarithmic function in the beginning of the detailed description of the invention)—as chosen by an engineer skilled in the art, depending on their selected semantics for the counter table, data representation (encoding) method, and other factors.

We emphasize that the logarithmic function applied to the value of the original counter in this figure is used to illustrate one of the possible applications of this invention. However, in other specific implementations, an engineer skilled in the art may replace this block (denoted as 330 in the figure) with any other suitable function, as described in detail in the section "Fast Evaluation of Optimization Criteria or Characteristics".

Furthermore, we emphasize that, at the discretion of an engineer skilled in the art, the function denoted as 330 in the figure can be applied either to the complete numerical value of the key or only to a specific portion of this value. This allows, in particular, for recursive application of this method at different steps or stages in the sorting or searching process.

The output of the calculation block, denoted as 330, i.e., in this case, the result of the logarithmic function computation, is indicated as 510 in the figure. This result is then used as an index that selects a row denoted as 700 (represented by a dashed line) in two arrays denoted as 710 and 720.

Array denoted as 710 contains the sums of counters corresponding to a specific value of the logarithmic function, while array denoted as 720 accumulates information about the number of counters corresponding to that value of the logarithmic function.

Next, modifications are made to the values of two elements in these arrays, denoted as 711 and 721. The element denoted as 711 contains the sum of counters corresponding to a given value of the logarithmic function (denoted as 510 and corresponding to row 700). The element denoted as 721 contains the count of such counters corresponding to the given value of the logarithmic function (denoted as 510 and corresponding to row 700).

The value of the element denoted as 711 is then added to the original value of the counter table's element (denoted as 110) using a summation operation or summation scheme denoted as 310.

Additionally, the value of the element denoted as 721 is incremented by one, for example, by adding a constant equal to one, denoted as 520 in the figure, using a summation operation or summation scheme denoted as 320.

The increased values, i.e., the results of summation using the elements denoted as 310 and 320, are then written back into the corresponding elements of tables 710 and 720, denoted as 711 and 721 (from which the original values were taken).

Consequently, the table denoted as 710 on figure gradually accumulates the sum of counter values corresponding to specific values of the logarithmic function, while the table denoted as 720 accumulates information about the count of such counters (which were summed to obtain the values of corresponding elements in the table denoted as 710).

When all elements of the original counter table have been processed as shown in this figure, or when a portion of such values has been processed according to a certain stopping criterion (e.g., as described in the section "Determining Optimal Information Capacity and Termination Criterion for Downsampling Algorithm"), the information accumulated in the tables denoted as 710 and 720 can be used for evaluating a specific optimization criterion (particularly for assessing workload or cache memory load in a computing system) or for computing a characteristic of the processed subset of records. This evaluation process is discussed in detail in the section "Fast Evaluation of Optimization Criteria or Characteristics".

This figure also illustrates method (algorithm, program, software, system, scheme, circuit, logic block or device that uses said method) that is characterized by the use of computing the value of a certain function, hereinafter referred to as a "compression function" that maps the original set of possible values of a certain selected quantity characterizing the elements of an original set of objects into a more compact set of values, with the purpose of using such computed values of said compression function for indexing or addressing a certain auxiliary data structure, the elements of which are used for the accumulation of any information obtained or computed using arbitrary values that characterizing the elements of the original set of objects, or for counting the number of such elements of the original set of objects that correspond to certain computed value or values of said compression function, possibly in combination with other criteria.

FIG. 4

This figure illustrates the operation of software or a computational device in which a method is implemented for evaluating a certain optimization criterion (such as workload volume or cache memory load in a computational system) or for computing characteristics of a processed subset of records. This method can also be used for evaluating (determining) the optimal information capacity (e.g., optimal digit capacity, bit depth or radix) of digits or symbols.

The figure also demonstrates the use of a termination criterion for early stopping the computation of this evaluation (including the use of a criterion for the early termination of the downsampling algorithm).

These methods are discussed in more detail in the sections "Determining Optimal Information Capacity and Termination Criterion for Downsampling Algorithm" and "Fast Evaluation of Optimization Criteria or Characteristics".

The figure shows the processing scheme of characteristics for a single record, bucket, or individual group of buckets or records (for example, grouped as described in the section "Fast Evaluation of Optimization Criteria or Characteristics").

Each record, group of records, bucket, or group of buckets corresponds to a set of characteristics that can be read from data structures or computed using information taken from sortable records, counter tables, or index tables, or from an accumulating auxiliary data structure describing a group of buckets or records (as described in the section "Fast Evaluation of Optimization Criteria or Characteristics").

Figure 3:
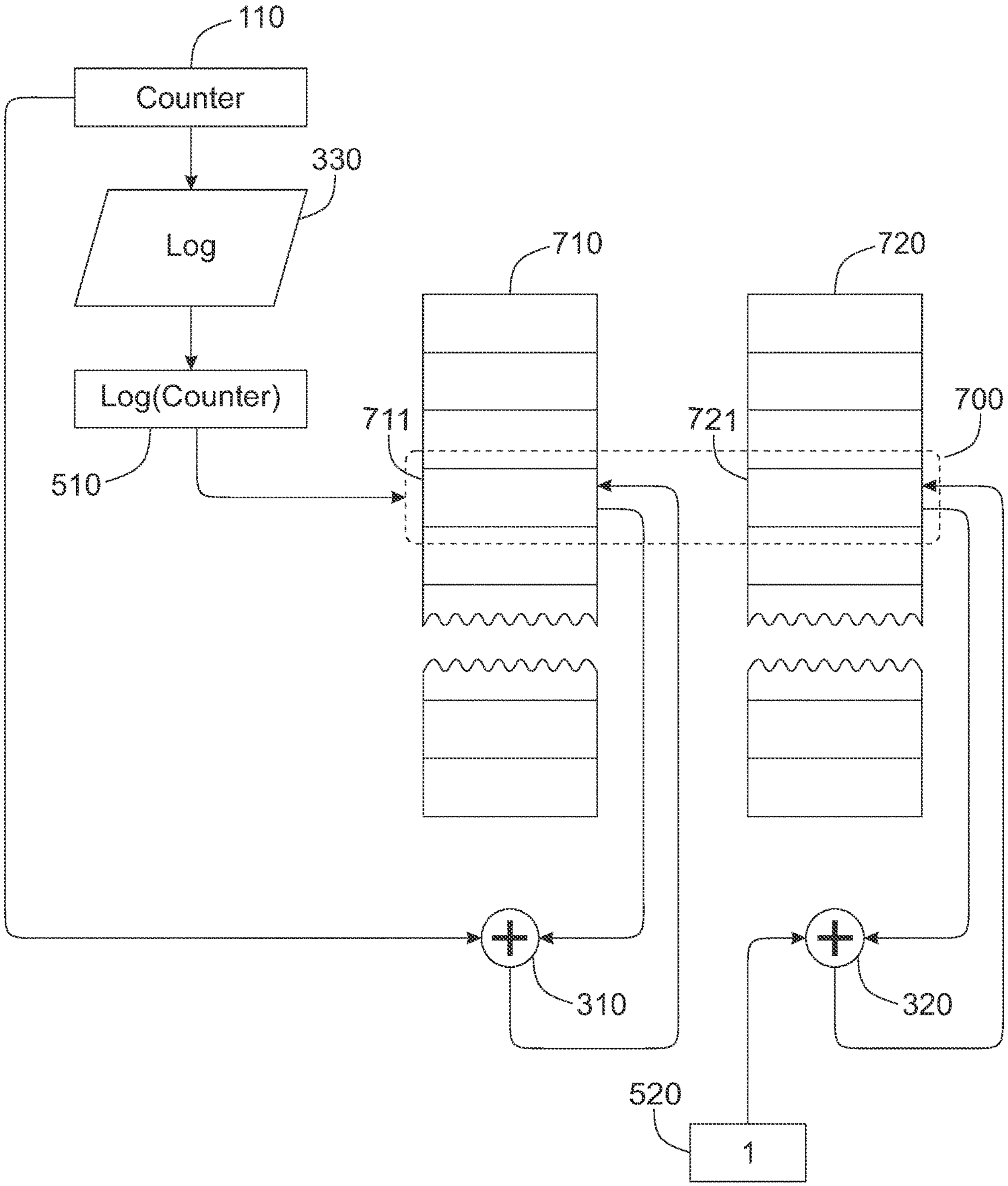
Figure 4:
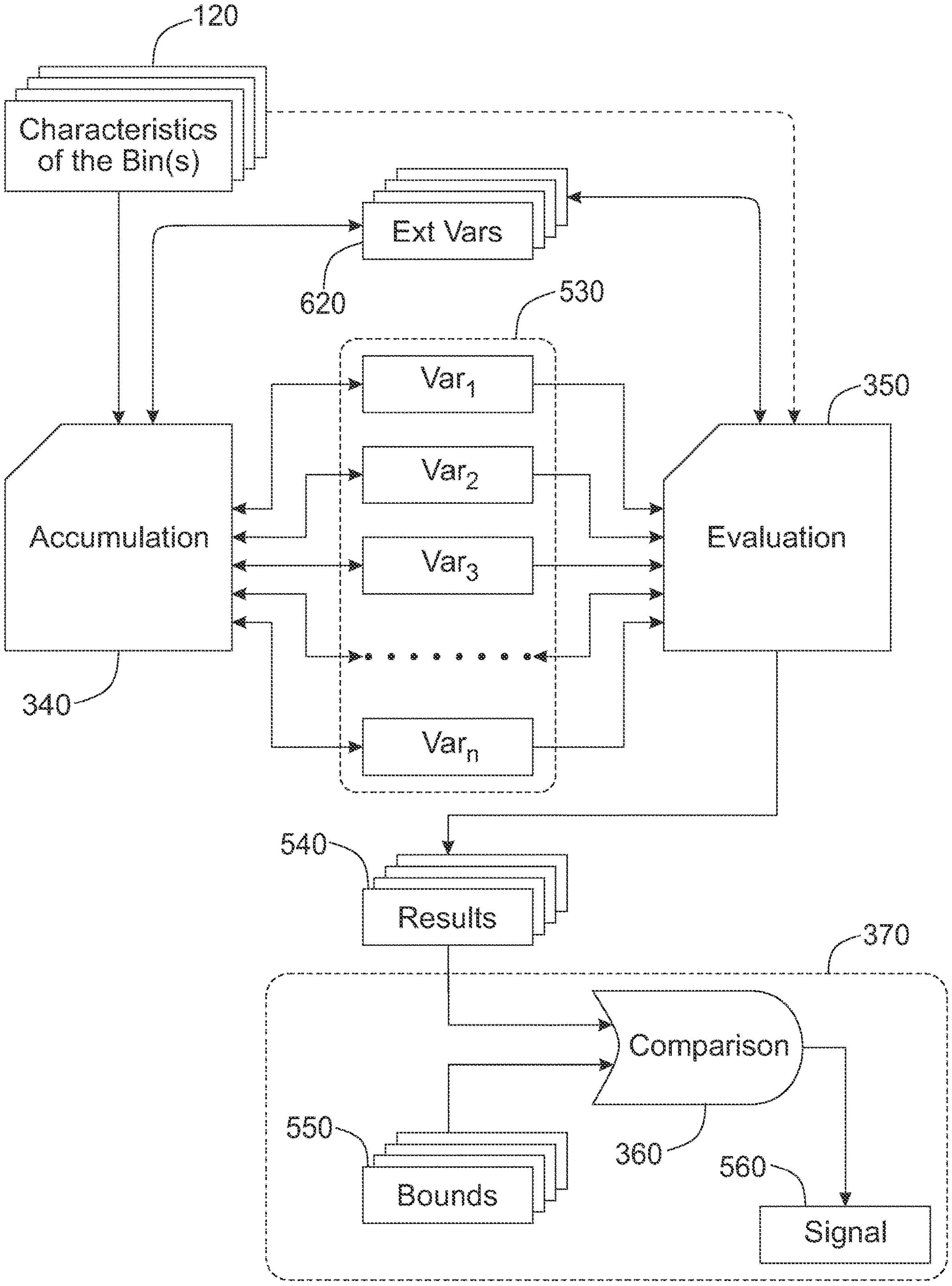
Figure 5:
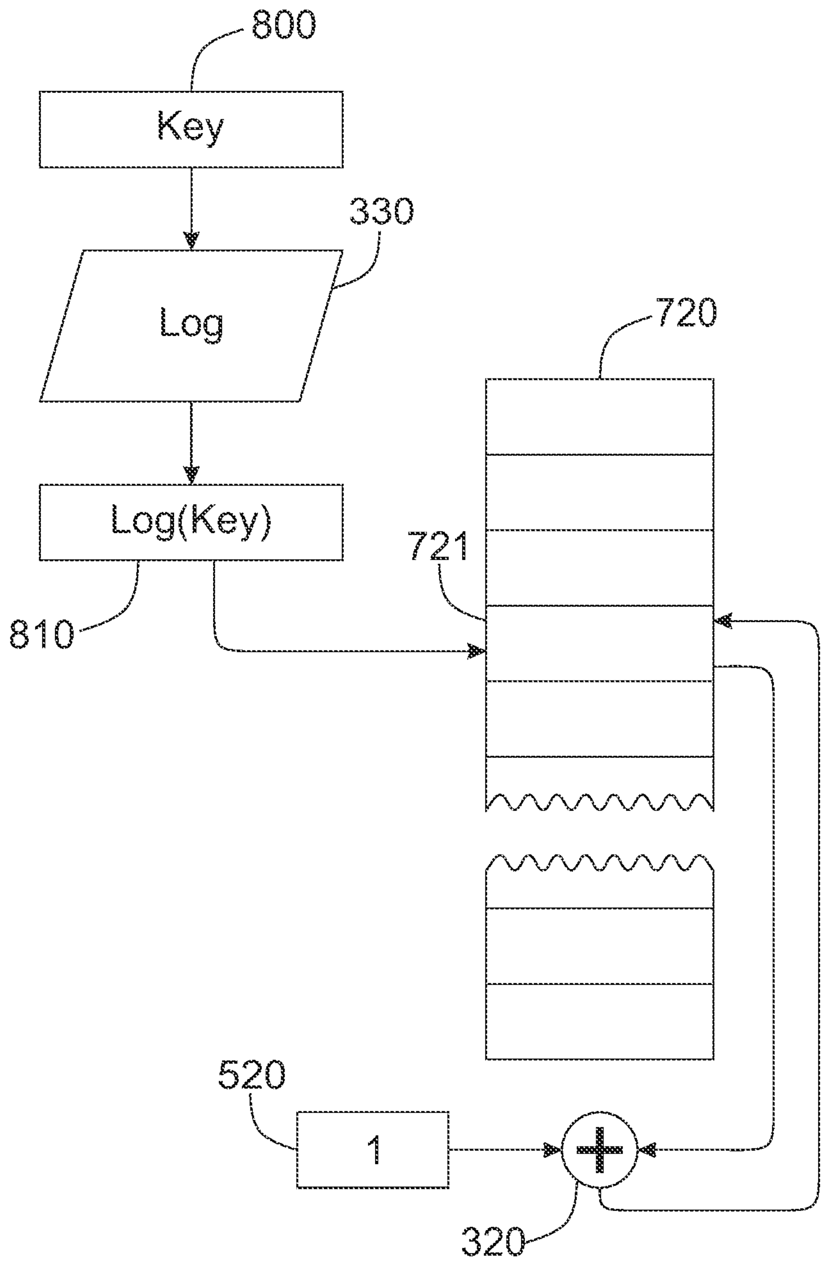

In the simplest case, when this technique is applied to a classic counter table, where each element corresponds to one bucket, and each bucket is characterized by a single value—the number of records falling into that bucket. This number of records is precisely the value stored in the counter table element. In more complex implementations, a bucket (or a group of buckets) can be described by another characteristic or a set of characteristics. For example, if the simple solution described in the section "Fast Evaluation of Optimization Criteria or Characteristics" is used in combination with a classic counter table and a logarithmic function for bucket grouping (as shown in FIG. 3), then each group of buckets will be characterized by two values—the total length (volume) of that buckets in the group and the number of non-empty buckets constituting to the group (where the bucket sizes correspond to a certain value of the logarithmic function).

The set of characteristics for a record, bucket, group of records, or group of buckets as processed in this figure, is denoted as 120.

As mentioned earlier, in the simplest case, this will be a single characteristic representing the counter value read from the counter table. However, when grouping buckets using a logarithmic function of their size is used, there will be two characteristics the total length (total volume) of buckets in the group and the number of non-empty buckets in that group. In a more general case, the set of characteristics denoted as 120 will consist of several different characteristics, such as the number, weight, index, or other identifier of the bucket or group of buckets, the value(s) of digit(s) or symbol(s) corresponding to the bucket(s) or group of records, statistical characteristics of keys falling into that bucket(s) or group of records, and so on.

In most of real implementations of the data processing method depicted in this figure, it is typically applied sequentially or in parallel to all buckets, records, groups of buckets, or groups of records—for example, to all elements of the processed counter table or index table, to all elements of the accumulating auxiliary data structure, or to some subset of such elements. For instance, this method can be sequentially applied to the elements of the counter table or index table until the processing is stopped according to the method described in the section "Determining Optimal Information Capacity and Termination Criterion for Downsampling Algorithm".

The initial values of characteristics for each bucket, record, group of buckets, or groups of records denoted as 120 are input into a function or a part of the scheme denoted as 340.

This block, denoted as 340 in the figure, uses the values of characteristics of record, bucket, group of records, or group of buckets (denoted on figure as 120) and as result of operation computes or updates the values of a set of variables denoted as 530. The variables var(1), var(2), . . . , var(n) consisting of this set are outlined with dashed lines in the figure.

We emphasize that these variables do not necessarily have to be scalar quantities; they can also be arrays or other data structures. The specific implementation of this block and the specific set of computed or updated variables are determined by the engineer skilled in the art.

The semantic purpose of block 340 is to accumulate useful information, such as buckets characteristics, as detailed in the sections "Determining Optimal Information Capacity and Termination Criterion for Downsampling Algorithm" and "Fast Evaluation of Optimization Criteria or Characteristics".

Next, the values of the variables denoted as 530 are used (passed as input) into another block (function, or part of the scheme) denoted as 350, which is tasked with computing the final evaluations (estimations).

This block, denoted as 350 in the figure, utilizes the values of variables that accumulate information about buckets, records, groups of buckets, or groups of records to compute one or more resulting values representing evaluations for optimization criteria and/or general characteristics of the processed subset of records or buckets. These resulting evaluation values are denoted as 540 in the figure. These results can be scalar variables, or can be data structures (e.g., arrays).

The engineer skilled in the art determines the specific implementation of this block and the specific set of results.

The results of this block's operation may include the value of the optimal radix, bit depth, digit capacity or information capacity of digits or symbols, which can be used at some step or steps (round(s), pass(es), or stage(s)) of the sorting process, evaluation of optimization criteria (e.g., workload volume or cache memory load in the computing system), and/or values (evaluations) of other characteristic(s) of the processed records or buckets or groups of thereof.

In general, the block responsible for computing the final evaluations for optimization criteria and/or characteristic(s) of the processed set of records (or buckets), denoted as 350, only reads the information accumulated by block 340, but does not modify it. However, at the decision of the engineer skilled in the art, this block may change the values of some (or all) accumulated characteristic(s)—this symbolically denoted by a two-sided arrow leading to some variables denoted as ellipsis ( . . . ) in the figure.

The block for computing the final evaluations, denoted as 350, may also take as input some initial characteristic(s) of the processed buckets, records, or their groups, denoted as 120. This is indicated in the figure by the dashed arrow between blocks 120 and 350, emphasizing that this use is optional and depends on the decision of the engineer skilled in the art implementing the described methods.

Both blocks denoted on this figure as 340 and 350 may use additional optional parameters represented by the block of external variables (not necessarily scalar), denoted as 620, during their operation. These variables may also be updated during the execution of this method.

In the depicted process, all or some of the computed estimates or characteristics denoted as 540 in the figure (results of the block denoted as 350) can be fed into the input of a comparison block, denoted as 360. This comparison block may also take into account the values of certain constraints, denoted as 550 in the figure.

By comparing the obtained estimate(s) or characteristic(s) with the boundary conditions (including with the constraints denoted as 550), the comparison block, denoted as 360, generates a stop signal, denoted as 560 in the figure. The specific value of this stop signal can serve as an indication to stop further computations.

For instance, early termination of computations can be performed when the estimate of the cache memory load becomes acceptable in terms of performance for the subsequent data processing stage. Alternatively, or in conjunction with, early termination can occur when the estimate for the optimal radix, bit depth, digit capacity or information capacity of digits or symbols falls below a certain threshold value.

The comparison block and the computation of the stop signal are optional, so they are depicted in a dashed box on the figure and collectively denoted (labeled) as 370. The decision to include these components depends on the judgment of the engineer skilled in the art implementing the described methods.

FIG. 5

This figure illustrates a key aspect of the operation of software, a scheme, or a computational device implementing the logarithmic sorting method, which is detailed in the section "Logarithmic Sorting". It also demonstrates a key aspect in constructing an index for one of the fast information retrieval methods described in the section "Logarithmic Search and Indexing". Additionally, if the logarithmic function (denoted as 330 in the figure) is replaced with another normalizing function, the figure can be interpreted as illustrating the method of preparing a counter table for sorting or searching using key normalization, as described in the section "Normalization of Data in Sorting or Search".

The scheme shown in the figure depicts the formation of a counter table denoted as 720. The process of forming this table is demonstrated using the example of processing a numerical key value extracted or computed using the information contained in a record taken from the sortable subset of records being analyzed or processed at a certain step or stage (round, pass) in the sorting or indexing process. This key value is denoted as 800 in the figure.

In most of real implementations of the data processing method depicted in this figure, it is typically applied sequentially or in parallel to all elements of the subset of records being processed or analyzed at given step or stage (round, pass). However, early termination of such processing is possible, for example, if the analysis of the counter table (or index table, if the scheme is changed accordingly) is performed during construction and allows for early termination, as described in the section "Determining Optimal Information Capacity and Termination Criterion for Downsampling Algorithm".

The initial numerical key value taken (extracted) or computed using the information contained in an individual record (denoted as 800) is input into a function or a part of the scheme denoted as 330.

In this example, the function denoted as 330 returns an integer value representing a logarithmic function's result. Specifically, it could be a function to compute an integer (possibly rounded) value of a logarithm, a function to determine the leading bit position, a function to count the number of leading or trailing bits equal to zero or one, and so on (refer to the definition of the logarithmic function in the beginning of the detailed description of the invention)—as chosen by an engineer skilled in the art, depending on their selected semantics for the counter table, data representation (encoding) method, and other factors.

It is important to note that the logarithmic function of the numerical key value is used in this figure to illustrate one of the possible applications of this invention. In other specific implementations, the engineer skilled in the art can replace this block (denoted as 330) with any other suitable function, as described in the sections "Logarithmic. Sorting", "Logarithmic Search and Indexing" and "Normalization of Data in Sorting or Search".

Furthermore, we emphasize that, at the discretion of an engineer skilled in the art, the function denoted as 330 in the figure can be applied either to the complete numerical value of the key or only to a specific portion of this value. This allows, in particular, for recursive application of this method at different steps or stages in the sorting or searching process.

The output of the calculation block, denoted as 330, i.e., in this case, the result of the logarithmic function computation, is indicated as 810 in the figure. This result (denoted as 810 in the figure), is further used as an index, selecting a specific element of the counter array (denoted as 720 in the figure). This selected element of the counter array is denoted as 721 in the figure.

The counter array denoted as 720 contains counters of records corresponding to a certain value of the logarithmic function. Each element of this array accumulates information about the number of records whose keys correspond to a specific value of the logarithmic function.

The element of this counter array denoted as 721 in the figure corresponds to the value of the logarithmic function denoted as 810 in the figure.

Subsequently, the value of this element (denoted as 721 in the figure) is modified by increasing it by one, for example, by adding a constant equal to one, denoted as 520 in the figure, using a summation operation or summation scheme denoted as 320.

The increased value of the counter (the result of adding one to the counter value using the element denoted as 320 in the figure) is written back into the corresponding element of the counter table (from which the original value was taken before adding one), denoted as 721 in the figure.

Thus, the table denoted as 720 gradually accumulates information about the number of records whose keys correspond to specific values of the logarithmic (or other) function denoted as 330 in the figure.

When all elements of the subset of records being analyzed or processed at this step or stage (round, pass) are processed in the manner depicted in this figure or when a part of such values (elements) is processed according to a termination criterion, for example, as described in the section "Determining Optimal Information Capacity and Termination Criterion for Downsampling Algorithm" the information accumulated in the table denoted as 720 can be used to order the records as done in the radix, bucket, interval, or other similar types of sorting (possibly in combination with other solutions from this patent application).

Alternatively, resulting table can be transformed into a cumulative form and used to accelerate the search, as described in the section "Logarithmic. Search and Indexing". Of course, the transformation to cumulative form can be used in the sorting process as well.

Alternatively, the resulting table can be used for other purposes, or in some other search or sorting method, or in another modification of radix, bucket, or interval sorting. Including methods such as described in the section "Normalization of Data in Sorting or Search".

An engineer skilled in the art can adapt this figure into a scheme for processing using an index table (in a similar implementation of this method applied to the index tables). In this case, the counter table should be replaced with an index table, and an increment of its element by one will be replaced by an operation of incorporating (adding, merging) the record into the bucket (represented by the corresponding element of the index table) corresponding to the value of the logarithmic function.

The invention claimed is:

1. An apparatus that executes a method for sorting or searching that is characterized by performing a transformation or rebuilding of an old, or construction of a new counter table (particularly a table that contains information about the number of records whose keys contain a certain digit or symbol value, or information about the frequency at which digits or symbols occur in the subset of records being sorted, or information about the statistical characteristics of their distribution, or properties of the distribution of the key values themselves); or is characterized by performing the transformation or rebuilding of an old, or construction of a new index table (particularly a table with references to lists of records or other data structures enumerating records); whereby said transformation or rebuilding of an old, or construction of the new counter table or index table is performed during the sorting process and utilizes the information contained in the values of the original counter table or index table elements, or information derived using these values taken from the original tables.

2. An apparatus that executes a method for determining the optimal information capacity, digit capacity, bit depth, or radix of digits or symbols that is characterized by computing or determining the optimal information capacity, digit capacity, bit depth, or radix of digits or symbols using information extracted from the elements of the counter table or index table during sorting or searching.

3. An apparatus that during sorting or searching executes a method for determining an optimal information capacity, digit capacity, bit depth, or radix of digits or symbols that is characterized by utilizing an analysis or transformation of a counter table or an index table to determine the optimal information capacity, digit capacity, or bit-depth of digits or symbols, achieved through a function that incorporates information obtained from said analysis or transformation, or based on the fact that the sequence of iterations in said analysis or transformation is terminated.

4. An apparatus that executes a method for sorting or searching that is characterized by utilizing information extracted from a counter table or an index table to determine the termination criterion of an iterative algorithm for transforming the counter table or the index table, enabling the subsequent use of a different information capacity, digit capacity, bit depth, or radix for digits or symbols at a certain step or steps in the process of sorting, searching, or other data processing.

5. An apparatus that during sorting, searching, or building auxiliary tables or data structures therefor, executes a method for evaluating some optimization criterion (such as the estimated workload or cache memory load of a computational system) or for estimating a characteristic of the processed set of records that is characterized by using accumulation of information in an auxiliary data structure, where the elements of said auxiliary data structure correspond to groups of buckets, groups of elements of the counter table, or groups of elements of the index table, and these buckets, or elements of the counter table, or elements of the index table within each group correspond to a certain set or a certain range of values of a some feature that characterizes these buckets or elements of the table.

6. An apparatus that during sorting, searching, or building auxiliary tables or data structures therefor, executes a method for processing set of buckets, element of counter table, or elements of index table that is characterized by the accumulation of values of a certain characteristic or set of characteristics for those buckets or for those elements of the counter table or index table that have similar values of a certain selected feature characterizing these buckets or elements of the counter table or index table, regardless of the purpose and manner in which the information accumulated in this way will be subsequently used.

7. An apparatus that during sorting, searching, or building auxiliary tables or data structures therefor, executes a method for processing set of object that is characterized by the use of computing the value of a certain function, hereinafter referred to as a "compression function" that maps the original set of possible values of a certain selected quantity characterizing the elements of an original set of objects into a more compact set of values, with the purpose of using such computed values of said compression function for indexing or addressing a certain auxiliary data structure, the elements of which are used for the accumulation of any information obtained or computed using arbitrary values that characterizing the elements of the original set of objects, or for counting the number of such elements of the original set of objects that correspond to certain computed value or values of said compression function, possibly in combination with other criteria.

8. An apparatus that executes a method for sorting or searching, characterized by the utilization of a normalization of the numeric values of the keys or normalization of the values of information extracted or derived from them before their use in the sorting or searching process, where such normalization is performed by applying a certain function to the numeric values of the keys or to the values of information extracted or derived from them, which modifies such characteristic as the range, statistical or probabilistic distribution, length or form of representation, structure, nature, or pattern of digit or symbol distribution for the normalized values, or modifies a combination of two or more of these characteristics.

9. An apparatus that executes a method for sorting that is characterized by utilizing the computation of a logarithmic function, a function for determining the value or extracting the biased or unbiased value of an exponent, a function for determining the position or location of the leading or trailing bit, digit, or symbol in a representation or notation of the numeric value, a function for counting the number of significant bits, digits, or symbols in the representation or notation of the numeric value, a function for determining the length of the representation or notation of the numeric value, a function for counting the number of leading or trailing bits, digits, or symbols equal to a certain value in the representation or notation of the numeric value, a function for reinterpreting the data type of an argument, a function for counting the number of specific digits or symbols in the representation or notation of the numeric value, or an any other function that is analogous or derived from at least one of the functions listed here, which applied to a record key or to some value derived from or obtained using information taken from a record or record key for determining the value of a digit or symbol in a numerical value of the key, or for selecting an element of a counter table or an index table, or for selecting or determining a bucket number, interval number, or bin number corresponding to a given record or record key.

10. An apparatus that executes a method designed to determining the position of the pivot element based on the key value, or to search for an element using key comparisons, or to determine the position or select an element when accessing a data structure (particularly an array) during sorting or searching, or to construct a data structure used as an index during sorting or searching, that is characterized by utilizing the computation of a logarithmic function, a function for determining the value or extracting the biased or unbiased value of an exponent, a function for determining the position or location of the leading or trailing bit, digit, or symbol in a representation or notation of the numeric value, a function for counting the number of significant bits, digits, or symbols in the representation or notation of the numeric value, a function for determining the length of the representation or notation of the numeric value, a function for counting the number of leading or trailing bits, digits, or symbols equal to a certain value in the representation or notation of the numeric value, a function for reinterpreting the data type of an argument, a function for counting the number of specific digits or symbols in the representation or notation of the numeric value, or an any other function that is analogous or derived from at least one of the functions listed here; provided that the result of such a function is used in this method for comparison(s) instead of the original key value, or is used to determine the position of the pivot element, or to select a specific element in a data structure, or to determine the position or value of a digit or symbol that is subsequently used for accessing a data structure.

11. Specific implementation of the apparatus from claim 1, that is characterized by not performing new accesses to the set or subset of records used to construct an original counter table or index table during a transformation or rebuilding of an old, or creation of a new counter table or index table, because said transformation or rebuilding of an old, or creation of the new counter table or index table is performed using the information already present in the previously constructed original counter table or index table (which may correspond to digits or symbols of higher information capacity or digit capacity), even if the transformed, rebuilt, or new counter table or index table corresponds to digits or symbols of lower information capacity or digit capacity.

12. An apparatus that during sorting or searching executes a method for evaluating a certain optimization criterion (particularly for estimating the workload or cache memory load of a computing system) or for evaluating a certain characteristic of the processed set of records by using information extracted from the elements of the counter table or index table to compute the estimate of the optimization criterion or the characteristic of the processed set of records.

13. An apparatus that during sorting, or building auxiliary tables or data structure therefor, executes a method for optimizing operations during a some process involving reducing or determining the optimal information capacity, digit capacity, radix, or bit depth of digits or symbols, or during evaluating some optimization criterion, or during estimating a characteristic of the processed set of objects, which involves the combination or summation of “a” to the power of “n” elements of a counter table, the combination or merging of “a” to the power of “n” buckets or data structures represented by corresponding elements of an index table, or the combination, merging or summation of “a” to the power of “n” elements of other data structure at the current iteration of said process where otherwise such combination, merging or summation would be performed in several passes through the entire set of elements of the counter table, index table, or by entire object set; wherein “a” represents the number of buckets, the number of the elements of the counter or index table, or number of data structure elements that are combined, merged or summed in a single step of iteration in the unoptimized said process, and “n” is an estimation of the number of iterations of the unoptimized said process that can be performed immediately.

14. An apparatus that executes a method for radix, bucket or interval sorting, or for searching within a set of objects divided into buckets associated with specific digit or character values that is characterized by the fact that, when switching to the use of other sorting or searching methods within a certain bucket or bin, it employs modifications of those other sorting or searching methods in which some or all string comparisons are performed with the exclusion of the initial prefix, final suffix, or another group of characters that are common or insignificant within the given bucket, and this achieved by skipping comparisons or computations for some or all digits or characters that compose or comprise such common or insignificant parts of strings to be compared during the sorting or searching process.

15. An apparatus that executes a method for radix, bucket, or interval sorting, or for searching within a set of records divided into buckets that is in the process of determining whether a certain record belongs to a certain bucket it utilizes a comparison between the key value of such a record and a certain boundary value, which corresponds to the maximum or minimum key value for the given or for an it’s neighboring bucket, wherein such boundary value or values computed using a formula, a method, an algorithm, or they determined by analyzing the keys of the records processed at a previous step or stage in the sorting or searching process, or they are obtained or derived from the characteristics of given bucket.

16. An apparatus that executes a method for radix, bucket, or interval sorting that involves the preliminary movement or relocation of records corresponding to elements located within a specific region of an array or another data structure, which boundaries correspond to the future placement of a specific bucket inside said array or another data structure; wherein said preliminary movement or relocation of records occurs at a stage preceding the movement or relocation of records between areas corresponding to the final placement of different buckets rather than just inside said specific bucket.

17. An apparatus that executes a method for sorting, or searching within a fully or partially sorted set of records, which involves performing an analysis during its operation, where such analysis refers to computations or operations on the data, resulting in an evaluation of a certain assumption or hypothesis about the nature of the statistical distribution of record key values, or involves an analysis to evaluate a hypothesis or assumption about the correspondence of record keys to a specific pattern or set of patterns, or involves an analysis intended to estimate the amount of information or entropy in the record keys or in certain parts of such keys, or involves analysis of a least one element of a counter table or index table; and subsequently result of at least one such analysis is directly or indirectly, via a chain of dependent variables, used as a parameter or variable that controls the sorting or searching process or as a condition influencing the choice of further actions; wherein the term “index table” is understood as a data structure used in numerical sorting and search algorithms in which a set of records is partitioned into buckets corresponding to values of digits or symbols extracted from their keys, and the set of these buckets corresponds to elements of such index table.

18. An apparatus that executes an improved method of arbitrary sorting, or for improvement of searching specifically in a partially or fully sorted set of objects for which a counter table or an index table is built, the elements of which correspond to groups of records containing a specific value(s) of a digit or symbol in their keys that is characterized by utilizing at least one parameter directly or through a chain of dependent variables used as a parameter controlling the sorting or search algorithm, or as a parameter in a condition influencing the selection of further action strategies, where such parameter depends on the output variable or represents the output variable of a Bayesian network, Bayesian classifier, belief propagation network, Markov network or chain, Restricted Boltzmann Machine, another machine learning-based classifier, model, or network, a layer of perceptrons or a separate perceptron, neural network, or some combination thereof.

19. An apparatus that executes a method for sorting or searching within a fully or partially sorted set of objects that is characterized by the utilization of a dictionary or table of prefixes or suffixes, a counter table, an index table, or a histogram constructed for the digits or symbols, or for their corresponding prefixes or suffixes that may have different lengths, different radixes, different digit capacity, different bit depth, or different information capacity.

20. An apparatus that executes a method for sorting, searching, or other data processing, characterized by utilizing the values of the elements of a counter table or index table that correspond to certain digit or symbol values in the numeric values of the record keys, whereby the said counter or index table is constructed in a previous stage, round, pass, or step of the sorting, searching, or other data processing process, and some values of its elements have already been used directly or after certain transformation on the previous stage, round, pass, or step of the such sorting, searching, or other data processing process in connection with the digits or symbols of lower information capacity, digit capacity, bit depth, or lower radix than the one used during the construction of said counter table or index table.

21. An apparatus that executes a method for sorting, or searching within a fully or partially sorted set of objects that is characterized by the utilization of a stage or process of constructing a dictionary or table of prefixes or suffixes, a counter table or an index table, or histogram, which elements correspond to prefixes or suffixes of varying lengths, or to digits or symbols with different radix, bit depth, digit capacity or information capacity; and said method is also characterized by the calculation or evaluation of a certain optimization criterion such as workload estimation, estimation of the cache memory load of a computing system, estimation of the overall size or the number of elements of the data structure corresponding to the dictionary or table of prefixes or suffixes, counter table or index table, or histogram, or any other optimization criterion; wherein computed or evaluated value of said optimization criterion or a logical condition involving it is then employed to limit the overall size or number of elements in the dictionary or table of prefixes or suffixes, counter table or index table, or histogram, during process of its construction, and this is achieved by replacing or removing one or more elements while or instead of adding a new element to such the dictionary, table or histogram, or by refraining from adding a new element altogether.

22. An apparatus that executes a method for organizing a counter table or index table for sorting or searching that is characterized by utilizing a transformation of said counter table or index table constructed for fixed-resolution digits or symbols into a new counter table or index table that enables support for different resolutions for elements corresponding to different digits or symbols, achieves this by being divided into zones or layers, or by having elements of different types or formats that correspond to digits or symbols of varying resolution, or by adding additional parallel data structures allowing to define type or resolution for particular elements, zones or layers.

23. An apparatus that executes a method for partially ordering a set of records, characterized by using radix sort, bucket sort or interval sort modified for skipping the processing of those buckets whose location or content allows them to be classified as definitely not containing records that fall into the subset requiring further ordering.

24. An apparatus that executes a method for partially ordering radix, bucket, or interval sorting, which are characterized by the fact that, when not all non-empty buckets fall into the set of buckets of interest for further processing, then, at least at one step of sorting, the ordering of the sorted subset of records is performed using certain sorting process implementation, which does not guarantee ordering for records whose keys do not correspond to the buckets included in the set of buckets of interest for further processing.

25. An apparatus that executes a method for sorting, searching, or similar processing data that utilizes counter tables or index tables whose elements correspond to buckets into which the set of records is partitioned or to digits or symbols obtained using record keys, which is characterized by the summation or accumulation using an accumulation function of element values or the results of applying a certain function to the elements of the counter table or index table, where this summation or accumulation is performed for elements that are located at the beginning, end, in a certain fragment, or in a certain set of fragments, or taken from a specific sample of elements taken from the counter table or index table, or simultaneously belong to several of the mentioned subsets; wherein the result of summation or accumulated information is subsequently used in the process of selecting a strategy for further actions or in determining the value of a control parameter.

26. An apparatus that executes a method for estimating the number of records that have matching or similar prefixes or suffixes, or that have prefixes or suffixes of a specific type, which utilizes the summation or accumulation of values of elements or information computed or obtained using elements of a counter or index table, where these elements are taken from a fragment or set of fragments or from a sample taken from the counter table or index table; or, alternatively, which utilizes the summation or accumulation of the results of applying a certain function to such information; wherein result of this summation or accumulation, obtained using this method, can be used to assess the feasibility of switching to logarithmic or other sorting or searching methods, or as a parameter or variable that controls the sorting or searching process.

27. An apparatus that executes a method for sorting or searching, wherein, for estimation of an amount of information or entropy in the sorting or searching process, the apparatus estimates said amount of information or entropy for a set of arbitrary elements by calculating a hash function or a set of hash functions for each of the elements being evaluated, and then counting the non-uniformity of the distribution of digits, symbols, or bits in different positions within the computed values obtained from applying the hash function or set of hash functions, possibly combined together using some function or rule.

28. An apparatus that during sorting, searching, or building auxiliary tables or data structures therefor, executes a method designed to estimate the amount of information or entropy that is characterized by estimating the amount of information or entropy in the values of a certain sample of elements or in the data obtained by applying a certain function to a sample of elements taken from the counter table or index table, or in the sums of such element values or function results, or in aggregated element values or function results; where subsequently the estimated value of information or entropy obtained through such processing of a sample of elements taken from the counter table or index table is used as or to calculate a general estimation of the amount of information or entropy present in a set of record key values, in specific value(s) of digits or symbols in the record keys, or in individual position(s) of digits or symbols, which were used in the process of constructing the counter table or index table, for all records or for a subset of records corresponding to the processed subset of counter table or index table elements.

29. An apparatus that executes a method for the parallel implementation of the step or phase of record redistribution in a sorting process or another process of ordering a set of records, which uses a counter table, index table, or some auxiliary or working table or data structure that is characterized by creating a separate "shadow" copy of the main counter table, index table, auxiliary or working table for each an executive device, thread, or program control flow in this specific implementation; wherein said "shadow" table is subsequently used instead of the main table in the main part of the operation of the said executive device, thread, or program control flow; and at certain points during the operation, the elements of said "shadow" table are dynamically modified to be populated with new information, and this is achieved by executive devices by capturing a part of elements or a portion of space designated for the placement of records from those areas indicated by corresponding elements of the main counter table, index table, auxiliary or working table.

30. An apparatus that executes a method for deferred record relocation in a parallel implementation of the step or phase of record redistribution between bin or buckets during sorting or preparation therefor, characterized by placing a record or a pointer to it into a queue associated with an element of a data structure corresponding to the target bucket when it is necessary to defer the placement of a certain record in the target bucket as it is moved from its location in the source bucket to a certain target bucket and also performing a check for the presence in this data structure of another queue of elements associated with the source bucket, from which the relocation of the deferred record to the target bucket occurred, and if this other queue is not empty, then taking a record from one of its elements and placing it into the position vacated by the deferred record, after which the said element is removed from the corresponding queue it belonged to.

31. An apparatus that executes a method for radix sort, bucket sort, or interval sort that utilizes information about the initial boundary, final boundary, middle point between such boundary values for a specific bucket or that utilizes information extracted or derived from the counter table or index table to improve the selection of the pivot element or to calculate synthetic value of the pivot element, which may be used in another sorting algorithm applied to the contents of a specific bucket.

32. An apparatus that executes a method for partial sorting based on radix sort, bucket sort, or interval sort that is characterized by collecting target records at a certain step or stage of its operation and placing them at the beginning, end, or any other desired area within the sorted array or data structure, even if in a fully sorted set these target records would have been located elsewhere, achieved by changing the positions of buckets representing the buckets of interest during the sorting process while ignoring other buckets that are not of interest and will be discarded at said step or stage of operation.

* * * * *